US011724241B2

(12) United States Patent
Jose et al.

(10) Patent No.: US 11,724,241 B2
(45) Date of Patent: Aug. 15, 2023

(54) CONSTANT SHEAR CONTINUOUS REACTOR DEVICE

(71) Applicant: Cambridge Enterprise Limited, Cambridge (GB)

(72) Inventors: Nicholas Jose, Cambridge (GB); Alexei Lapkin, Cambridge (GB)

(73) Assignee: Cambridge Enterprise Limited, Cambridge (GB)

( * ) Notice: Subject to any disclaimer, the term of this patent is extended or adjusted under 35 U.S.C. 154(b) by 428 days.

(21) Appl. No.: 16/966,511

(22) PCT Filed: Feb. 15, 2019

(86) PCT No.: PCT/GB2019/050406
§ 371 (c)(1),
(2) Date: Jul. 31, 2020

(87) PCT Pub. No.: WO2019/158932
PCT Pub. Date: Aug. 22, 2019

(65) Prior Publication Data
US 2021/0039061 A1    Feb. 11, 2021

(30) Foreign Application Priority Data

Feb. 15, 2018   (SG) .......................... 10201801303T

(51) Int. Cl.
*B01J 10/02*    (2006.01)
*B01J 19/24*    (2006.01)
(Continued)

(52) U.S. Cl.
CPC ............. *B01J 10/02* (2013.01); *B01F 23/232* (2022.01); *B01F 33/30121* (2022.01);
(Continued)

(58) Field of Classification Search
CPC ........ B01J 10/02; B01J 19/244; B01J 19/247; B01J 19/2415; B01J 2219/00164; B01J 2219/00033; B01F 23/232
See application file for complete search history.

(56) References Cited

U.S. PATENT DOCUMENTS

| 5,648,508 A | 7/1997 | Yaghi |
| 6,860,907 B1 | 3/2005 | Hanna et al. |

(Continued)

FOREIGN PATENT DOCUMENTS

| CN | 102974411 A | 3/2013 |
| CN | 106252663 A | 12/2016 |

(Continued)

OTHER PUBLICATIONS

Conchuir, B. O. et al., Analytical Model of Fractal Aggregate Stability and Restructuring in Shear Flows; Ind. Eng. Chem. Res. 2014, 9109-9119, 53.
(Continued)

*Primary Examiner* — Lessanework Seifu
(74) *Attorney, Agent, or Firm* — Patterson + Sheridan, LLP

(57) ABSTRACT

Disclosed herein is a constant shear continuous reactor device, comprising: an annular gas delivery tube comprising a gas inlet and a gas outlet; a first annular liquid delivery tube comprising a first liquid inlet and a first liquid outlet arranged concentrically around the annular gas delivery tube along a common axis, where the first liquid outlet is located at a downstream position relative to the gas outlet or is coterminous with the gas outlet; and an annular reactor wall tube comprising a final liquid inlet, a mixing zone section and a reactor outlet, where the annular reactor wall tube is arranged concentrically around the first annular liquid delivery tube along the common axis.

20 Claims, 17 Drawing Sheets

(51) Int. Cl.
- B01J 19/00 (2006.01)
- C07F 1/08 (2006.01)
- B01F 23/232 (2022.01)
- B01F 33/3012 (2022.01)
- B01J 14/00 (2006.01)
- B01F 101/00 (2022.01)

(52) U.S. Cl.
CPC ........... B01J 14/00 (2013.01); B01J 19/0006 (2013.01); B01J 19/2415 (2013.01); C07F 1/08 (2013.01); B01F 2101/2204 (2022.01); B01J 19/244 (2013.01); B01J 2219/00033 (2013.01); B01J 2219/00164 (2013.01); C07B 2200/09 (2013.01); C07B 2200/13 (2013.01)

(56) References Cited

U.S. PATENT DOCUMENTS

| | | | |
|---|---|---|---|
| 6,930,193 | B2 | 8/2005 | Yaghi et al. |
| 7,652,132 | B2 | 1/2010 | Yaghi et al. |
| 7,662,746 | B2 | 2/2010 | Yaghi et al. |
| 8,563,325 | B1 | 10/2013 | Bartsch et al. |
| 2009/0306420 | A1 | 12/2009 | Schubert et al. |
| 2010/0152395 | A1 | 6/2010 | Pavageau et al. |
| 2012/0003475 | A1 | 1/2012 | Benin et al. |
| 2012/0094392 | A1* | 4/2012 | Batsale ............... G01K 17/006 374/45 |

FOREIGN PATENT DOCUMENTS

| | | |
|---|---|---|
| CN | 106379924 A | 2/2017 |
| DE | 10346619 A1 | 5/2005 |
| EP | 2832697 A1 | 2/2015 |

OTHER PUBLICATIONS

Zheng, Y. et al., Preparation of Polypropylene/Mg—Al Layered Double Hydroxides Nanocomposites Through Wet Pan-Milling: Formation of a Second-Staging Structure in LDHS Intercalates, RSC Adv. 2017, 1520-1530, 7.
Vermant, J. et al., Flow-Induced Structure in Colloidal Suspensions; J. Phys.: Condens. Matter 2005, R187-R216, 17.
Mountain, R. D. et al., Molecular Dynamics Simulation of Trimer Self-Assembly Under Shear; Fluid Ph. Equilibria 2017, 87-94, 440.
Fan, G. et al., Catalytic Applications of Layered Double Hydroxides: Recent Advances and Perspectives; Chem. Soc. Rev. 2014, 7040-7066, 43.
Rives, V. et al., Intercalation of Drugs in Layered Double Hydroxides and Their Controlled Release: A Review; Appl. Clay Sci. 2014, 239-269, 88-89.
Sahoo, R. et al., 2D Materials for Renewable Energy Storage Devices: Outlook and Challenges; Chem. Commun. 2016, 13528-13542, 52.
Zhang, Y. P. et al., Colloids and Surfaces A: Physicochemical and Engineering Aspects; Colloids Surf. A Physicochem. Eng. Asp. 2016, 49-54, 501.
Hu, G. et al., Synthesis of Magnesium Aluminium Layered Double Hydroxides in Reverse Microemulsions; J. Mater. Chem. 2007, 2257-2266, 17.
Zaccone, A. et al., Shear-Induced Reaction-Limited Aggregation Kinetics of Brownian Particles At Arbitrary Concentrations; J. Chem, Phys. 2010, 134903, 132.
Ackerson, B. J., Shear Induced Order of Hard Sphere Suspensions; Shear Induced Order of Hard Sphere Suspensions; J. Phys.: Condens. Matter 1990, SA389-SA392, 2.
Chen, L. B. et al., Rheological and Microstructural Transitions in Colloidal Crystals Langmuir 1994, 2817-2829, 10.
Hanley, H. J. M. et al., Shear-Induced Restructuring of Concentrated Colloidal Silica Gels; J. Phys.: Condens. Matter 1999, 1369-1380, 11.

Doku, G. N. et al., On-Microchip Multiphase Chemistry—A Review of Microreactor Design Principles and Reagent Contacting Modes; Tetrahedron 2005, 2733-2742, 61.
Zhao, C.-X. et al., Nanoparticles Synthesis in Microreactors; Chem. Eng. Sci. 2011, 1463-1479, 66.
Nagasawa, H. et al., Development of a New Microreactor Based On Annular Microsegments for Fine Particle Production; Ind. Eng. Chem. Res. 2006, 2179-2186, 45.
Yang, L. et al., Mass Transport and Reactions in the Tube-In-Tube Reactor; Org. Process Res. Dev. 2013, 927-933, 17.
International Search Report of related application PCT/GB2019/050406 dated Jun. 3, 2019.
Rodenas, T. et al., Metal-Organic Framework Nanoshffts in Polymer Composit Material for Gas Separation; Nat. Mater. 2015, 48-55, 14.
Carson, C. G. et al., Synthesis and Structure Characterization of Copper Terephthalate Metal-Organic Frameworks; Eur. J. Inorg. Chem. 2009, 2338-2343, 2009.
Han, Y. et al., Measurement of Liquid Film Thickness in Micro Tube Annular Flow; Int. J. Multiph. Flow 2015, 264-274, 73.
Forsyth, C. et al., Influence of Controlle Dfluid Shear On Nucleation Rates in Glycine Aqueous Solutions; Cryst. Growth Des. 2015, 94-102, 15.
Paton, K. R. et al., Scalable Production of Large Quantities of Defect-Free Few-Layer Graphene By Shear Exfoliation in Liquids; Nat. Mater. 2014, 624-630, 13.
Fournier, M. C. et al., A New Parallel Competing Reaction System for Assessing Micromixing Efficiency—Experimental Approach; Chem. Eng. Sci. 1996, 5053-5064, 51.
Guichardon, P. et al., Characterisation of Micromixing E$ciency By the Iodide}Iodate Reaction System. Part II: Kinetic Study Chem. Eng. Sci. 2000, 4245-4253, 55.
Fournier, M. C. et al., A New Parallel Competing Reaction System for Assessing Micromixing-Fficiency—Determination of Micromixing Time By a Simple Mixing Model; Chem. Eng. Sci. 1996, 5187-5192, 51.
Bourne, J. R.; Comments On the Iodide/Iodate Method for Characterising Micromixing; Chem. Eng. J. 2008, 638-641, 140.
Kölbl, A. et al., Kinetic Investigation of the Dushman Reaction At Concentrations Relevant To Mixing Studies in Stirred Tank Reactors; Chem. Eng. Sci. 2013, 47-54, 93.
Kölbl, A. et al., The Iodide Iodate Reaction Method: The Choice of the Acid Chem. Eng. Sci. 2010, 1897-1901, 65.
Baldyga, J. et al., Simplification of Micormixing Calculations. I. Derivation and Applicatoin of New Model; Chem. Eng. J. 1989, 83-92, 42.
Tanaka, K.; Self-Diffusion Coefficients of Water in Pure Water and in Aqueous Solutions of Several Electrolytes With 18O And 2H as Tracers; J. Chem. Soc. Farad. Trans. 1 Phys. Chem. Condens. Phases 1978, 1879-1881, 74.
Guichardon, P. et al., Characterisation of Micromixing Efficiency By the Iodide-Iodate Reaction System. Part I: Experimental Procedure; Chem. Eng. Sci. 2000, 4233-4243, 55.
Patterson, A. L.; the Scherrer Formula for X-Ray Particle Size Determination Phys. Rev. 1939, 978-982, 56.
Baldyga, J. et al., Simplification of Micromixing Calculations. II. New Applications; Chem. Eng. J. 1989, 93-101, 42.
Choi, C. H. et al., Apparent Slip Flows in Hydrophilic and Hydrophobic Microchannels; Phys. Fluids 2003, 2897-2902, 15.
Maali, A. et al., Evidence of the No. Slip Boundary Condition of Water Flow Between Hydrophilic Surfaces Using Atomic Force Microscopy; Langmuir 2009, 12002-12005, 25.
Ho, T. A. et al., Liquid Water Can Slip On a Hydrophilic Surface; Proc. Natl. Acad. Sci. USA. 2011, 16170-16175, 108.
Sendner, C. et al., Interfacial Water At Hydrophobic and Hydrophilic Surfaces: Slip, Viscosity, and Diffusion; Langmuir 2009, 10768-10781, 25.
Baldyga, J. et al., Energetic Efficiency of Mixing and Mass Transfer in Single Phase and Two-Phase Systems; Chem. Process Eng. 2017, 79-96, 38.
Mitic, S. et al., Design of Turbulent Tangential Micro-Mixers That Mix Liquids On the Nanosecond Time Scale; Anal. Biochem. 2015, 19-26, 469.

(56) References Cited

OTHER PUBLICATIONS

Shastry, M. C. R. et al., A Continuous-Flow Capillary Mixing Method To Monitor Reactions On the Microsecond Time Scale; Biophys. J. 1998, 2714-2721, 74.

Baber, R. et al., Synthesis of Silver Nanoparticles Using a Microfluidic Impinging Jet Reactor J. Flow. Chem 2016, 268-278, 6.

Lim, J. M. et al., Ultra-High Throughput Synthesis of Nanoparticles With Homogeneous Size Distribution Using a Coaxial Turbulent Jet Mixer; ACS Nano 2014, 6056-6065, 8.

Boodhoo, K. V. K. et al., Micromixing Characteristics in a Small-Scale Spinning Disk Reactor; Chem. Eng. Technol. 2012, 1229-1237, 35.

Wong, W. K. et al., Linking Fundamental Chemistry and Engineering To Create Scalable, Efficient Processes; React. Chem. Eng. 2017, 636-641, 2.

Hartman, R. L. et al., Deciding Whether To Go With the Flow: Evaluating the Merits of Flow Reactors for Synthesis; Angew. Chem. Int. Ed. 2011, 7502-7519, 50.

Cavani, F. et al., Hydrotalcite-Type Anionic Clays: Prearation, Properties and Applications; Catal. Today 1991, 173-301, 11.

Abelló, S et al., Tuning Nanomaterials' Characteristics By a Miniaturized In-Line Dispersion-Precipitation Method: Application To Hydrotalcite Synthesis; Adv. Mater. 2006, 2436-2469, 18.

Sato, T. et al., Synthesis of Hydrotalcite-Like Compounds and Their Physico-Chemical Properties; React. Solid 1988, 219-228, 5.

Tathod, A. et al., Fundamental Insights Into the Nucleation and Growth of Mg?Al Layered Double Hydroxides Nanoparticles At Low Temperature; Cryst. Growth Des. 2016, 6709-6713, 16.

Pang, X. J. et al., Growth Behavior of Water Dispersed MGAL Layered Double Hydroxide Nanosheets; RSC Adv. 2017, 14989-14997, 7.

Grogan, J. M. et al., Bubble and Pattern Formation in Liquid Induced By an Electron Beam; Nano Lett. 2014, 359-364, 14.

Zaccone, A. et al., Breakup of Dense Colloidal Aggregates Under Hydrodynamic Stresses; Phys. Rev. E 2009, 061401, 79.

Lattuada, M. et al., Effect of Repulsive Interactions On the Rate of Doublet Formation of Colloidal Nanoparticles in the Presence of Convective Transport; J. Colloid Interface Sci. 2011, 42-53, 355.

Zaccone, A. et al., Theory of Activated-Rate Processes Under Shear With Application To Shear-Induced Aggregation of Colloids Phys. Rev. E 2009, 051404, 80.

Abelló, S. et al., Perturbing the Properties of Layered Double Hydroxides By Continuous Coprecipitation With Short Residence Time; J. Mater. Chem. 2010, 5878-5887, 20.

Galvão, T. L. P et al., Control of Crystallite and Particle Size in the Synthesis of Layered Double Hydroxides: Macromolecular Insights and a Complementary Modeling Tool; J. Colloid Interface Sci. 2016, 86-94, 468.

Sun, X. et al., Insights Into the Synthesis of Layered Double Hydroxide (LDH) Nanoparticles Part 2 Formation Mechanisms of LDH; J. Colloid Interface Sci. 2015, 160-168, 458.

Jobbágy, M. et al., Complexation At the Edges of Hydrotalcite: The Cases of Arsenate and Chromate; J. Colloid Interface Sci. 2013, 314-318, 393.

Wang, Y. F. et al., Compositional and Structural Control On Anion Sorption Capability of Layered Double Hydroxides (LDHS) J. Colloid Interface Sci. 2006, 19-26, 301.

Pavlovic, M. et al., Ion Specific Effects On the Stability of Layered Double Hydroxide Colloids Soft Matter 2016, 4024-4033, 12.

Sun, X. et al., Insights Into the Synthesis of Layered Double Hydroxide (LDH) Nanoparticles: Part 1. Optimization and Controlled Synthesis of Chloride-Intercalated LDH; J. Colloid Interface Sci. 2015, 264-272, 459.

Yokoi, T. et al., Morphological Control of Layered Double Hydroxide Through a Biomimetic Approach Using Carboxylic and Sulfonic Acids ; J. Asian Ceram. Soc. 2015, 230-233, 3.

Chen, C. P. et al., Synthesis and Characterisation of Aqueous Miscible Organic-Layered Double Hydroxides; J. Mater. Chem. A 2014, 15102-15110, 2.

Wang, Q. et al., Synthesis of Ultrafine Layered Double Hydroxide (LDHS) Nanoplates Using a Continuous-Flow Hydrothermal Reactor; Nanoscale 2013, 114-117, 5.

Pang, X. J. et al., Synthesis of Layered Double Hydroxide Nanosheets By Coprecipitation Using A T-Type Microchannel Reactor; J. Solid State Chem. 2014, 111-115, 210.

Ren, M. Y. et al., High-Throughput Preparation of Monodispersed Layered Double Hydroxides Via Microreaction Technology; J. Flow Chem. 2014, 164-167, 4.

Li, P. et al., Immobilization of Metal?Organic Framework Nanocrystals for Advanced Design of Supported Nanocatalysts; ACS Appl. Mater. Inter. 2016, 29551-29564, 8.

Zhang, F. Z. et al., Facile Fabrication of Spherical Architecture of Ni/Al Layered Double Hydroxide Based On in Situ Transformation Mechanism; AIChE J. 2014, 4027-4036, 60.

Lv, W. Y. et al., The Formation Mechanism of Layered Double Hydroxide Nanoscrolls By Facile Trinal-Phase Hydrothermal Treatment and Their Adsorption Properties; J. Mater. Chem. A. 2015, 23395-23402, 3.

Lobo, V. M. M. et al., Diffusion Coefficients in Aqueous Solutions of Magnesium Nitrate at 298 K; Ber. Bunsen Phys. Chem. 1994, 205-208, 1994.

Tokudome, Y. et al., Layered Double Hydroxide Nanoclusters: Aqueous, Concentrated, Stable, and Catalytically Active Colloids toward Green Chemistry; ACS Nano 2016, 5550-5559, 10.

De Yoreo, J. J. et al., Crystallization By Particle Attachment in Synthetic, Biogenic, and Geologic Environments; Science 2015, aaa6760, 349.

Auer, S. et al., Suppression of Crystal Nucleation in Polydisperse Colloids Due To Increase of the Surface Free Energy; Nature 2001, 711-713, 413.

Solomon, M. J.; Directions for targeted self-assembly of anisotropic colloids from statistical thermodynamics; Curr. Opin. Colloid Interface Sci. 2011, 158-167, 16.

Carson, C. G. et al., Structure Solution From Powder Diffraction of Copper 1,4-Benzenedicarboxylate; Eur. J. Inorg. Chem. 2014, 2140-2145, 2014.

Cheng, Y. D. et al., Ultrathin Mixed Matrix Membranes Containing Two-Dimensional Metalorganic Framework Nanosheets for Efficient $CO_2/CH_4$ Separation; J. Membrane Sci. 2017, 213-223, 539.

Lv, W. Y. et al., Understanding the Oriented-Attachment Growth of Nanocrystals From an Energy Point of View: A Review; Nanoscale 2014, 2531-2547, 6.

Schneider, N. M. et al., Electron/Water Interactions and Implications for Liquid Cell Electron Microscopy; J. Phys. Chem. C 2014, 22373-22382, 118.

Phan, N. T. S. et al., An Open Metal Site Metal-Organic Framework Cu(BDC) as a Promising Heterogeneous Catalyst for the Modified Friedlander Reaction; Appl. Catal. A Gen. 2013, 128-135, 464.

Sabetghadam, A. et al., Metal Organic Framework Crystals in Mixed-Matrix Membranes: Impact of the Filler Morphology on the Gas Separation Performance; Adv. Fund. Mater. 2016, 3154-3163, 26.

Su, F. F. et al., Two-Dimensional Zirconium-Based Metal?Organic Framework Nanosheet Composites Embedded with Au Nanoclusters: A Highly Sensitive Eledrochemical Aptasensor toward Detecting Cocaine; ACS Sens. 2017, 998-1005, 2.

Dong, J. Q. et al., Ultrathin Two-Dimensional Porous Organic Nanosheets With Molecular Rotors for Chemical Sensing; Nat. Commun. 2017, 1142, 8.

Aulakh, D. et al., The Importance of Polymorphism in Metal?Organic Framework Studies; Inorg. Chem. 2015, 8679-8684, 54.

Hohenberg, P. et al., Inhomogeneous Electron Gas; Phys. Rev. 1964, B864-B871, 136.

Kohn, W. et al., Self-Consistent Equations Including 0045Change and Correlation Effects Phys. Rev. 1965, A1133-A1138, 140.

Perdew, J. P. et al., Generalized Gradient Approximation Made Simple; Phys. Rev. Lett. 1996, 3865-3868, 77.

Kresse, G. et al., From Ultrasoft Pseudopotentials To the Projector Augmented-Wave Method; Phys. Rev. B 1999, 1758-1775, 59.

Grimme, S. et al., A Consistent and Accurate Ab Initio Parametrization of Density Functional Dispersion Correction (DFT-D) for The 94 Elements H—Pu; J. Chem. Phys. 2010, 154104, 132.

(56) References Cited

OTHER PUBLICATIONS

Perdew, J. P. et al., Accurate and Simple Analytic Representation of the Electron-Gas Correlation Energy; Phys. Rev. B 1992, 13244-13249, 45.

Zhao, Y. et al., A New Local Density Functional for Maingroup Thermochemistry, Transition Metal Bonding, Thermochemical Kinetics, and Noncovalent Interactions; J. Chem. Phys. 2006, 194101, 125.

Nazarian, D. et al., Benchmarking Density Functional Theory Predictions of Framework Structures and Properties in a Chemically Diverse Test Set of Metal-Organic Frameworks; J. Mater. Chem. A 2015, 22432-22440, 3.

Monkhorst, H. J. et al., Special Points for Brillonin-Zone Integrations; Phys. Rev. B 1976, 5188-5192, 13.

Tian, X. et al., A Dft Based Method for Calculating the Surface Energies of Asymmetric Mop Facets; Appl. Surf. Sci. 2018, 357-362, 427.

Bétard, A. et al., Metal-Organic Framework Thin Films: From Fundamentals To Applications Chem. Rev. 2012, 1055-1083, 112.

Tian, T. et al., A Sol-Gel Monolithic Metal-Organic Framework With Enhanced Methane Uptake Nat. Mater. 2018, 174-179, 17.

Sakata, Y. et al., Shape-Memory Nanopores Induced in Coordination Frameworks by Crystal Downsizing; Science 2013, 193-196, 339.

Sikdar, N. et al., Oriented Attachment Growth of Anisotropic MESO/ Nanoscale MOFS: Tunable Surface Area and CO2; Separation; J. Mater. Chem. A 2017, 20959-20968, 5.

Tsuruoka, T. et al., Nanoporous Nanorods Fabricated By Coordination Modulation and Oriented Attachment Growth; Angew. Chem. Int. Ed. 2009, 4739-4743, 48.

Watanabe, S. et al., Synthesis of Zeolitic Imidazolate Framework-8 Particles of Controlled Sizes, Shapes, and Gate Adsorption Characteristics Using a Central Collision-Type Microreactor; Chem. Eng. J. 2017, 724-733, 313.

Faustini, M. et al., Microfluidic Approach Toward Continuous and Ultrafast Synthesis of Metal?Organic Framework Crystals and Hetero Structures in Confined Microdroplets; J. Am. Chem. Soc. 2013, 14619-14626, 135.

Ang, H. X. et al., Polycationic Polymer-Regulated Assembling of 2D MOF Nanosheets for High-Performance Nanofiltration; ACS Appl. Mater. Inter. 2017, 28079-28088, 9.

Patterson, J. P. et al., Soft Nanomaterials Analysed By In Situ Liquid TEM: Towards High Resolutioncharacterisation of Nanoparticles in Motion; Perspect. Sci. 2015, 106-112, 6.

Deng, D. H. et al., Catalysis With Two-Dimensional Materials and Their Heterostructures; Nat. Nanotechnol. 2016, 218-230, 11.

Li, H. et al., Confined Catalysis Under Two-Dimensional Materials; Proc. Natl. Acad. Sci. USA. 2017, 5930-5934, 114.

Pomerantseva, E. et al., Two-Dimensional Heterostructures for Energy Storage; Nat. Energy 2017, 17089, 2.

Xue, Y. H. et al., Opening Two-Dimensional Materials for Energy Conversion and Storage: A Concept; Adv. Energy Mater. 2017, 1602684, 7.

Chen, K. S. et al., Emerging Opportunities for Two-Dimensional Materials in Lithium-Ion Batteries; Kan-Sheng ACS Energy Lett. 2017, 2026-2034, 2.

Fiori, G. et al., Electronics Based On Two-Dimensional Materials; Nat. Nanotechnol. 2014, 768-779, 9.

Tan, C. et al., Recent Advances in Ultrathin Two-Dimensional Nanomaterials; Chem. Rev. 2017, 6225-6331, 117.

Park, J. et al., Direct Observation of Nanoparticle Superlattice Formation By Using Liquid Cell Transmission Electron Microscopy; ACS Nano 2012, 2078-2085, 6.

Patterson, J. P. et al., Observing the Growth of Metal?Organic Frameworks By in Situ Liquid Cell Transmission Electron Microscopy; J. Am. Chem. Soc. 2015, 7322-7328, 137.

Baldyga, J. et al., Observing the Growth of Metal?Organic Frameworks By in Situ Liquid Cell Transmission Electron Microscopy; Kona Powder Part. J. 2016, 127-149, 33.

Wu, K.-J. et al., Linking Fundamental Chemistry and Engineering To Create Scalable, Efficient Processes; React. Chem. Eng. 2017, 116-128, 2.

Mura, F. et al., Effects of Shear Flow On Phase Nucleation and Crystallization; Phys. Rev. E. 2016, 042803, 93.

Richard, D. et al., The Role of Shear in Crystallization Kinetics: From Suppression To Enhancement; Sci. Rep. 2015, 14610, 5.

Bihannic, I. et al., Orientational Order of Colloidal Disk-Shaped Particles Under Shear-Flow Conditions: A Rheological-Small-Angle X-Ray Scattering Study; J. Phys. Chem. B 2010, 16347-16355, 114.

Kim, J. et al., Optically Anisotropic Thin Films By Shear-Oriented Assembly of Colloidal Nanorods; Adv. Mater. 2013, 3295-3300, 25.

Rodenas, T. et al., Metal-organic framework nanosheets in polymer composite materials for gas separation; Nature Materials 2015, vol. 14, pp. 48-55.

Chinese Office Action in related application CN201980013710.9 dated Dec. 10, 2021.

\* cited by examiner

CONSTANT SHEAR CONTINUOUS REACTOR DEVICE

FIELD OF INVENTION

This invention relates to a constant shear continuous reactor device, method of using said device and its use for synthesising two-dimensional materials.

BACKGROUND

The listing or discussion of a prior-published document in this specification should not necessarily be taken as an acknowledgement that the document is part of the state of the art or is common general knowledge.

Two dimensional materials possess unique properties due to their high surface area, electron confinement, mechanical flexibility, and transparency. This class of materials includes graphene, perovskites, and layered double hydroxides (LDHs), which have been pinpointed as next generation materials in catalysis, energy storage, and electronics. Despite the promise and popularity of these materials, a fundamental understanding of how highly anisotropic nanoparticles crystallise, and how reaction conditions affect crystal morphology, size, and structure is still lacking. Such knowledge is crucial to the rational design of new materials and processes for large-scale manufacturing.

In wet syntheses, hydrodynamics governs mixing, residence time, and particle interaction, but these are often neglected in laboratory studies. Mixing dynamics and speed can segregate fast and slow kinetic processes like nucleation and growth. In continuous flow reactors, vessel geometry and length determine the residence time distribution and resulting particle size distribution. Hydrodynamic shear stress, which is introduced by agitation or pumping, can decrease kinetic interaction barriers to accelerate nucleation and aggregation and produces effects across multiple scales. Shear-induced nucleation, crystallisation, and aggregation are well-studied phenomena, and contribute to lowered kinetic interaction barriers. Shear also induces the alignment of anisotropic particles by stabilising angular orientations in the direction of flow. Conversely, shear also inhibits crystallisation and causes breakup via strain. Depending on its intensity, shear may be used to exfoliate two dimensional materials like LDH and graphene, or induce straining. However, the effects of shear on non-classical mechanisms of growth such as self-assembly, have yet to be fully elucidated.

Layered double hydroxide (LDH), an example of cationic two dimensional (2-D) metal hydroxides intercalated with anions, and possess applications in catalysis, drug delivery, and energy storage. Typically, colloidal LDH is synthesised via hydrothermal treatment or co-precipitation, usually followed by thermal aging to improve crystallinity. The crystallisation process is not well known, and is thought to proceed via local dissolution and crystallisation of amorphous LDH, or via the physical rearrangement of nanocrystalline domains. Surfactant-assisted methods and continuous flow reactors have recently been used to generate monolayer LDH nanoplatelets. However, the control of particle size, crystallinity, and thickness remains difficult. Hydrodynamics also play a key role in the synthesis of LDH. Varying reactor geometries (e.g. the T-micromixer flow hydrothermal reactor, and inline dispersion precipitator), flowrates, and mixing speeds produce pronounced effects in crystallite size, surface area, and aspect ratio. However, the physical mechanism behind these effects has not been investigated.

A key problem in identifying the crystallisation mechanism of nanostructures is that classical models are overly simplistic, assuming constant surface and bulk energies, while disregarding particle interactions, mass transfer effects, competing kinetics, and external forces. Non-classical mechanisms, including self-assembly (or oriented attachment) and two-step nucleation pathways, may dominate when molecular and interparticle interactions are anisotropic. These are important not only in materials synthesis but also in biogenic and geologic environments. Controlling these non-classical mechanisms, for example, in surfactant-assisted self-assembly, can potentially enable the development of bottom-up synthesis methods for a variety of novel, functional colloidal nanoparticles.

Given the above, there remains a need to develop new reactor devices and/or methods that provide better control and precision to the synthesis of chemical materials. Such devices and methods can utilise hydrodynamics to achieve such precision, and can potentially give rise to new materials, or known materials with different morphologies with useful properties. More importantly, these reactor devices and methods have to be robust, cost-effective and versatile, to cater to the synthesis of a wide range of materials.

SUMMARY OF INVENTION

In a first aspect of the invention, there is provided a constant shear continuous reactor device, comprising:
  an annular gas delivery tube comprising a gas inlet and a gas outlet;
  a first annular liquid delivery tube comprising a first liquid inlet and a first liquid outlet arranged concentrically around the annular gas delivery tube along a common axis, where the first liquid outlet is located at a downstream position relative to the gas outlet or is coterminous with the gas outlet; and
  an annular reactor wall tube comprising a final liquid inlet, a mixing zone section and a reactor outlet, where the annular reactor wall tube is arranged concentrically around the first annular liquid delivery tube along the common axis, wherein:
    the mixing zone section is located at a downstream position relative to the gas outlet and the first liquid outlet;
    the reactor outlet is located at a downstream position relative to the mixing zone section; and
    the mixing zone section and reactor outlet of the annular reactor wall tube has an inner diameter of from 100 nm to 53 mm.
  In embodiments of the first aspect of the invention:
  (A) the device may further comprise a means or apparatus that controls the flow rates of a gas through the gas inlet, a first liquid through the first liquid inlet and a final liquid through the final liquid inlet, such that an annular flow of a liquid film mixture comprising the first and final liquids is formed in the mixing zone section (e.g. the means or apparatus that controls the flow rates of the gas, the first liquid and the final liquid may control the flow rates of the gas and first liquid to provide a liquid film on a liquid film forming section that comprises the first liquid, optionally wherein the liquid film in the liquid film forming section may have a thickness that is from 0.1% to 10%, such as from 0.5% to 5%, such as from 1% to 2.5% of an inner diameter of the liquid film forming section of the first annular liquid delivery tube);
  (B) the liquid film mixture in the mixing zone section may have a thickness that is from 0.1% to 10%, such as from 0.5% to 5%, such as from 1% to 2.5% of the inner diameter of the mixing zone section and reactor outlet of the annular reactor wall tube, optionally wherein the maximum thickness of the liquid film mixture may be less than 1 mm;

(C) the first liquid outlet may be located at a downstream position relative to the gas outlet, such that the liquid film forming section is formed on an inner surface of the first annular liquid delivery tube, optionally wherein the device may be suitable to provide a high-shear core gas flow and a liquid sheath flow comprising a first liquid on an inner surface of the liquid film forming section;

(D) the inner diameter of the mixing zone section and reactor outlet of the annular reactor wall tube may be from 1 μm to 2.5 mm, such as from 50 μm to 2 mm, such as 100 μm to 1.5 mm;

(E) an inner surface of the mixing zone section may be coated with a reactive agent and/or a catalyst;

(F) an inner surface of the film forming section may be coated with a reactive agent and/or a catalyst;

(G) the device may be suitable to provide a high-shear core gas flow and a liquid sheath flow, comprising a first and a final liquid, on an inner surface of the mixing zone section.

In a second aspect of the invention, there is provided a method of using a constant shear continuous reactor device according to the first aspect of the invention and any technically sensible combination of its embodiments, which method comprises:

(a) providing a gas, a first liquid and a final liquid, each liquid comprising a reactant and/or a reagent; and (b) supplying the gas, the first liquid and final liquid to the reactor device by way of the gas inlet, the first liquid inlet and final liquid inlet, respectively; and (c) mixing at least the first and final liquids together to form a reaction mixture that reacts to provide a reaction product mixture and collecting the reaction product mixture upon exit from the reactor outlet of the reactor device, wherein the gas is supplied at a sufficient velocity to provide a high-shear force on the first and final liquids and to generate a gas core region in the reactor device, such that the first and final liquids combine on a surface of the mixing zone section of the reactor device to form a liquid film mixture with annular flow, which liquid film mixture has a thickness that is from 0.1% to 10%, such as from 0.5% to 5%, such as from 1% to 2.5% of an inner diameter of the mixing zone section and reactor outlet of the annular reactor wall tube.

In embodiments of the second aspect of the invention:

(aa) the gas may be supplied at a flow rate of from 0.1 to 100 L/min, such as from 0.3 to 50 L/min, such as from 0.4 to 3 L/min;

(ab) the first and final liquids may be supplied at a flow rate of from 0.1 to 1 L/min, such as from 0.1 to 500 mL/min, such as from 1 to 200 mL/min, such as from 4 to 15 mL/min;

(ac) the reaction product may be a 2-D material, optionally wherein (ia) the gas is an inert gas or air, the first liquid is an aqueous solution of magnesium nitrate hexahydrate and aluminium nitrate nonahydrate and the final liquid is an aqueous solution of NaOH and $Na_2CO_3$, where the reaction product mixture comprises the 2-D material hydrotalcite nanoplatelets as the reaction product; or (ib) the gas is an inert gas or air, the first liquid is a solution of copper nitrate in a solvent comprising a 1:1 mixture by volume of dimethylformamide and acetonitrile and the final liquid is a solution of triethylamine and 1,4-benzene dicarboxylic acid in a solvent comprising a 1:1 mixture by volume of dimethylformamide and acetonitrile, where the reaction product is a 2-D metal-organic framework of copper and 1,4-benzene dicarboxylic acid, optionally wherein the 2-D metal-organic framework of copper and 1,4-benzene dicarboxylic acid is removed from the reaction mixture and placed in methanol and left to age for a period of time to provide a β-form of the 2-D metal-organic framework of copper and 1,4-benzene dicarboxylic acid, which has characteristic 2θ powder x-ray diffraction peaks at 8.26°, 16.57°, 19.69° and 16.06°;

(ad) the first and final liquids may be delivered to the reactor device with the same flow rate;

(ae) the gas may comprise a reactant or reagent in gaseous form.

In a third aspect of the invention, there is provided a β-form of a 2-D metal-organic framework of copper and 1,4-benzene dicarboxylic acid, which has characteristic 2θ powder x-ray diffraction peaks at 8.26°, 16.57°, 19.69° and 16.06°.

In a fourth aspect of the invention, there is provided a reactor system comprising two or more constant shear continuous reactor devices as described in the first aspect of the invention and any technically sensible combination of its embodiments arranged to run in parallel.

In a fifth aspect of the invention, there is provided a method of forming a 2-D material using a constant shear continuous reactor device, the reactor device comprising:

an annular gas delivery tube comprising a gas inlet and a gas outlet;

an annular reactor wall tube comprising a liquid inlet, a mixing zone section and a reactor outlet, where the annular reactor wall tube is arranged concentrically around the annular gas delivery tube along a common axis, where:

the reactor outlet is located at a downstream position relative to the mixing zone section; and the mixing zone section and reactor outlet of the annular reactor wall tube has an inner diameter of from 100 nm to 53 mm, said method comprising the steps of:

(i) providing a gas and a liquid, the liquid comprising a reactant and/or a reagent; and (ii) supplying the gas and liquid to the reactor device by way of the gas inlet and liquid inlet, respectively;

(iii) mixing at least the gas and liquid together to provide a reaction product mixture that comprises a 2-D material and collecting the reaction product mixture upon exit from the reactor outlet of the reactor device, wherein:

(a) when the gas is an inert gas or air, then an inner surface of the mixing zone section is coated and/or impregnated with one or more of a catalyst, a reactant and a reagent and the gas is supplied at a sufficient velocity to provide a high-shear force on the liquid, such that a liquid film with annular flow is formed on a surface of the mixing zone section of the reactor device, thereby allowing interaction between the reactants and/or reagents in the liquid with the one or more of a catalyst, a reactant and a reagent coated and/or impregnated on the inner surface of the mixing zone section to form a product, which liquid film has a thickness that is from 0.1% to 10%, such as from 0.5% to 5%, such as from 1% to 2.5% of an inner diameter of the mixing zone section and reactor outlet of the annular reactor wall tube;

(b) when the gas comprises a reactant or reagent, then the gas is supplied at a sufficient velocity to provide a high-shear force on the liquid, such that a liquid-gas film mixture with annular flow is formed on a surface of the mixing zone section of the reactor device to form a product, which liquid-gas film mixture has a thickness that is from 0.1% to 10%, such as from 0.5% to 5%, such as from 1% to 2.5% of an inner diameter of the mixing zone section and reactor outlet of the annular reactor wall tube; or (c) when the gas comprises a reactant or reagent and the mixing zone section is coated and/or impregnated with one or more of a catalyst, a reactant and a reagent, then the gas is supplied at a sufficient velocity to provide a high-shear force on the liquid, such that a liquid-gas film mixture with annular flow is formed on a surface of the mixing zone section of the reactor device, thereby allowing interaction between the reactants and/or reagents in the liquid-gas film mixture with the one or more of a catalyst, a reactant and a reagent coated and/or impregnated on the surface of the mixing zone section to form a product, which liquid-gas film mixture has a thickness that is from 0.1% to 10%, such as from 0.5% to 5%, such as from 1% to 2.5% of an inner diameter of the mixing zone section and reactor outlet of the annular reactor wall tube; or (d) when the gas is an inert gas or air, then the gas is supplied at a sufficient velocity to provide a high-shear force on the liquid, such that a liquid-gas film mixture with annular flow is formed on a surface of the mixing zone section of the reactor device to form a product, which liquid-gas film mixture has a thickness that is from 0.1% to 10%, such as from 0.5% to 5%, such as from 1% to 2.5% of an inner diameter of the mixing zone section and reactor outlet of the annular reactor wall tube.

DRAWINGS

FIG. 1 Depicts a schematic of the axial cross section of: (a) the annular microreactor 100; and (b) 100 in operation, where 110, 120 and 130 are the three coaxial tubes, and regions 114 and 134 are the annular flow regions created by the flow of the gas phase 115 (arrows). In 134, mixing of the liquid phases 135 and 140 occurs.

FIG. 2 Depicts annular reactor mixing dynamics: (a) predicted and measured characteristic micromixing times using the Villermaux-Dushman test reaction; (b) high speed laser-induced fluorescence (LIF) microscopy frames of mixing in region 134. At top is half of the axial cross-section, where tube 120 and 130 are highlighted, showing chaotic mixing over 1 mm. At bottom are snapshots of vortices along the length of the reactor, which are initially generated at the edge of 120 (scale bar=10 μm); and (c) measurements and model predictions of macromixing time (top) and film thickness (bottom) in region 134 as a function of shear rate. The mixing time calculated from LIF microscopy measurements (F) is compared to mixing times from the Villermaux-Dushman test reaction (VD), and predictions from the engulfment mixing model (E).

FIG. 3 Depicts the LDH size, shape and crystallinity at different shear rates: (a) AFM phase maps of nanoplatelets and aggregates synthesised at increasing shear rates, showing variations in shape (scale bar=50 nm); (b) trends of individual particle aspect ratios (AR) plotted against height (H) and shear rate; and (c) aspect ratio (at a thickness of 3.85 nm) and crystallite size plotted shear rate.

FIG. 4 Depicts the powder XRD spectrum of the LDH, synthesised using the annular microreactor 100, with characteristic hydrotalcite peaks at 2θ=11.5°, 22.9° and 61.8°, corresponding to the (003), (006), and (110) reflections.

FIG. 5 Depicts the HRTEM images of the as-synthesised LDH nanoplatelets: (a) initial characterisation of two attached primary nanoparticles, 8 nm in diameter, synthesised at $4.11 \times 10^5$ s$^{-1}$. The magnified and Fourier transformed crystalline domains in (i) and (ii) show hexagonal lattices with spacing consistent with the [100] interlayer distance. Alignment of the fringe and FFT indicate epitaxial alignment of the two structures. Scale bars are 10 nm (main) and 1 nm (i and ii); (b) subsequent characterisation of particles approximately 5 nm in diameter with high crystallinity on a SiO substrate, synthesised at $4.11 \times 10^5$ s$^{-1}$ (left). Highlighted crystalline domain (upper right) and corresponding Fourier transform (lower right) show lattice spacing of 0.23 nm, indicative of the (015) reflection. Scale bars are 2.5 nm (left) and 0.5 nm (upper right); (c) subsequent characterisation of uniform and crystalline particles synthesised at $4.11 \times 10^5$ s$^{-1}$, approximately 5 nm in diameter aligned on a SiO substrate (left). Highlighted crystalline domain (upper right) and corresponding Fourier transform (lower right) show lattice spacings of 0.26 and 0.2 nm, indicative of the (101) and (018) reflections, respectively. Scale bars are 5 nm (left) and 0.5 nm (upper right); (d) a nanoplatelet, 7 nm in diameter, synthesised at $3.16 \times 10^6$ s$^{-1}$. Fourier transforms of the outlined crystal domains (i), (ii), and (iii) indicate variation in the position of the (015) peak and crystallographic orientation. Scale bar is 5 nm (left); and (e) mesocrystalline structure in a large aggregate (left), with highlighted crystalline domain (upper right). Scale bars are 10 nm (left) and 1 nm (upper right). Interlayer stacking between particles is approximately 0.8 nm, indicative of the (003) plane. Corresponding Fourier transform (lower right) also shows a peak indicative of the (015) plane.

FIG. 6 Depicts the oriented attachment of LDH nanoparticles, observed via LTEM: (a) LTEM frames showing the oriented aggregation of hexagonal particles (outlined). Scale bar is 10 nm; and (b) the left panel shows the angular orientation θ and distance d between facets of attachment for the aggregation event observed from 1:34 to 3:23 (m:s), where lines are added to guide the eye. The right shows a schematic illustrating the measurements of θ and d.

FIG. 7 Depicts LTEM frames showing the assembly and oriented attachment of ~5 nm particles in a pentagonal configuration: (a) at the start of imaging; (b) 43 seconds into imaging when the two far left particles attach; (c) after about 1.5 minutes when three particles in the pentagonal configuration attach; and (d) after 3 minutes of imaging when two other particles in the pentagonal configuration attach, resulting in three closely spaced but unattached particles. Outlines of the particles are provided for guidance. Scale bars are 15 nm.

FIG. 8 Depicts attachment of particles in static and flowing conditions: (a) the top panels show particles aggregating in static liquid (scale bar=10 nm), while the bottom show particles aggregating in bubble-driven flow (scale bar=20 nm). Particles of interest and their interparticle distance are outlined; and (b) a plot of the approach velocity against interparticle distance in flow and static fluids, indicating accelerated aggregation in flow.

FIG. 9 Depicts the TEM and LTEM images of various aggregates: (a) fractal aggregates in static LTEM (left) and normal TEM on a carbon film (upper and lower right). Scale bar=100 nm; (b) 2D fractal aggregates formed in flow LTEM (left and right). Scale bar=25 nm; and (c) dense crystalline aggregates in static LTEM (left) and normal TEM (right). Scale bar=100 nm.

FIG. 10 Depicts the LTEM images of an aggregate annealing over time. Initial aggregate structure (left) at the start of imaging, and the final aggregate structure (right) 2.3 minutes after imaging. Scale bar=10 nm.

FIG. 11 Depicts: (a) relative frequency f distributions of particle areas and calculated side lengths a measured in LTEM. Deconvoluted peaks are shown in the area distribution at $3.2 \times 10^6$ s$^{-1}$; and (b) crystal structure of a monolayer primary particle with a side length of 2.14 nm, determined from the spacing of peaks at $3 \times 10^6$ s$^{-1}$.

FIG. 12 Depicts a schematic of crystallisation processes under increasing shear rate. At low shear rates (left), nucleation and surface growth occur simultaneously, after which polydisperse primary particles aggregate in a disordered fashion, leading to polycrystalline aggregates. At higher shear rates (middle), enhanced mixing leads to the segregation of nucleation and surface growth, after which monodisperse particles align into ordered crystalline aggregates. Above a critical shear rate (right), oriented aggregation is the dominant growth process, leading to a polydisperse population of primary particles that form polycrystalline aggregates FIG. 13 Depicts the AFM images of over-sonicated LDH. AFM height maps of LDH before (left) and after 30 minutes of sonication (right). Scale bar=100 nm.

FIG. 14 Depicts the HRTEM images of LDH after over-irradiation. HRTEM image (left) of over-irradiated LDH, exhibiting cubic crystallinity following LDH decomposition in the outlined section (upper right), with the corresponding Fourier transform (lower right). Scale bars are 10 nm (left) and 1 nm (upper right).

Figure 18:
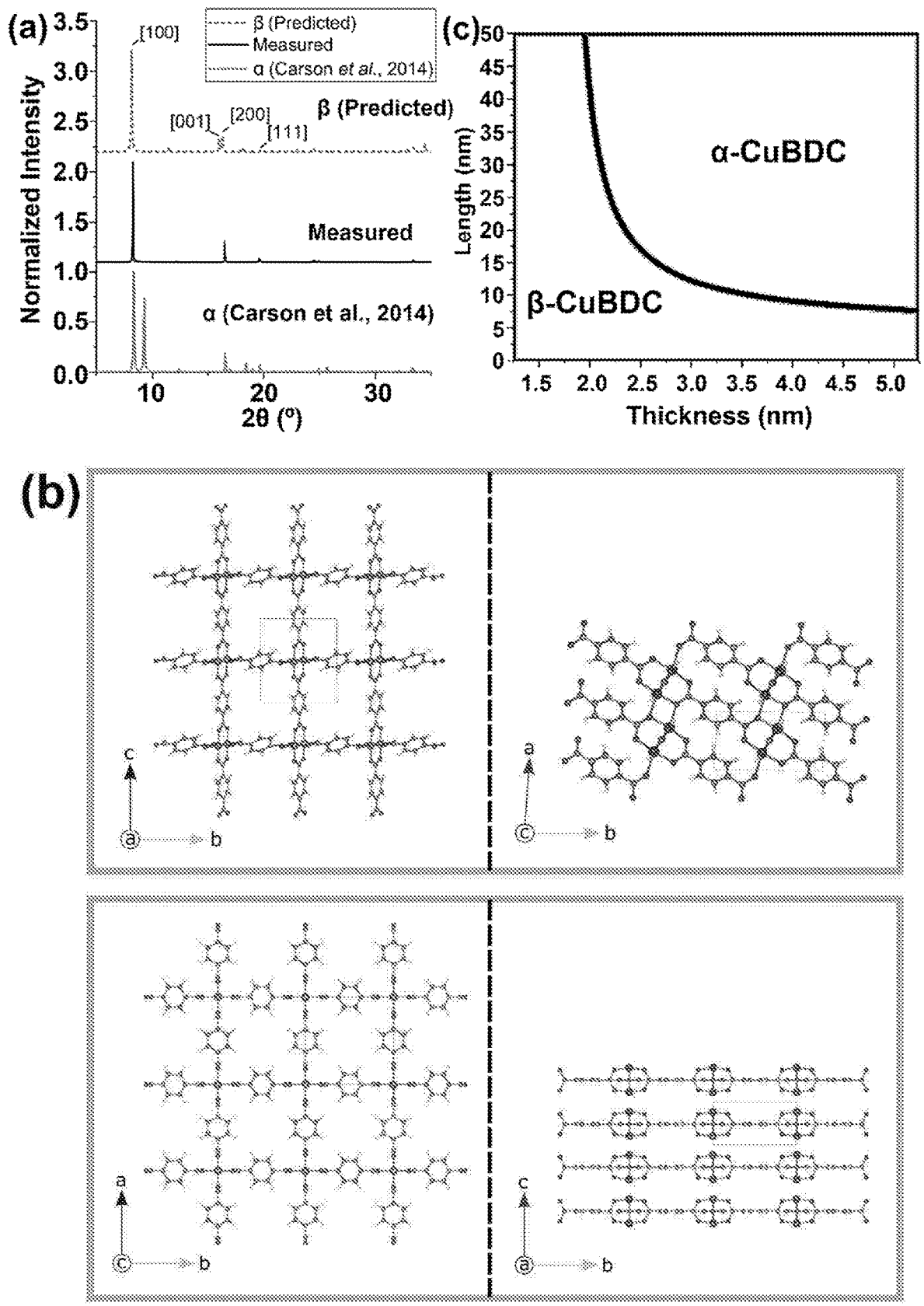

FIG. 18 Depicts: (a) comparison of α-CuBDC, measured, and predicted β-CuBDC powder XRD patterns. Characteristic reflections of the (100), (200), (001) and (111) planes of the predicted powder pattern are displayed; (b) crystal lattice structure of β-CuBDC (top) and α-CuBDC (bottom), viewed perpendicular and parallel to the direction of stacking (left and right respectively); and (c) phase diagram as a function of particle length and thickness generated by electronic surface and bulk energy differences calculated via DFT.

Figure 19:
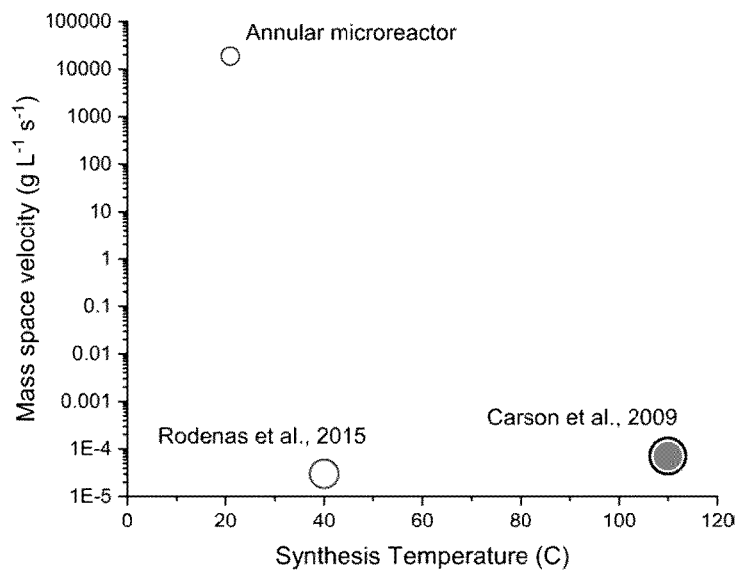

FIG. 19 Depicts a comparison of mass-space-velocity and synthesis temperature between previous batch methods and the reported continuous method (Rodenas, T., et al., *Nat. Mater.*, 2015, 14, 48-55; Carson, C. G., et al., *Eur. J. Inorg. Chem.*, 2009, 2338-2343).

Figure 20:
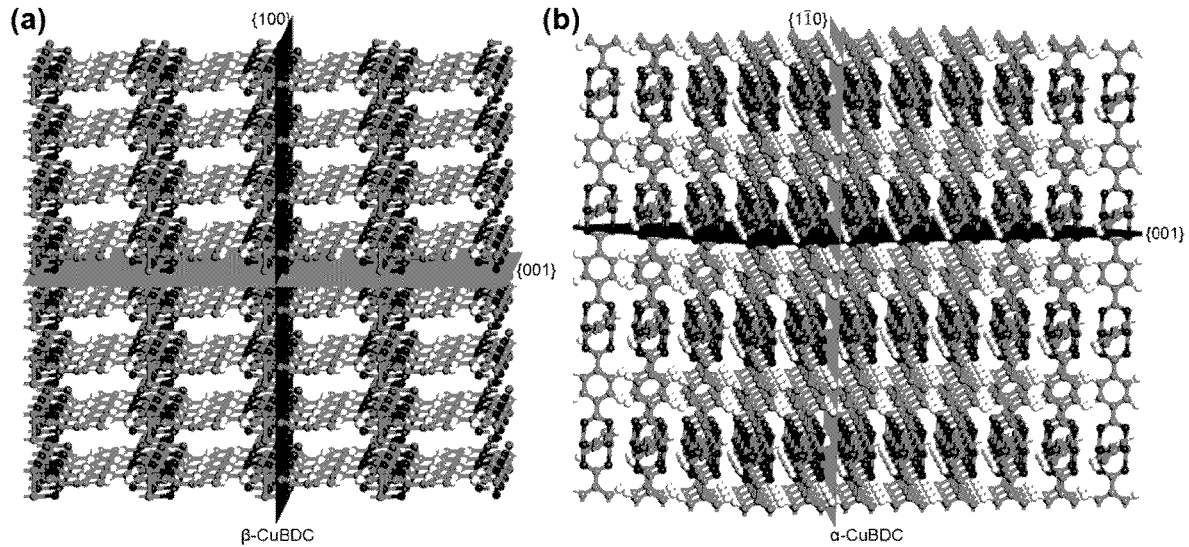

FIG. 20 Depicts the crystal structure of: (a) β-CuBDC; and (b) α-CuBDC. The cleavage planes considered for the surface energy calculations are also shown in each case.

Figure 21:
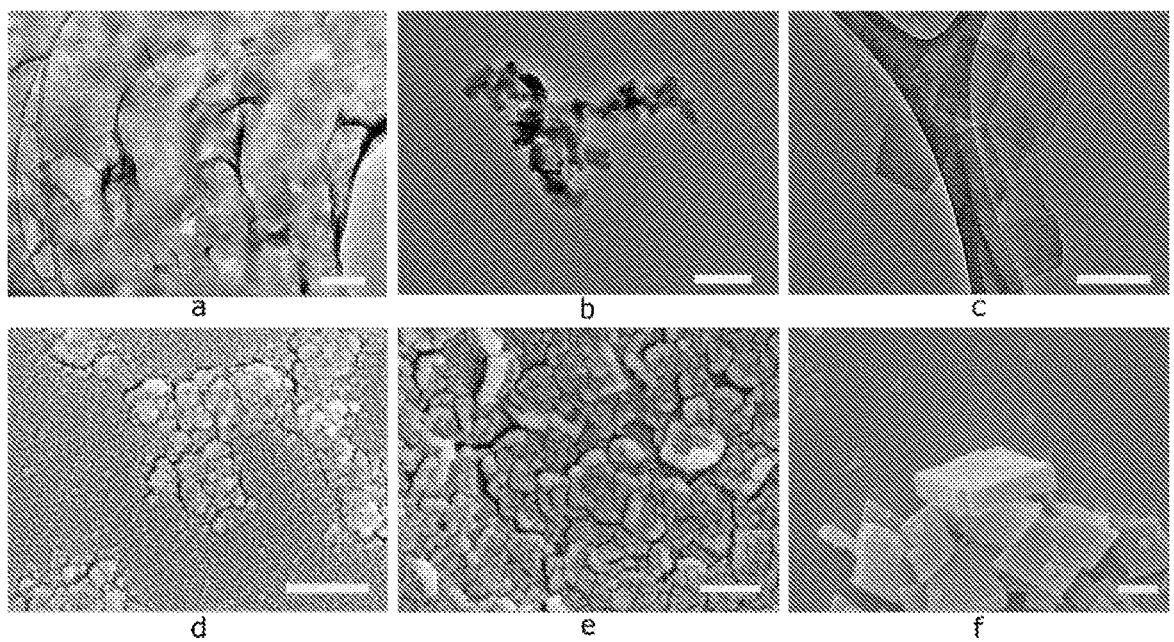

FIG. 21 Depicts: the TEM images of (a) CHCl$_3$-CuBDC, (b) DMF-CuBDC, and (c) MeOH-CuBDC; and SEM images of (d) CHCl$_3$-CuBDC, (e) DMF-CuBDC, and (f) MeOH-CuBDC. Scale bar=200 nm.

Figure 22:
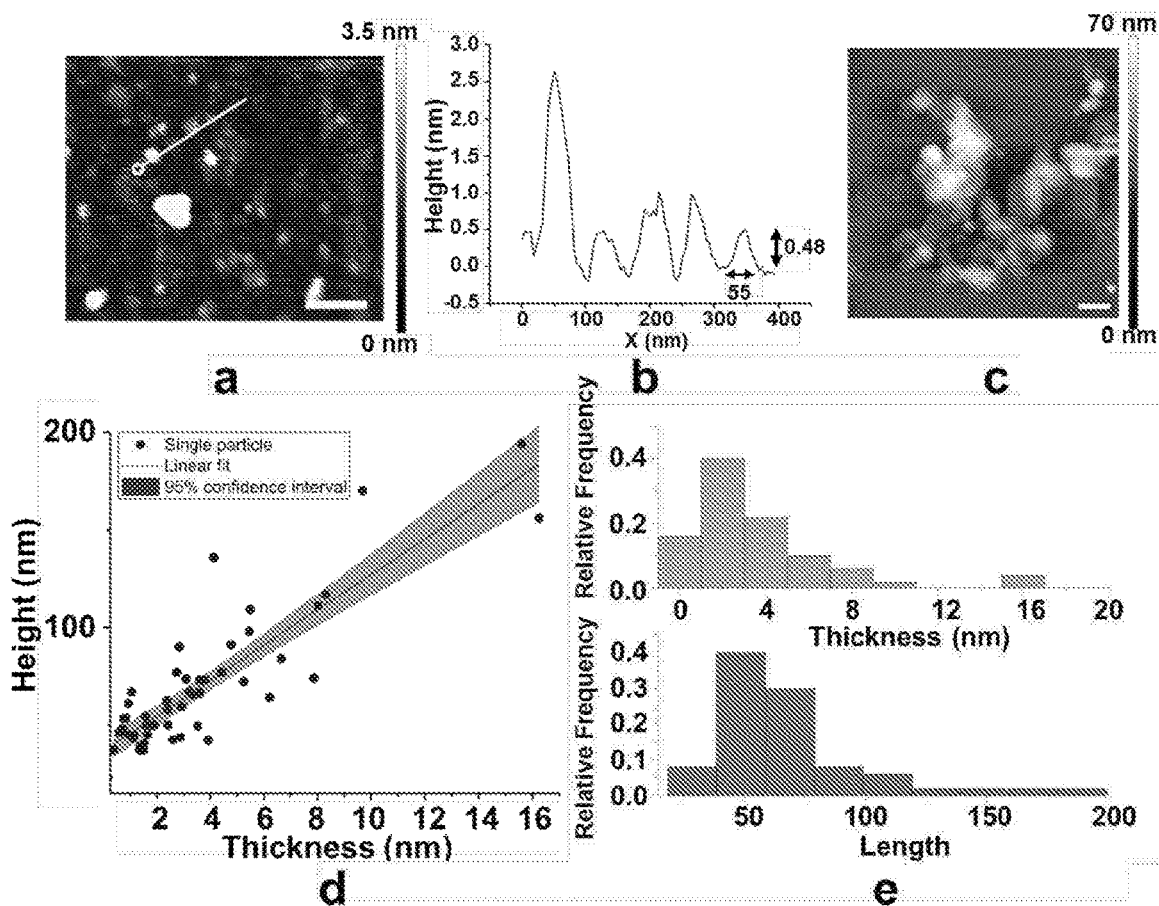

FIG. 22 Depicts: the AFM height maps of (a) DMF-CuBDC, with a cross-section displayed in (b), and (c) MeOH-CuBDC. Scale bar=200 nm; (d) relationship between the length and thickness of single particles of dropcast MeOH-CuBDC. A linear regression yields the relationship Length=36.7 nm+9.1*Thickness ($R^2$=0.75); and (e) particle size distribution of length and thickness of dropcast MeOH-CuBDC.

Figure 23:
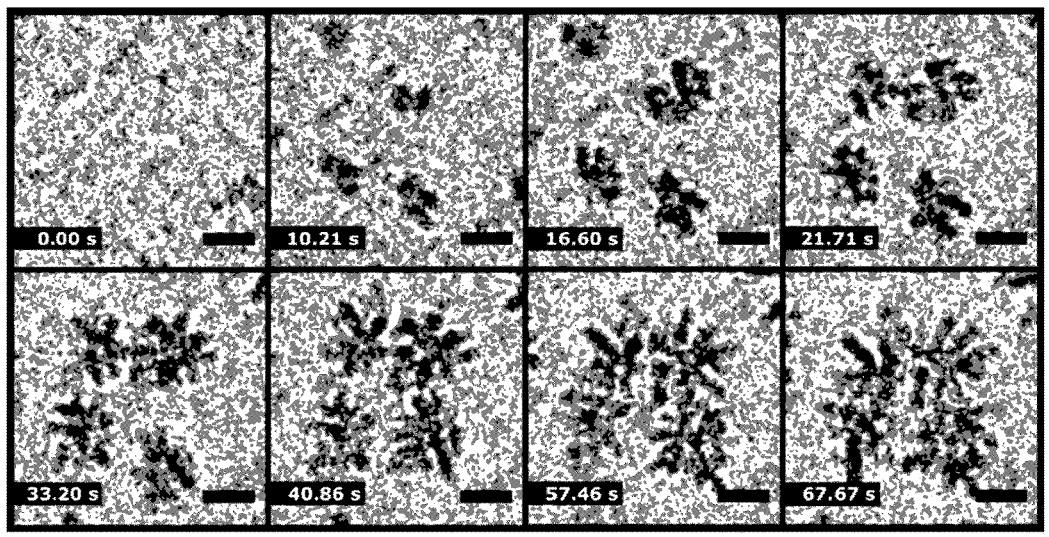
Figure 23:
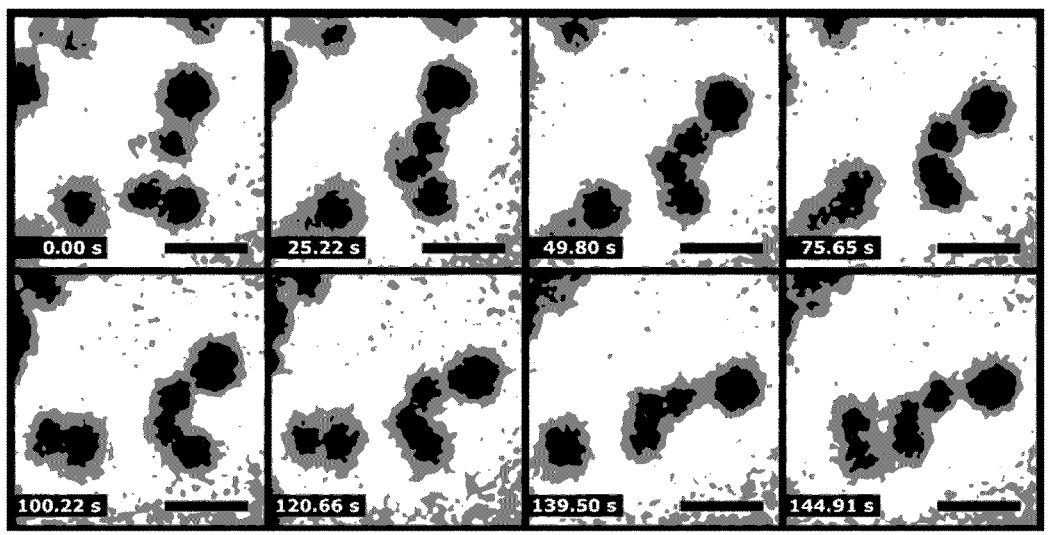
Figure 23:
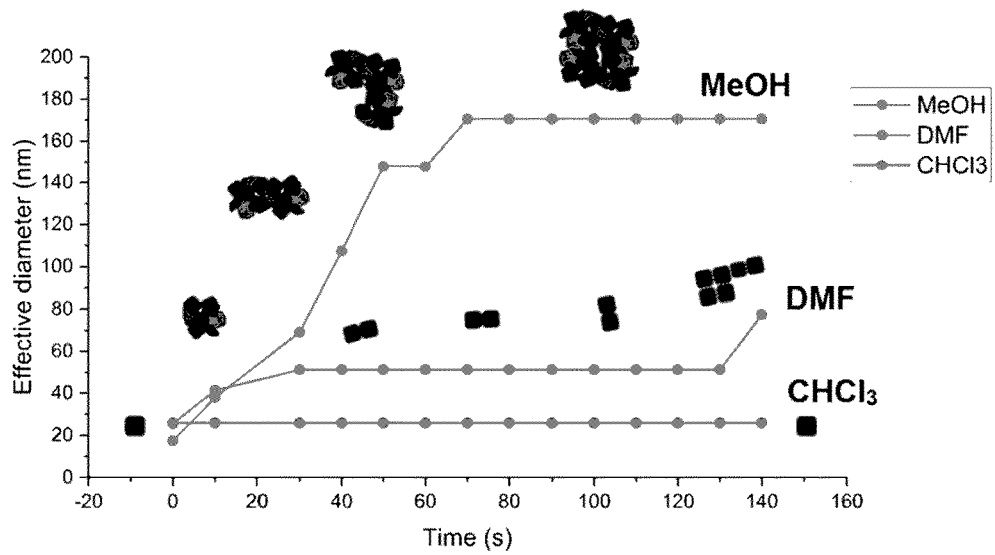

FIG. 23 Depicts the LTEM frames showing the oriented attachment of 2D-CuBDC particles over time in: (a) MeOH; and in (b) DMF (Scale bar=50 nm). The increase in size over time for individual aggregates in different solvents over time is plotted in (c).

Figure 24:
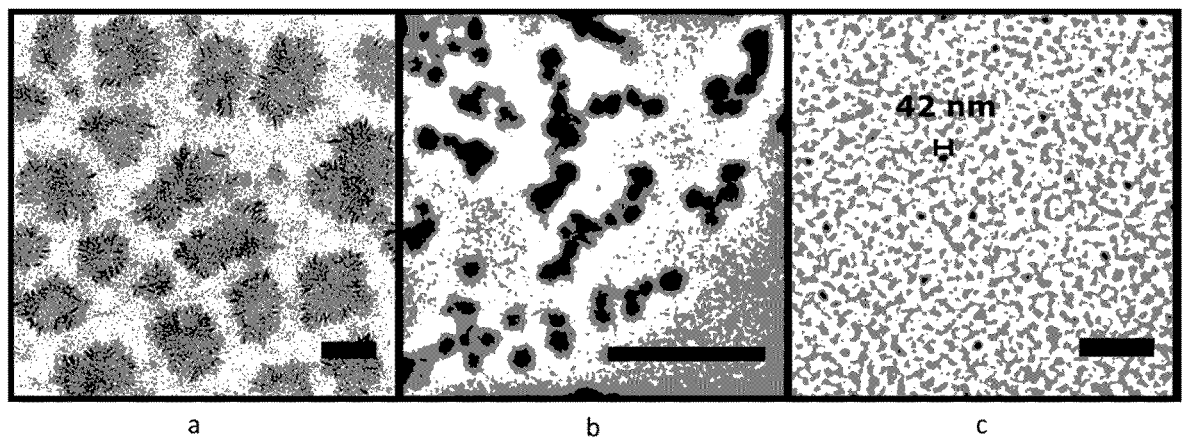

FIG. 24 Depicts the CuBDC aggregates formed in LTEM in suspensions rinsed in: (a) MeOH; (b) DMF; and (c) CHCl$_3$. Scale bar=200 nm.

Figure 25:
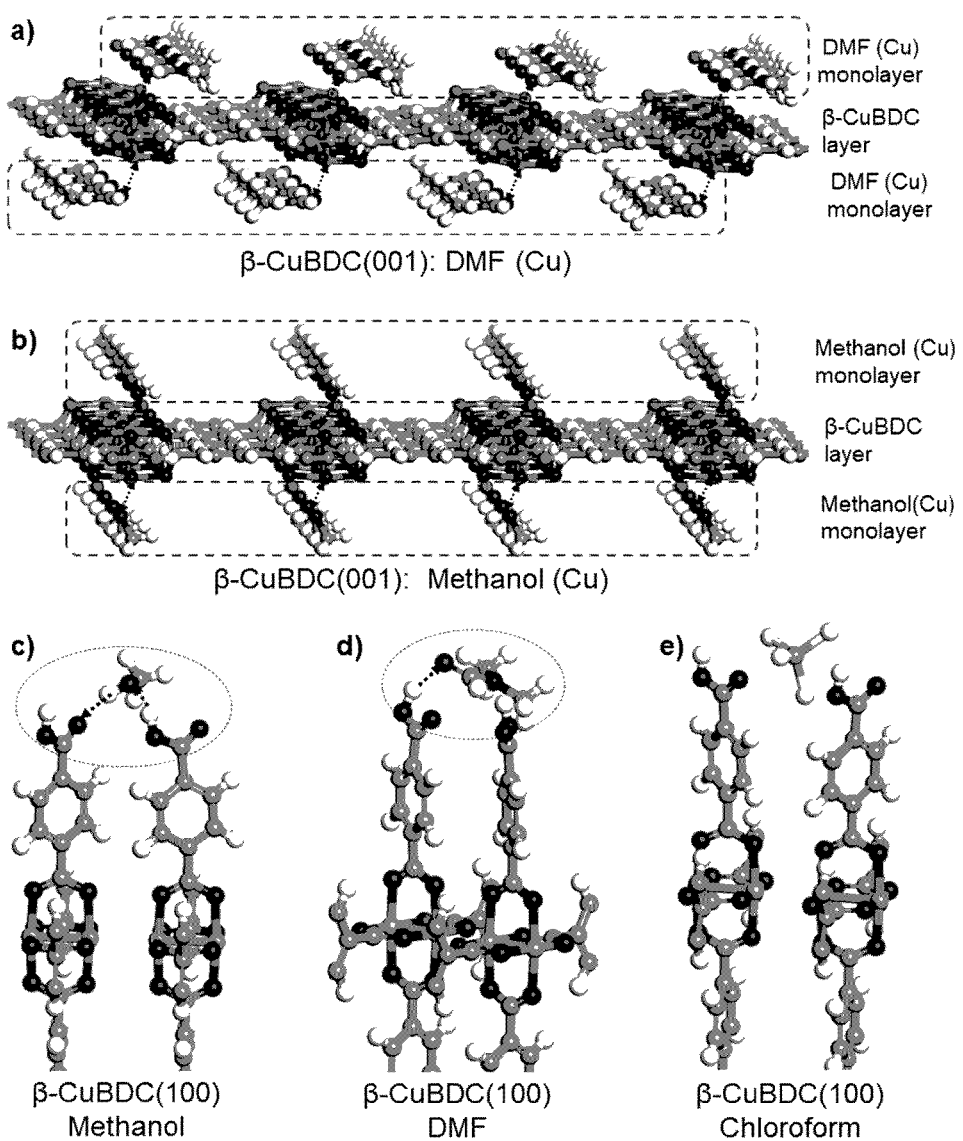

FIG. 25 Depicts the interaction of solvents MeOH, DMF and CHCl$_3$ with β-CuBDC: (a) a monolayer of DMF on either surface of β-CuBDC(001) surface interacting with the exposed Cu atoms; (b) a monolayer of methanol on either surface of β-CuBDC(001) surface interacting with the exposed Cu atoms; (c) methanol interacting with the COOH groups of β-CuBDC(100) surface through donor-acceptor kind of hydrogen bonds; (d) DMF interacting with the COOH groups of β-CuBDC(100) surface through acceptor kind of hydrogen bond; and (e) weak interaction of chloroform with the COOH groups of β-CuBDC(100) surface.

Figure 26:
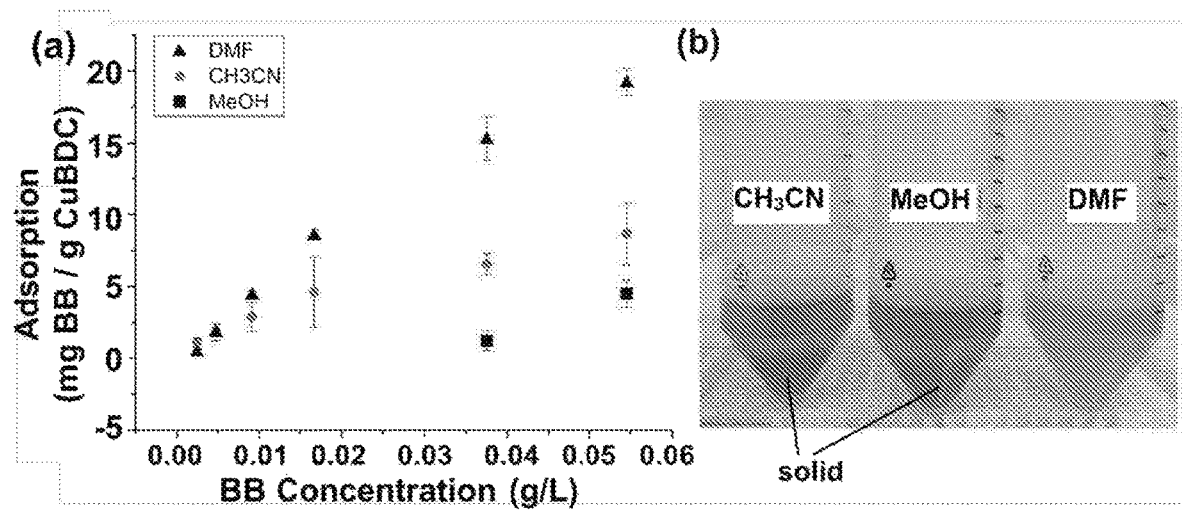

FIG. 26 Depicts: (a) the isothermal adsorption curves of Brilliant Blue R (BB) incubated with CuBDC in DMF, CH$_3$CN and MeOH. Adsorption of BB in MeOH below 0.02 g/L was below the detection limit. Error bars represent standard deviations; and (b) photograph of CuBDC suspensions at rest, showing that CuBDC will aggregate and settle in CH$_3$CN and MeOH, but remains as a stable dispersion in DMF.

DESCRIPTION

It has been surprisingly found that a scalable microreactor that provides fine control of shear rate and other hydrodynamic factors can be used to form 2-D materials from one or more liquids (e.g. 5, 4, 3, or particularly 2 liquids), each liquid containing one or more reactants and reagents suitable for the formation of the desired 2-D material. Thus, there is provided a constant shear continuous reactor device, comprising:

an annular gas delivery tube comprising a gas inlet and a gas outlet;

a first annular liquid delivery tube comprising a first liquid inlet and a first liquid outlet arranged concentrically around the annular gas delivery tube along a common axis, where the first liquid outlet is located at a downstream position relative to the gas outlet or is coterminous with the gas outlet; and an annular reactor wall tube comprising a final liquid inlet, a mixing zone section and a reactor outlet, where the annular reactor wall tube is arranged concentrically around the first annular liquid delivery tube along the common axis, wherein:

the mixing zone section is located at a downstream position relative to the gas outlet and the first liquid outlet;

the reactor outlet is located at a downstream position relative to the mixing zone section; and the mixing zone section and reactor outlet of the annular reactor wall tube has an inner diameter of from 100 nm to 53 mm.

As will be appreciated, the reactor device is designed as a flow reactor, such that the reactants and reagents enter through the respective inlets, mix together (as a liquid film mixture) for sufficient time to produce the desired product along the length of the reactor (i.e. along the length of the mixing zone section), with the reaction product mixture then exiting the reactor outlet. Therefore, in principle, the reactors device can operate indefinitely, provided that it is provided with sufficient reactants and reagents. Such, reactor devices are typically known as continuous flow reactors.

The above-described reactor is a scalable microreactor that can provide a high shear microfluidic environment with microsecond mixing that is generated using a two-phase annular flow, which is possible due to the geometry of the reactor. As noted above, as the device is a microreactor device, the device has a maximum inner diameter for the mixing zone section and reactor outlet of the annular reactor wall tube of from 100 nm to 53 mm. For example, the inner diameter of the mixing zone section and reactor outlet of the annular reactor wall tube may be from 1 μm to 2.5 mm, such as from 50 μm to 2 mm, such as 100 pm to 1.5 mm. As will be appreciated, any suitable material may be used for the tubes described herein, such as a polymeric material or a glass (e.g. quartz).

As an example of a non-limiting embodiment, the reactor device described herein may comprise three quartz tubes having inner and outer diameters of 0.30×0.40, 0.50×0.70, and 1.00×1.20 mm, placed in a staggered, coaxial configuration. Suitable lengths for such tubes include from 100 mm for the tubes having inner diameters of 0.30 and 0.50 mm and from 100 mm to 300 mm for the tube having an inner diameter of 1.00 mm. In this configuration, a high velocity gas may be pumped through the innermost tube, with liquid reagent streams through the two outer tubes, creating regions of two-phase annular flow. The mixing region forms by the collision and hydrodynamic focusing of two liquid annular flows (as will be appreciated, if more tubes are provided to allow further liquids to enter the device, then the number of annular flows may increase correspondingly), which then stabilise into a wavy annular thin film. The shear rate $\dot{\gamma}$ in an annular thin film approaches a constant value as the film thickness decreases. The shear rate may be determined from the film thickness and velocity (or gas and liquid flowrates). In such an example system, the mixing time of the reactants and reagents may be from 10 to 1,000 μs, such as from 50 to 500 μs, such as 288 μs.

In embodiments herein, the word "comprising" may be interpreted as requiring the features mentioned, but not limiting the presence of other features. Alternatively, the word "comprising" may also relate to the situation where only the components/features listed are intended to be present (e.g. the word "comprising" may be replaced by the phrases "consists of" or "consists essentially of"). It is explicitly contemplated that both the broader and narrower interpretations can be applied to all aspects and embodiments of the present invention. In other words, the word "comprising" and synonyms thereof may be replaced by the phrase "consisting of" or the phrase "consists essentially of" or synonyms thereof and vice versa.

An annular microreactor of the kind described above is depicted in the embodiment of FIG. 1. The reactor 100 of this embodiment has three separate tubes, 110, 120 and 130 arranged along a single central axis. The innermost tube 110 acts as the annular gas delivery tube, which has a gas inlet 111 and a gas outlet 112 connected by a tubular wall 113. The tube 120 concentrically surrounding the innermost tube 110 acts as the first annular liquid delivery tube, which tube has a first liquid inlet 121 and a first liquid outlet 122 connected by a tubular wall 123. The tube 130 concentrically surrounding both the intermediate 120 and innermost tube 110 acts as the annular reactor wall tube, which tube has a final liquid inlet 131 and a reactor outlet 132 connected by a tubular wall 133, which is the reactor wall. As shown, tubes 110, 120 and 130 are orientated along a common axis, so that the inlets 111, 121 and 131 and outlets 112, 122 and 132 are aligned to allow the ingress, mixing and expulsion of the respective fluids in a direction parallel with the common axis.

Each of the gas inlet 111, the first liquid inlet 121 and final liquid inlet 131 can be connected, respectively, to a suitable gas source, a suitable first liquid and a suitable final liquid, which gas and liquids are selected to provide a desired reaction product. The configuration shown in FIG. 1b is suitable for the mixing of two liquids because it contains two liquid inlets 121 and 131. In alternative embodiments of the invention, the reactor may further comprise additional annular tubes (each having a liquid inlet and a liquid outlet) between the first annular liquid delivery tube 120 and the annular reactor wall tube 130 to provide further liquids for inclusion in the mixing and reaction, as required by the material to be manufactured. From one to five additional annular liquid delivery tubes may be present in these alternative embodiments of the invention.

As depicted in FIG. 1b, the reactor outlet 132 of the annular reactor wall tube 130 longitudinally extends further along the common axis than the first liquid outlet 122 and gas outlet 112. In other words, the reactor outlet 132 of the annular reactor wall tube 130 is located at a downstream position relative to the gas outlet 112 and the first liquid outlet 122. Given this arrangement, the reactor wall extending beyond the first liquid outlet 122 forms a mixing zone section 134 on the inner surface of the reactor wall 133, which section enables the mixing of first and final liquids to form a liquid film mixture, as will be discussed in more detail below. In this embodiment, the first liquid outlet 122 longitudinally extends further along the common axis than the gas outlet 112 and so it is located at a downstream position relative to the gas outlet 112, thereby providing a liquid film forming section 114 on an inner surface of the first annular liquid delivery tube, which section enables the formation of a first liquid film, as will be discussed in more detail below.

In certain embodiments, the surface of the mixing zone section 134 and/or the liquid film forming section 114 may be coated and/or impregnated with a reactive agent and/or catalyst, if so required to form the desired reaction product.

In an alternative embodiment, the outlets of the gas outlet 112 and the first liquid outlet 122 may be coterminous, in which case no liquid film forming section is formed. However, in this configuration, the reactor outlet 132 is still located at a location downstream relative to the gas outlet 112 and the first liquid outlet 122 and so there remains a mixing zone section 134.

In embodiments of the invention where further annular liquid delivery tubes are present (arranged concentrically, from the innermost first annular liquid delivery tube to outermost $n^{th}$ annular liquid delivery tube, which is surrounded in turn by the annular reactor wall tube 133), any suitable configuration may be adopted. That is, the outlet of each additional annular liquid delivery tube may be coterminous with the outlet of the tube that it directly surrounds (i.e. the next innermost tube) or it may be downstream relative to the outlet of the next innermost tube. In the latter case, the tubular wall of the outer tube may act as a further mixing zone section that enables the mixing of the liquids contained in the outer tube and each of the inner tubes that it surrounds, whether directly or indirectly. For example, when there is a first to third annular liquid delivery tube, the third annular liquid delivery tube directly surrounds the second annular liquid delivery tube and indirectly surrounds the first annular liquid delivery tube, which is directly surrounded by the second annular liquid delivery tube. In this example, when the third annular liquid delivery tube has its outlet located at a position downstream to the outlets of the first and second annular liquid delivery tubes and the second annular liquid delivery tube has its outlet located downstream of the outlet of the first annular liquid delivery tube, then two further mixing zone sections are created. As will be appreciated, in this example, the annular reactor wall tube directly surrounds the third annular liquid delivery tube. In certain embodiments of the invention, the surfaces of one or more of these mixing zone sections and/or the liquid film forming section may be coated and/or impregnated with a reactive agent and/or catalyst, if so required to form the desired reaction product.

The downstream location of the annular reactor wall tube outlet relative to the first (or $n^{th}$) annular liquid delivery tube outlet should be sufficient to enable establishment of an annular mixed liquid comprising all of the liquid components supplied to the reactor through the various liquid inlets and to complete the desired reaction. The exact length of the reactor tube wall that extends past the last annular liquid delivery tube outlet to the reactor outlet may be determined readily by the skilled person based on the principles discussed herein and by routine experimental work.

As will be appreciated, the geometric arrangement of the inlets is not particularly important. That is, the important factor is the arrangement of the outlets, whether coterminous with one another (for the annular gas delivery tube and first to $n^{th}$ liquid annular liquid delivery tubes) or downstream relative to the outlet(s) of the tube(s) that it surrounds (e.g. the annular reactor outlet or the first annular liquid delivery tube).

Figure 1:
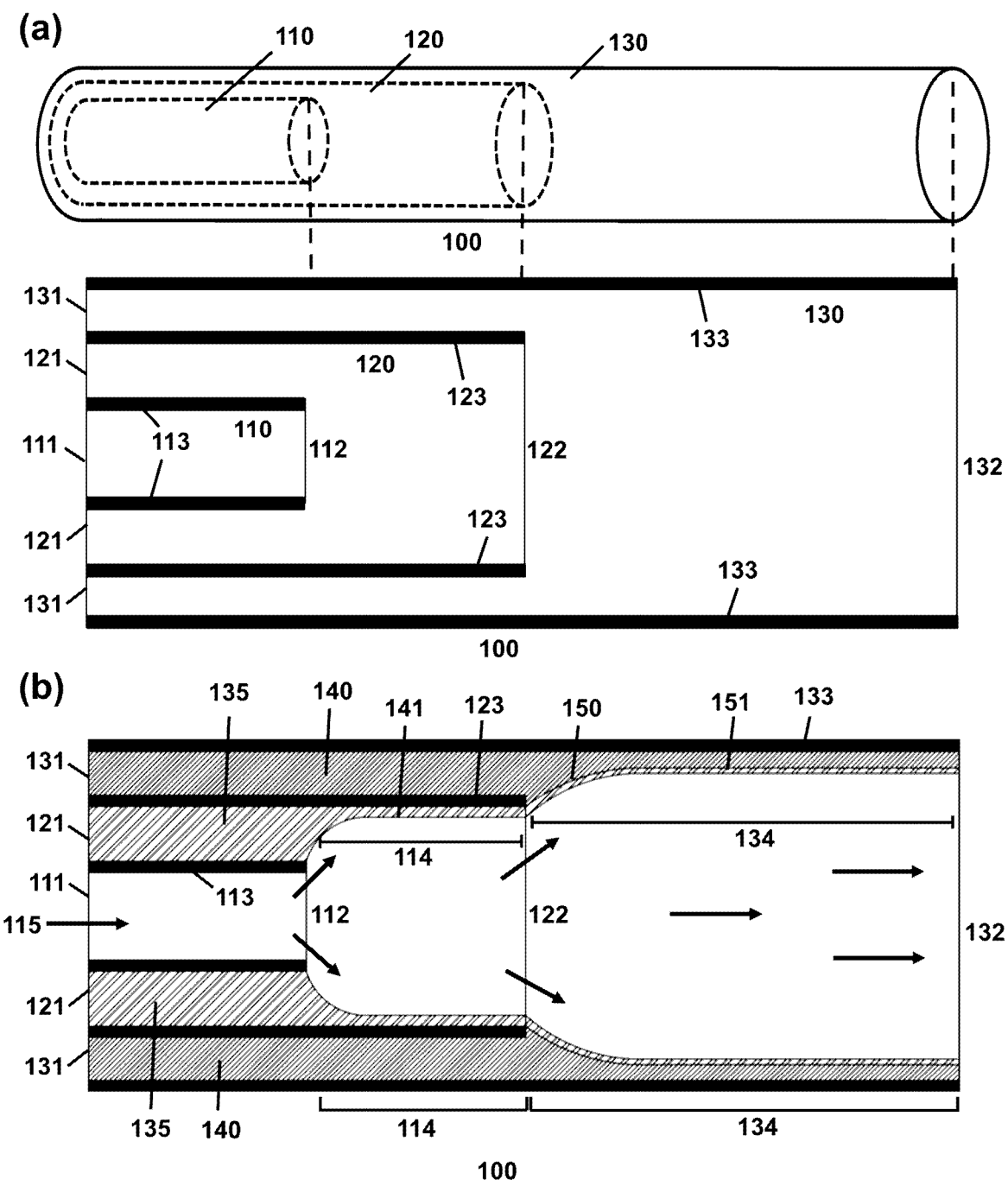

The constant shear continuous reactor device depicted in FIG. 1b may also include a means or apparatus that controls the flow rates of a gas 115 through the gas inlet 111, a first liquid 135 through the first liquid inlet 121 and a final liquid 140 through the final liquid inlet 131, such that an annular flow 151 of a liquid film mixture 150 comprising the first and final liquids is formed in the mixing zone section of the reactor. Additionally, as the embodiment of FIG. 1 b also contains a liquid film forming section 114, the means or apparatus that controls the flow rates of the gas, the first liquid and the final liquid controls the flow rates of the gas and first liquid may also be used to provide a liquid film 141 on the liquid film forming section 114 that comprises the first liquid 135. As will be appreciated, any suitable means or apparatus may be used to provide the desired control of the gas and liquid flow rates. For example, separate controllers for each inlet may be provided, which may at their simplest simply be a value that controls the flow rate of a compressed gas or a syringe pump filled with a liquid, where the flow rates are selected manually by the operator. On more sophisticated systems, the flow rate of each inlet may be controlled by a central control system that is configured to independently operate the flow rates of the gas and the liquids such that the desired continuous annular flow is established within the continuous flow reactor. In such systems, there may also be provided sensing means or apparatus that can detect deviations in the desired annular flow of the liquids, which information is provided to the central control systems, which then changes the flow rate(s) of the gas and/or liquid(s) as required to correct the deviation.

Thus, all of the reactor devices of the current invention are, when connected to suitable gas and liquid sources and attendant control mechanism, suitable to provide a high-shear core gas flow 115 and a liquid sheath flow 151, comprising at least a first and a final liquid, on an inner surface of the mixing zone section 134. As will be appreciated, if there are additional annular liquid delivery tubes, these additional tubes provide further liquids, in which case, the liquid sheath flow will comprise all of the available liquid flows. Where such additional annular liquid delivery tubes provide a mixing zone section, then each mixing zone section may also contain a liquid sheath flow (i.e. a liquid film mixture) comprising the relevant liquids. For example, if there is a first and second annular liquid delivery tube, then there may be two mixing zone sections—a first formed using the wall of the second annular liquid delivery tube and the second formed using the reactor wall, in which case there will be two liquid sheath flows. The first liquid sheath flow (first liquid film mixture) will be formed from the liquids flowing from the inlets of the first and second annular liquid delivery tubes and the second liquid film mixture will be formed from the liquids flowing from the inlets of the first and second annular liquid delivery tubes and the final liquid from the final liquid inlet of the annular reactor wall tube.

In embodiments of the invention where the first liquid outlet 122 of first annular delivery tube 120 is located downstream relative to the gas outlet 112 of the annular gas delivery tube, a liquid film forming section 114 is provided, then the device may be suitable to provide a high-shear core gas flow 115 and a liquid sheath flow 141 comprising a first liquid on an inner surface of the liquid film forming section 114. When there is a liquid film forming section present in the reactor then, when in use, the liquid film 141 in the liquid film forming section 114 may have a thickness that is from 0.1% to 10%, such as from 0.5% to 5%, such as from 1% to 2.5% of an inner diameter of the liquid film forming section of the first annular liquid delivery tube.

In embodiments of the invention, the reactor device and control systems may be designed to provide a final liquid film mixture in the final mixing zone section (the mixing zone 134 section on the reactor wall 133) that has a thickness that is from 0.1% to 10%, such as from 0.5% to 5%, such as from 1% to 2.5% of the inner diameter of the mixing zone section and reactor outlet of the annular reactor wall tube. Preferably, the maximum thickness of the liquid film mixture is less than 1 mm, though it will be appreciated that a liquid film thickness of 1 mm or more will only be possible in reactor devices where the inner diameter of the mixing zone section and reactor outlet of the annular reactor wall tube is greater than or equal to 40 mm.

The annular gas delivery tube and each of the annular liquid delivery tubes should be long enough for a stable annular flow to develop. The outermost tube (i.e. annular reactor wall tube), in which the final desired reaction/mixing takes place, should be as long as is required for the reaction to occur, where a longer tube means more time for mixing/reacting to occur. As an example embodiment, a length at least as 10 times as long as the inner diameter may be used for each of the tubes. So for a gas tube having an inner diameter of 0.2 mm, a minimum length of 2 mm may be used; for a first annular liquid delivery tube having an inner diameter of 0.5 mm, a minimum length of 5 mm may be used; and for the annular reactor wall tube having an inner diameter of 1 mm, a minimum length of 10 mm may be used.

As will be appreciated, the reactor device described hereinbefore may be used in parallel to enable substantial quantities of a material to be manufactured in a short space of time. Thus, there is also provided a reactor system comprising two or more constant shear continuous reactor devices as described herein arranged to run in parallel.

As will be appreciated, the reactor devices described above may be used to form reaction products. Thus, there is also provided a method of using a constant shear continuous reactor device as described hereinabove, which method comprises:

(a) providing a gas, a first liquid and a final liquid, each liquid comprising a reactant and/or a reagent; and (b) supplying the gas, the first liquid and final liquid to the reactor device by way of the gas inlet, the first liquid inlet and final liquid inlet, respectively; and (c) mixing at least the first and final liquids together to form a reaction mixture that reacts to provide a reaction product mixture and collecting the reaction product mixture upon exit from the reactor outlet of the reactor device, wherein the gas is supplied at a sufficient velocity to provide a high-shear force on the first and final liquids and to generate a gas core region in the reactor device, such that the first and final liquids combine on a surface of the mixing zone section of the reactor device to form a liquid film mixture with annular flow, which liquid film mixture has a thickness that is from 0.1% to 10%, such as from 0.5% to 5%, such as from 1% to 2.5% of an inner diameter of the mixing zone section and reactor outlet of the annular reactor wall tube.

In embodiments of the invention where the liquids and/or gasses used need to be heated or cooled relative to ambient temperature, this may be achieved by pre-heating or pre-cooling the respective liquids and gasses before introduction to the reactor. If the reactor temperature also needs to be controlled, then this may be achieved by placing the reactor in a temperature controlled environment (e.g. in an oven, refrigerator or freezer, or by the use of a heating/cooling jacket surrounding the reactor). If the pressure of the reaction needs to be controlled, then a backpressure regulator may be placed at the outlet of the reactor to achieve this.

As will be appreciated, as the reactor device and its variations are discussed above, these features will not be discussed in detail with regard to the method.

There are three important characteristics for the fluid flow profile in this invention. First, the flow should be dominated by surface tension. Second, the flow is annular, consisting of a gas core in the middle with a liquid sheath at the inner sides of the tube. Third, the liquid film should be in the microscale regime (in other words, less than 1 mm).

Mixing of the reactants and reagents may be enhanced by reducing the thickness of the annular liquid phase to the microscale (<1 mm). This thickness can be achieved by controlling fluid flowrates within the annular regime, as described above. Empirical models have been published for the prediction of annular liquid thickness, like the one by Han et al. (*International Journal of Multiphase Flow* 73, 264-274, (2015)). Using this model, for a tube with an inner diameter of 1 mm, a total liquid flowrate of 12 g min$^{-1}$ ($U_{SL}$=0.25 ms$^{-1}$) and a total gas flowrate of 1.3 g min$^{-1}$ ($U_G$=21 m s$^{-1}$), a film that is 21 µm thick would be produced. The liquid thickness can be tailored for specific process requirements.

Any suitable gas flow rate may be used, provided that the flow rate selected provide a high shear effect on the liquids, such that a core, central gas flow (taking up the central portion of the reactor tube) and an annular liquid sheath flow (on the inner surface of the reactor wall in the mixing zone section) are created. Suitable gas flow rates that may be mentioned include, but are not limited to gas supplied at a flow rate of from 0.1 to 100 L/min, such as from 0.3 to 50 L/min, such as from 0.4 to 3 L/min.

Any suitable liquid flow rates may be used for the liquid components, provided that the flow rate is sufficient to provide the reactants and/or reagents contained in said liquids in suitable amounts to effect the chemical reaction that is desired. Suitable flow rates may include, but are not limited to, the first and final liquids being independently supplied at a flow rate of from 0.1 to 1 L/min, such as from 0.1 to 500 mL/min, such as from 1 to 200 mL/min, such as from 4 to 15 mL/min. As will be appreciated from the discussion of the reactor devices above, the process may include from 2 to 7 liquids and the flow rates of these other liquids may also fall within the flow rate ranges described above (where each liquid comprises a reactant or reagent). In certain embodiments, the flow rates of the liquids may be identical, while in other embodiments the flow rates may all be different from one another. The skilled person is able to select the correct flow rate for the reaction that is envisaged.

In many embodiments of the method, the gas supplied may be an inert gas or air (e.g. compressed air). However, in certain embodiments, the gas may be a reactant and/or reagent or may comprise reactants or reagents, as a degree of mixing of the gas with the liquid will occur enabling the desired reaction to occur. As will be appreciated, the skilled person can control the flow rate of the gas to ensure sufficient gas is mixed with the liquids to enable such reactions to proceed.

In certain embodiments that may be mentioned herein, the reaction product may be a 2-D material. 2-D materials, sometimes referred to as single layer materials, are crystalline materials consisting of a single layer of atoms. These materials have found use in applications such as photovoltaics, semiconductors, electrodes and water purification. In other words, the reactor devices described herein may be particularly useful in the creation of 2-D materials. Examples of 2-D materials include, but are not limited to layered double hydroxides, such as hydrotalcite, and metal organic frameworks.

For example, the layered double hydroxide hydrotalcite may be formed (as nanoplatelets) by the above method when the gas is an inert gas or air, the first liquid is an aqueous solution of magnesium nitrate hexahydrate and aluminium nitrate nonahydrate and the final liquid is an aqueous solution of NaOH and $Na_2CO_3$.

In another example, when the gas is an inert gas or air, the first liquid is a solution of copper nitrate in a solvent comprising a 1:1 mixture by volume of dimethylformamide and acetonitrile and the final liquid is a solution of triethylamine and 1,4-benzene dicarboxylic acid in a solvent comprising a 1:1 mixture by volume of dimethylformamide and acetonitrile, the reaction product is a 2-D metal-organic framework of copper and 1,4-benzene dicarboxylic acid. Subsequent removal of the solvent and replacement of the solvent may be sufficient to provide a β-form of the 2-D metal-organic framework of copper and 1,4-benzene dicarboxylic acid, which has characteristic 2θ powder x-ray diffraction peaks at 8.26°, 16.57°, 19.69° and 16.06°.

As will be appreciated, the reactor device disclosed herein may be used to form other material other than solely 2-D materials. For example, the reactor device could be used in non-particle forming reactions, gas/liquid reactions and heterogeneous reactions (where the tube surfaces are covered in a reactive agent or catalyst). It could also be used simply as a mixer or shearing device for processes in which high, uniform shear rates are required.

The reactor device disclosed herein is particularly suited to the manufacture, rapid scale-up and precise manufacturing of nanostructures because of the following key advantages.

1) With microsecond mixing, ultrafast kinetics such as nucleation, surface growth and aggregation during high supersaturation precipitation, may be controlled more completely.

2) With high wall shear and only one non-slip boundary, scaling and clogging are reduced.

3) Increasing throughput is simply done by increasing the number of reactors or flowrate, in accordance with previously determined reaction conditions.

4) As a continuous reactor, space-time yield is high (relative to conventional batch reactors), which reduces capital and operating costs during scale-up, integration with downstream process is simplified, and inline characterisation is possible.

The above advantages make the reactor device described herein a flexible tool for a number of different applications. For example, this flexibility provides a means of precisely controlling hydrodynamic shear, mixing time and residence time from the laboratory bench to the industrial scale, and may be used to intensify the development of colloid synthesis techniques for nanomaterials.

As will be appreciated, a reactor device having only a single liquid inlet may also be useful in certain circumstances for the formation of 2-D materials. Thus, there is also provided a method of forming a 2-D material using a constant shear continuous reactor device, the reactor device comprising:

an annular gas delivery tube comprising a gas inlet and a gas outlet;

an annular reactor wall tube comprising a liquid inlet, a mixing zone section and a reactor outlet, where the annular reactor wall tube is arranged concentrically around the annular gas delivery tube along a common axis, where:

the reactor outlet is located at a downstream position relative to the mixing zone section; and the mixing zone section and reactor outlet of the annular reactor wall tube has an inner diameter of from 100 nm to 53 mm, said method comprising the steps of:

(i) providing a gas and a liquid, the liquid comprising a reactant and/or a reagent; and (ii) supplying the gas and liquid to the reactor device by way of the gas inlet and liquid inlet, respectively;

(iii) mixing at least the gas and liquid together to provide a reaction product mixture that comprises a 2-D material and collecting the reaction product mixture upon exit from the reactor outlet of the reactor device, wherein:

(a) when the gas is an inert gas or air, then an inner surface of the mixing zone section is coated and/or impregnated with one or more of a catalyst, a reactant and a reagent and the gas is supplied at a sufficient velocity to provide a high-shear force on the liquid, such that a liquid film with annular flow is formed on a surface of the mixing zone section of the reactor device, thereby allowing interaction between the reactants and/or reagents in the liquid with the one or more of a catalyst, a reactant and a reagent coated and/or impregnated on the inner surface of the mixing zone section to form a product, which liquid film has a thickness that is from 0.1% to 10%, such as from 0.5% to 5%, such as from 1% to 2.5% of an inner diameter of the mixing zone section and reactor outlet of the annular reactor wall tube;

(b) when the gas comprises a reactant or reagent, then the gas is supplied at a sufficient velocity to provide a high-shear force on the liquid, such that a liquid-gas film mixture with annular flow is formed on a surface of the mixing zone section of the reactor device to form a product, which liquid-gas film mixture has a thickness that is from 0.1% to 10%, such as from 0.5% to 5%, such as from 1% to 2.5% of an inner diameter of the mixing zone section and reactor outlet of the annular reactor wall tube; or (c) when the gas comprises a reactant or reagent and the mixing zone section is coated and/or impregnated with one or more of a catalyst, a reactant and a reagent, then the gas is supplied at a sufficient velocity to provide a high-shear force on the liquid, such that a liquid-gas film mixture with annular flow is formed on a surface of the mixing zone section of the reactor device, thereby allowing interaction between the reactants and/or reagents in the liquid-gas film mixture with the one or more of a catalyst, a reactant and a reagent coated and/or impregnated on the surface of the mixing zone section to form a product, which liquid-gas film mixture has a thickness that is from 0.1% to 10%, such as from 0.5% to 5%, such as from 1% to 2.5% of an inner diameter of the mixing zone section and reactor outlet of the annular reactor wall tube; or (d) when the gas is an inert gas or air, then the gas is supplied at a sufficient velocity to provide a high-shear force on the liquid, such that a liquid-gas film mixture with annular flow is formed on a surface of the mixing zone section of the reactor device to form a product, which liquid-gas film mixture has a thickness that is from 0.1% to 10%, such as from 0.5% to 5%, such as from 1% to 2.5% of an inner diameter of the mixing zone section and reactor outlet of the annular reactor wall tube.

The reactor design may be inferred by reference to the description of the reactor having a minimum of two liquid inlets.

One application of the above-mentioned reactor for forming 2-D materials may be shear-induced crystallisation (e.g. using the process of (d) above). Certain compounds such as glycine are known to crystallise faster after being sheared (Forsyth et al., Cryst. Growth Des., 2014, 15, 94-102) and a similar process may be used to form 2-D materials. In this application, a single precursor solution would be the liquid phase and the reactor would shear the solution to accelerate crystallisation using an inert gas or air.

A further application of the above-mentioned reactor to form 2-D materials may be shear exfoliation (e.g. the process of (d) above). In this process, aggregates may be broken up by shear. This can be applied to the synthesis of graphene from graphite, where shear breaks up the individual layers (e.g. Paton et al., Nat. Mater., 2014, 13, 624-630). In this application, a single slurry would be used as the liquid phase and the reactor described above would shear the slurry to break apart aggregates in the slurry using an inert gas or air.

Further aspects and embodiments of the invention will now be described by reference to the following non-limiting examples.

EXAMPLES

Methods

High Speed Microscopy

For high speed microscopy studies, a mount was constructed using a Formlabs 1+3D printer with high temperature resin and a 1 mm quartz glass slide. Channels and tube connections were sealed with rubber silicone sealant and epoxy adhesive. Gas flowrates from 0.4-3 L(STP) min$^{-1}$ and liquid flowrates from 2-20 mL min$^{-1}$ were evaluated, keeping both inlet liquid streams at the same flowrate.

Confocal fluorescence imaging was performed with a Leica TCS SP5 using a scanning Ar laser at 8000 Hz with 10× objective magnification. The reactor tube was immersed in glycerol and placed above a 200 μm glass coverslip to reduce the effects of refraction from the tube curvature.

To accurately determine the liquid profile, a dilute fluorescein (Sigma Aldrich) solution was used in both liquid streams. Axial cross-section images were taken over the first 7-8 mm of the reactor at a resolution of 0.57 μm/pixel and averaged over 64 frames. Due to the wavy nature of the liquid, the average height was calculated as the distance from the reactor wall to the point at which the intensity was $1/\sqrt{2}$ of the maximum intensity, the root mean square of a sine wave.

To determine mixing dynamics, a dilute fluorescein solution was used in the first annular inlet flow and a blank water stream was used in the second. Video over the first several millimeters of the tube was taken without frame averaging. A median filter with a radius of 2 pixels was applied to reduce image noise.

To determine macromixing time, a dilute fluorescein solution was used in the first annular inlet flow and a blank water stream was used in the second. The liquid profile was determined as previously described. The average intensity at each tube length was then determined. The mixing length was determined as the point at which the intensity was within a standard deviation of its stable average; this was then divided by the liquid velocity to determine the effective macromixing time.

Micromixing

To experimentally quantify the mixing efficiency of the reactor at various flow conditions, the Villermaux-Dushman method was used (Fournier, M. C., et al., *Chem. Eng. Sci.*, 1996, 51, 5053-5064; Guichardon, P. et al., *Chem. Eng. Sci.*, 2000, 55, 4245-4253). This test characterises micromixing time with a parallel competing reaction system in which the quasi-instantaneous neutralisation of boric acid (Eq. 1) by sulfuric acid competes with the reduction of iodate to iodine (Eq. 2), which forms a triiodide ion (Eq. 3) that can be measured via UV spectrometry. In a system with infinitely fast mixing, the boric acid will completely neutralise the acid species before iodine may be formed; in a very slowly mixed system a significant amount of iodine will evolve. By varying reagent concentrations and volumetric fractions, one may tailor the characteristic iodide reaction time to the expected mixing time, with enough sensitivity to detect changes with different flow conditions.

  (Eq. 1)

  (Eq. 2)

  (Eq. 3)

By using the incorporation micromixing model (Fournier, M. C., et al., *Chem. Eng. Sci.*, 1996, 51, 5187-5192), the characteristic mixing time $t_m$ may be determined from the concentration of triiodide. By comparing the measured segregation index to the model, the characteristic micromixing time may be determined with good accuracy in continuous and batch reactors. It should be noted that, because the known kinetics of this reaction are debated, the characteristic reaction times calculated using this method should only be used to rank mixers characterised using the same protocol (Bourne, J. R., *Chem. Eng. J.*, 2008, 140, 638-641; Kolbl, A., et al., *Chem. Eng. Sci.*, 2013, 93, 47-54; Kolbl, A. and Schmidt-Lehr, S., *Chem. Eng. Sci.*, 2010, 65, 1897-1901). In this case, the pH of the mixture was carefully controlled to 7.4 so as to ensure the complete dissociation of sulfuric acid. Comparing both the mixing time measured by fluorescence microscopy and mixing time from Villermaux/Dushman test reaction allows for a more universal estimation of the mixing time.

A semi-empirical model of annular flow in microtubes was used to predict the pressure drop, liquid film thickness, shear, and velocity after the transient mixing region (Han, Y., et al., *Int. J. Multiphas. Flow*, 2015, 73, 264-274). According to the Re number, the flow rates used are in the laminar regime. With the predicted pressure drop and velocity, the characteristic mixing time could then be estimated using the relationship between the rate of energy dissipation and micromixing time for high shear flows where vortex engulfment is the dominant mixing mechanism. This relationship is given in Eq. 4 (Baldyga, J., et al., *Chem. Eng. J.*, 1989, 42, 83-92), which applies for low Schmidt (Sc) numbers «4000 (for water at ambient conditions Sc=ν/(ρD)=406) where $T_E$ is the characteristic engulfment time (s), ν is the kinematic viscosity (m$^2$ s$^{-1}$), ρ is the density (kg m$^{-3}$), D is the diffusion coefficient (m$^2$ s$^{-1}$), in this calculation the self-diffusion coefficient of water (Tanaka, K., *J. Chem. Soc. Farad. Trans. 1 Phys. Chem. Condens. Phases*, 1978, 74, 1879-1881), and E is the rate of energy dissipation (m$^2$ s$^{-3}$).

$$\tau_E = 17\sqrt{\frac{\nu}{\varepsilon}} \quad \text{(Eq. 4)}$$

Potassium iodide, potassium iodate, boric acid, sodium hydroxide, and sulfuric acid were purchased from HCS Scientific. A buffered solution (solution B) of 0.25 M H$_3$BO$_4$, 0.125 M NaOH, 0.005 M KI, and 0.001 M KiO$_3$ and an acidic solution (solution A) of 0.05625 M H$_2$SO$_4$ were prepared in deionised water at approximately 21° C.

Solutions A and B were delivered to the reactor at equal flowrates with compressed dried air to provide total liquid flowrates ($Q_L$) from 0.4 to 20 mL min$^{-1}$, and total gas flowrates ($Q_G$) from 0.1 to 3 L min$^{-1}$. The length of the mixing zone 134 was kept at 50 mm. Product was collected in a vial and then subjected to UV-visible light absorption analysis with an Agilent Cary 60 at 353 nm, diluting if necessary to get values between 0.1 and 0.3. UV-Vis absorption was used to determine the concentration of triiodide (I$_3^-$), which was then used to calculate the concentration of I$_2$. The product pH was approximately 7.65, which is in the optimal zone for this reaction to determine mixing efficiency (Guichardon, P. and Falk, L., *Chem. Eng. Sci.*, 2000, 55, 4233-4243). Between each experiment the reactor was flushed with water to avoid cross-contamination.

Transmission Electron Microscopy (TEM)

Figure 13:
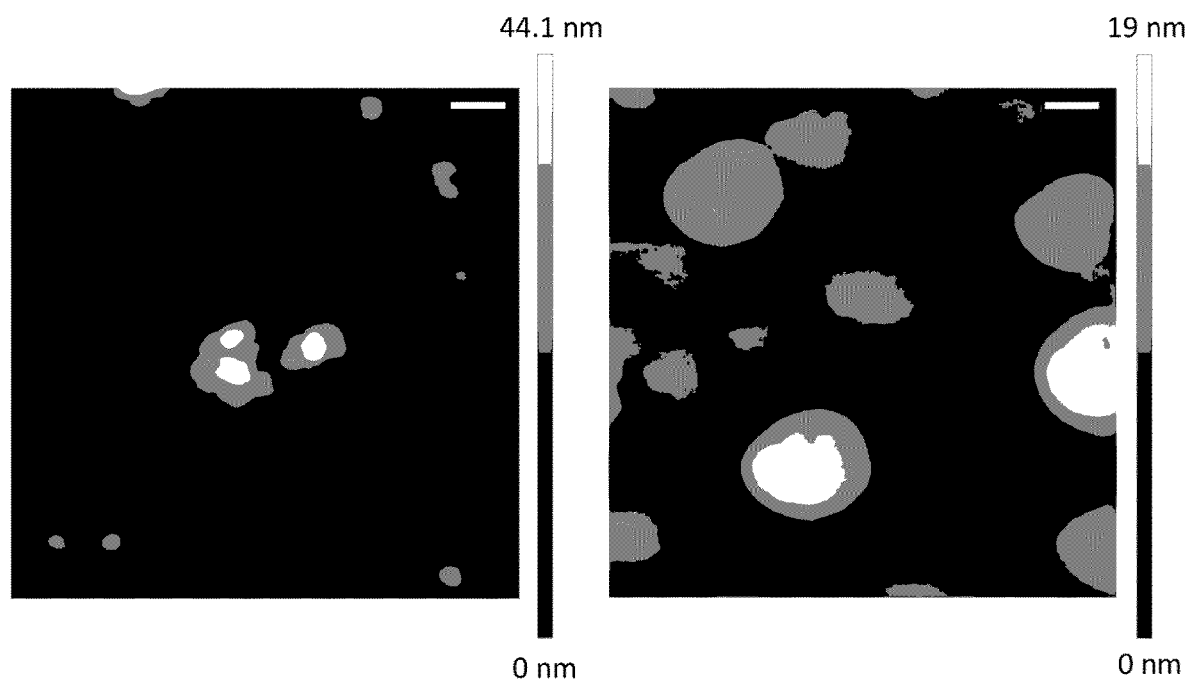
Figure 14:
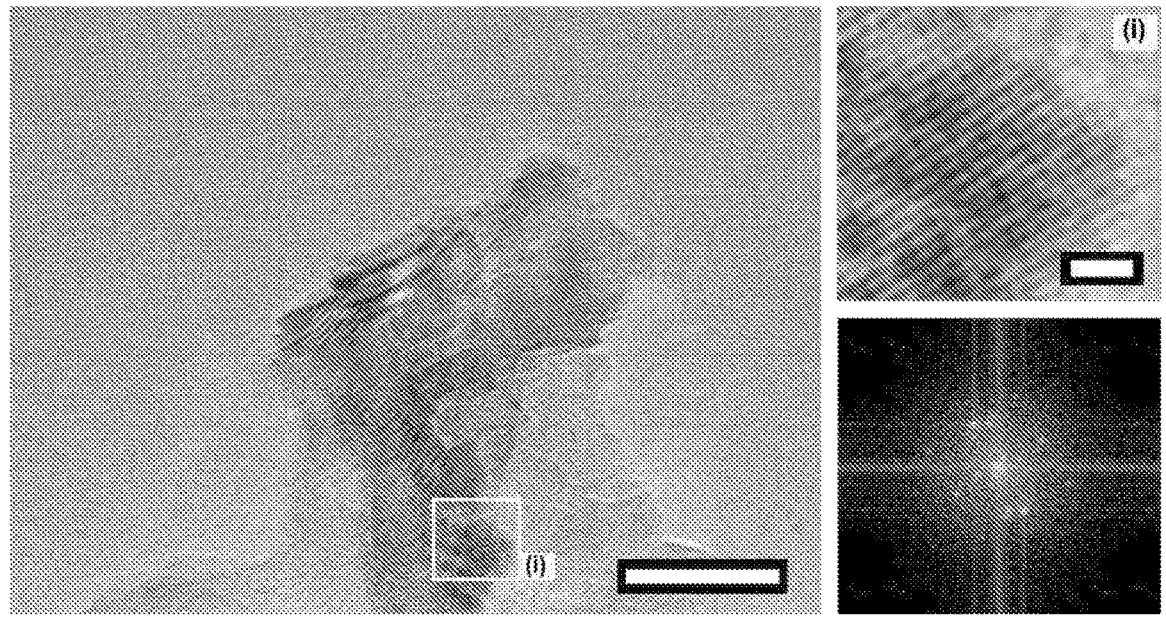

The ethanol suspensions of the LDH samples were ultra-sonicated in an Elma Ultrasonic S100h bath for 1 minute to disperse large agglomerates, dropped onto Formvar or holey carbon 200 mesh copper TEM grids purchased from InLab Supplies, and dried at room temperature. It was found that SiO was a better substrate for stabilising and dispersing LDH particles during HRTEM imaging. Sonication was limited to 1 minute because extended sonication up to 30 minutes resulted in morphological changes that were observed in AFM, seen in FIG. 13. High resolution images were taken with a JEOL 2100F FETEM at 200 kV. Samples were imaged for brief time periods under low current density to prevent radiation induced restructuring. Representative images of radiation induced damage can be seen in FIG. 14.

For the CuBDC samples, the suspensions were diluted in their respective solvent and dropped on holey carbon 200 mesh copper TEM grids (InLab Supplies) and dried at room temperature. Samples were imaged using the same instrument (above) for brief time periods under low current density to prevent the reduction of copper and radiation damage.

Liquid Transmission Electron Microscopy (LTEM)

All liquid TEM work was started within an hour after synthesis. Post-synthesised sample was diluted 10×-100× in deionised water, or in their respective solvents, approximately after synthesis, and imaged using a Protochips Poseidon holder fitted with an E-chips liquid cell.

The cell consists of two silicon chips, coated with a 50 nm thick silicon nitride membrane, with windows of approximately 500×50 μm². The spacer between the two chips, composed of 150 nm thick SU-8, was deposited in a modified flow configuration.

A Tecnai F20 FETEM was used at 200 kV in bright field mode at an electron dose under 80 (for MOF) or 500 (for LDH) $e^-nm^{-2} s^{-1}$. Higher electron doses were used to induce bubble formation. Video was taken at 25 fps at 4k×4k resolution using a Gatan OneView camera. Sample was imaged under static conditions as well as in flow, under 200 μL hr$^{-1}$ flowrates of deionised water. Particle sizes and positions were measured in imageJ.

Atomic Force Microscopy (AFM)

The ethanol suspensions were sonicated for 1 minute, dropped onto 1 mm quartz slides, and dried at room temperature. Height and phase maps were taken with a Bruker Dimension ICON AFM with a silicon SPM probe (Mikro-Masch NSC15) while tapping in air. Maps were flattened using a $1^{st}$ or $2^{nd}$ order fit for each line scan and analysed using Bruker Nanoscope Analysis.

The heights and diameters of at least 100 individual particles were measured for each sample to construct a reasonable particle size distribution. Particle diameter was approximated by treating the area of the particle as the area of a circle. Height was taken to be the difference of the maximum measured height and the surrounding height.

X-Ray Diffraction (XRD)

The ethanol suspensions were deposited onto a non-reflective silicon wafer (100) and dried at ambient temperature (for the LDH samples). For the CuBDC samples, the suspension were drop-cast onto a non-reflective silicon wafer (100) and dried at 80° C. for 30 min. The powder x-ray diffraction pattern was collected with a Brucker D8 Advance Powder Diffractometer using Cu Kα radiation (λ=1.5418 Å) at 40 kV from a 2θ of 3° to 70° with a step size of 0.02°, and a scanning resolution of 4.25° min$^{-1}$ (in the initial characterisation), 0.02° s$^{-1}$ (in subsequent characterisation) and 1.25° min$^{-1}$ (for MOF). Crystallite size of the 110 peak was determined using the Scherrer equation (Patterson, A. L., *Phys. Rev.*, 1939, 56, 978-982).

Scanning Electron Microscopy (SEM)

The CuBDC samples were characterised by SEM. The suspensions were diluted in their respective solvent and drop-cast on silicon substrates, dried at room temperature and coated with Pd in a Cressington sputter coater for 70 seconds. Images were taken with a JEOL JSM-5600LV FESEM at 5 kV.

Fourier Transform Infrared (FTIR) Spectroscopy

The CuBDC samples were characterised by FTIR. The suspensions were first dried at 80° C., followed by mixing the resulting powder with KBr and pressed into a pellet. FTIR spectra were measured on a Bruker Tensor II spectrometer.

Example 1

Construction of Annular Microreactor 100, and Characterisation of Its Fluid Dynamics Construction of Annular Microreactor 100

Three quartz tubes (110, 120 and 130) were installed in a "tube-in-tube" configuration to create two annular flow zones 114 and 134 (FIG. 1a and 1b). In region 114, air flow 115 through tube 110 forced liquid phase 135 into a thin film 141 at the inner walls 123 of tube 120 (FIG. 1b). In region 134, the thin film of liquid phase 135 from 114 was then contacted with a thin film of liquid phase 140. In tube 130 and in region 134, mixing and reaction occur. The smooth surfaces of the quartz tubes increase flow stability and decrease scaling. They are also amenable to in situ analytical techniques such as laser scattering, spectroscopy, optical microscopy, and x-ray scattering.

Liquids were delivered to the reactor using a KDS Legato Dual Syringe Pump using disposable plastic 50 or 10 mL Terumo syringes. Compressed dried air was passed through a 200 μm filter (Swagelok) and delivered to the reactor using a Sierra SmartTrak C50L Mass Flow controller (20 L min$^{-1}$ max, 2% accuracy). For low gas flow rates (0.1 mL min$^{-1}$) a laboratory rotameter is used. The pressure of the liquid phase 140 stream was monitored inline to determine when flow had reached a steady state.

Stainless steel tee connectors with ¼" and 1⁄16" diameter compression fittings were purchased from Swagelok. Precision quartz capillary round tubes of the following dimensions: 0.30 mm ID×0.4 mm OD×100 mm L (110), 0.50 mm ID×0.7 mm OD×100 mm L (120), and 1 mm ID×1.2 mm OD×100 mm L and 300 mm L (130) were purchased from VitroCom (supplied by ArteGlass Japan). Gas tight connections between stainless steel fittings and quartz tubes were made with graphite and Teflon 1⁄16" compression ferrules. 0.8 mm ID and 0.5 mm ID ferrules were purchased from Restek, and 1⁄16" PTFE ferrules were purchased from Swagelok. 0.8 mm ID PTFE tubing from ChemiKalie was used for delivery of liquid solutions to the reactor.

Microreactor Fluid Dynamics and Advantages

The reactor 100 consists of three quartz tubes (110, 120 and 130) placed in a staggered, coaxial configuration. A high velocity gas is pumped through the innermost tube 110, with liquid reagent streams through the two outer tubes 120 and 130, creating regions of two-phase annular flow. The mixing region forms by the collision and hydrodynamic focusing of two liquid annular flows, which then stabilise into a wavy annular thin film. As the thin film thickness stabilises, the shear rate $\dot{\gamma}$ in an annular thin film approaches a constant value, which may be determined from the film thickness and velocity or gas and liquid flowrates (modelled analytically and empirically in microtubes, see Han, Y., et al., *Int. J. Multiphas. Flow*, 2015, 73, 264-274).

Figure 2:
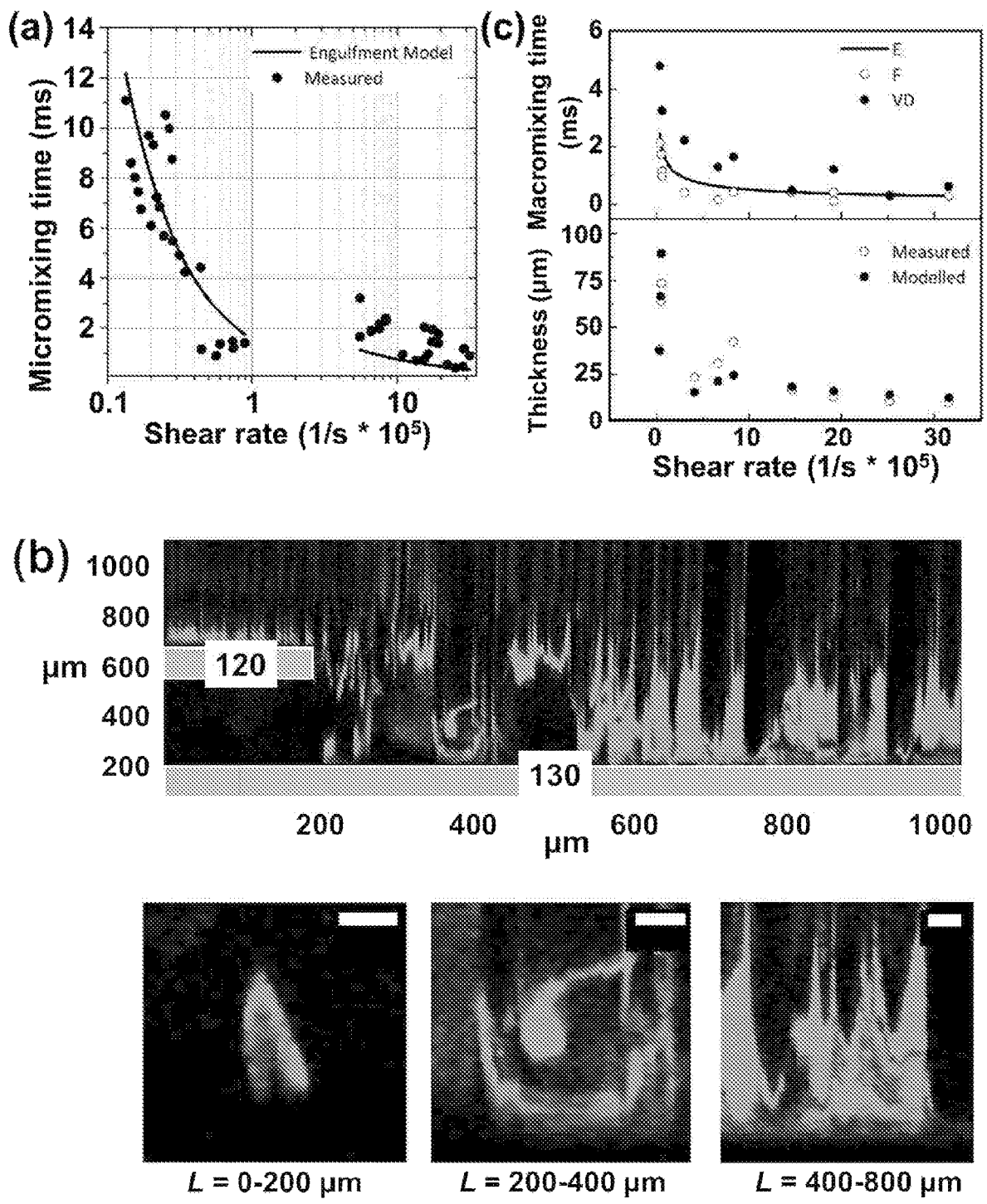

The liquid profile, mixing dynamics and mixing time were measured with high-speed fluorescence confocal microscopy (as described in the Method—High Speed Microscopy). As seen in FIG. 2c, the annular film thickness decreased from 100 to 10 μm with increasing $\dot{\gamma}$, indicating a highly confined reaction environment at shear rates up to $10^6$ $s^{-1}$. These measurements agree with model predictions (Han, Y., et al., *Int. J. Multiphas. Flow*, 2015, 73, 264-274).

When liquid stream 135 was laced with a fluorescent tracer (FIG. 2b), micro-vortices were observed originating at the tip of the first annular flow outlet, likely generated by Kelvin-Helmholtz instabilities at the high shear interface, and by secondary flows as the flow suddenly accelerated in the radial direction. These vortices grew and dissipated in a mixing process known as vortex engulfment, a well-described mode of micromixing (Baldyga, J. and Bourne, J. R., *Chem. Eng. J.*, 1989, 42, 83-92; Baldyga, J. and Bourne, J. R., *Chem. Eng. J.*, 1989, 42, 93-101). After the transient mixing section, the liquid profile stabilised into wavy striations. Even at such high shear rates, it is unlikely that rarefaction or slip flow occur at the liquid-wall interface, due to strong attractions between the hydrophilic surface and electrolytic aqueous solution, and because the Knudsen number was below $10^{-3}$ (Sharp, K. V., et al., *Liquid flows in microchannels*, The MEMS Handbook, Mohamed Gad-El-Hak, editor. CRC Press, Boca Raton, 2002). Slip flow between water and hydrophilic surfaces has not been detected experimentally under high shear (Choi, C. H., et al., *Physics of Fluids*, 2003, 15, 2897-2902; Maali, A., et al., *Langmuir*, 2009, 25, 12002-12005). In molecular dynamics simulations, it has only been predicted to occur under high shear rates with atomically smooth surfaces of MgO, while polar hydrophilic diamond surfaces maintain a no-slip condition (Ho, T. A., et al., *Proc. Natl. Acad. Sci. USA.*, 2011, 108, 16170-16175; Sendner, C., et al., *Langmuir*, 2009, 25, 10768-10781).

The measured characteristic micromixing times, which ranges from 11 to 0.4 ms, are in close agreement with those predicted by an engulfment model (Baldyga, J. and Bourne, J. R., *Chem. Eng. J.*, 1989, 42, 83-92), confirming that the engulfment of microscale eddies is the dominant mixing mechanism (FIG. 2a). The energetic efficiency of mixing is on average 53% of the theoretical efficiency, an improvement over rotor-stator mixers (~35%) and serpentine micromixers (~14%), which could reduce power consumption at the industrial scale (Baldyga, J. and Jasinska, M., *Chem. Process Eng.*, 2017, 38, 79-96). A comparison with other mixing technologies is shown in Table 1 below, where the annular microreactor 100 is one of the fastest mixing techniques for the synthesis of nanoparticles. It is slower than highly confined single-phase microreactors such as the turbulent tangential mixer and capillary ball mixer, though it has significantly less clogging risk and a lower pressure drop. Further advantages for the annular microreactor 100 over other conventional apparatus are as shown in Table 2.

TABLE 1

A comparison of the characteristic mixing times of annular microreactor 100 with other reported geometries.

| Mixer/reactor | Mixing time | References |
|---|---|---|
| Turbulent tangential micromixer | 160 ns | Mitic, S., et al., *Anal Biochem.*, 2015, 469, 19-26. |
| Capillary-ball micromixer | 10 μs | Shastry, M. C. R., et al., *Biophys. J.*, 1998, 74, 2714-2721. |
| Annular microreactor 100 of current invention | 288 μs | Current invention |
| Impinging jet mixer | 1 ms | Baber, R., et al., *J. Flow Chem.*, 2016, 6, 268-278. |
| Coaxial turbulent jet mixer | 10 ms | Lim, J. M., et al., *ACS Nano*, 2014, 8, 6056-6065. |
| Spinning disk reactor | 12 ms | Boodhoo, K. V. K., et al., *Chem. Eng. Technol.*, 2012, 35, 1229-1237. |
| Three phase microreactor | 150 ms | Wong, W. K., et al., *React. Chem. Eng.*, 2017, 2, 636-641. |
| Cylindrical flask, six blade turbine | 800 ms | Hartman, R. L., et al., *Angew. Chem., Int. Ed.*, 2011, 50, 7502-7519. |
| Cylindrical flask, magnetic stir bar | 9.3 s | |

TABLE 2

A comparison of the features of annular microreactor 100 with other conventional apparatus.

| Features | Conventional batch reactor | Microfluidics | Spinning disc reactor | Annular microreactor 100 |
|---|---|---|---|---|
| Fouling risk | Low | High | Low | Low |
| Mixing | Low (s) | Medium-high (ms-μs) | Medium (ms) | High (ms-μs) |
| Hydrodynamic shear control | Low | High | Medium | High |
| Additive/operation cost | High | High | Medium | Low |
| Space-time yield | Low | Low | High | High |
| Energetic efficiency | Low | High | High | High |

Macromixing times, which were determined from the concentration of fluorescent tracer, decrease from milliseconds to microseconds as $\dot{\gamma}$ increases; the fastest mixing time measured was 288 μs (FIG. 2c). These are in the same range as micromixing times determined by the Villermaux-Dushman chemical test method (Fournier, M. C., et al., *Chem. Eng. Sci.*, 1996, 51, 5187-5192; Fournier, M. C., et al., *Chem. Eng. Sci.*, 1996, 51, 5053-5064), and in agreement with predictions from the engulfment mixing model. Rapid micro and macro-mixing time scales ensure that parallel reaction systems with different rates, such as nucleation (fast) and growth (slow), may be segregated, and that the residence time distribution should be narrow, ensuring a product with small size and low polydispersity.

Additional Notes

There are three essential characteristics of the fluid flow profile in this invention. First, the flow must be dominated by surface tension. Second, the flow is annular, consisting of a gas core in the middle with a liquid sheath at the inner sides of the tube. Third, the liquid film must be in the microscale regime, or <1 mm.

The maximum inner diameter of the outermost tube is defined by the point at which surface tension begins dominating in two-phase (gas/liquid) flow. At this point, stable annular microfilms may be formed without the influence of gravitational forces, which would cause slugs or stratified flows to form. The Bond number (Bo) represents the ratio of gravitational forces to surface tension. When Bo<1, the surface tension dominates, and when Bo<<1, gravitational forces may be neglected. The expression for Bo is given in Eq. I, where g is gravitational acceleration (9.8 m s$^{-2}$), $\rho_L$ is the liquid density (kg m$^{-3}$), $\rho_G$ is the gas density (kg m$^{-3}$) and $\sigma_{GL}$ is the gas-liquid surface tension (N m$^{-1}$).

$$Bo = \frac{gd^2(\rho_L - \rho_G)}{4\sigma_{GL}} \quad \text{(Eq. I)}$$

$$d_{max} = \sqrt{Bo_{max} * 4\sigma_{GL} \frac{g}{(\rho_L - \rho_G)}} \quad \text{(Eq. II)}$$

The maximum inner diameter of the outermost tube ($d_{max}$) may be determined by using Eq. II, which uses the upper limit of the Bond number ($Bo_{max}$=1). Where the liquid is water at 25° C. and the gas is air at 25° C., such that $\rho_L$=1000 kg m$^{-3}$, $\rho_G$=1.2 kg M$^{-3}$ and $\rho_{GL}$=0.072 N m$^{-1}$, the maximum diameter $d_{max}$ is 0.053 m. As annular flow will persist in microchannels as small as 200 nm[1], the minimum diameter is determined as 100 nm.

Example 2

Synthesis of MgAl Layered Double Hydroxides (LDH, Hydrotalcite) Using the Annular Microreactor 100, and Characterisation of the As-Synthesised Product To demonstrate the applicability of the current invention, the annular microreactor 100 was used to synthesise MgAl layred double hydroxides (hydrotalcite).

Experimental Procedures

Hydrotalcite nanoplatelets were synthesised via the co-precipitation method, in which Mg and Al salts are combined with NaOH and Na$_2$CO$_3$ (Cavani, F., et al., *Catal. Today*, 1991, 11, 173-301). At high supersaturation precipitation is rapid, ensuring complete conversion within the short timescale used (Abello, S. and Perez-Ramirez, J., *Adv. Mater.*, 2006, 18, 2436-2439).

Magnesium nitrate hexahydrate, aluminum nitrate nonanhydrate, sodium hydroxide, and sodium bicarbonate were purchased from HCS Scientific. A metal ion solution (solution A) of Mg$^{2+}$ and Al$^{3+}$ and a basic solution (solution B) of NaOH and Na$_2$CO$_3$ were prepared in deionised water at approximately 21° C. The molar ratio of Mg$^{2+}$: Al$^{3+}$ was fixed at 3:1. A mixture with a supersaturation of 3×10$^4$ corresponds to a solution A concentration of 0.112 M Mg$^{2+}$ and 0.0372 M Al$^{3+}$, with a solution B concentration of 0.291 M NaOH and 0.0186 M Na$_2$CO$_3$(Sato, T., et al., *React. Solid*, 1988, 5, 219-228). Synthesised product suspensions had pH values of approximately 10.65, in which the formation of hydrotalcite is favorable.

While gas flowed through tube 110, solutions A and B were pumped through tubes 120 and 130 respectively at equal flowrates. The total liquid flowrate $Q_L$ was varied from 0.4 to 20 mL min$^{-1}$, and the gas flowrate $Q_G$ from 0.1 to 3 L min$^{-1}$. For TEM, AFM, and XRD analysis, the collected suspension was centrifuged immediately after synthesis in a Hanil 514R Centrifuge at 6000 RPM for 3 min. The collected solids were rinsed three times with deionised water to purge unreacted ions. An aliquot was then diluted in ethanol 100× for TEM, XRD, and AFM sampling.

Results and Discussion—Characterisations by AFM, XRD and HRTEM

Colloidal dispersions of MgAl LDH (hydrotalcite) were coprecipitated from an aqueous solution of metal nitrates and a basic solution of sodium hydroxide and sodium carbonate at a supersaturation ratio of 3×10$^4$ at 21° C. Reagents were pumped at equal flowrates, from 0.4 to 20 mL min$^{-1}$, while air was pumped at 0.1 to 3 L min$^{-1}$, corresponding to shear rates ranging from 7.26×10$^4$ to 3.16×10$^6$ s$^{-1}$. The suspensions consisted of fine, white, translucent precipitate, which formed a thick gel after centrifugation. After rinsing with deionised water, the colloidal stability of the material was increased, as has been observed in previous studies (Abello, S. and Perez-Ramirez, J., *Adv. Mater.*, 2006, 18, 2436-2439).

Figure 3:
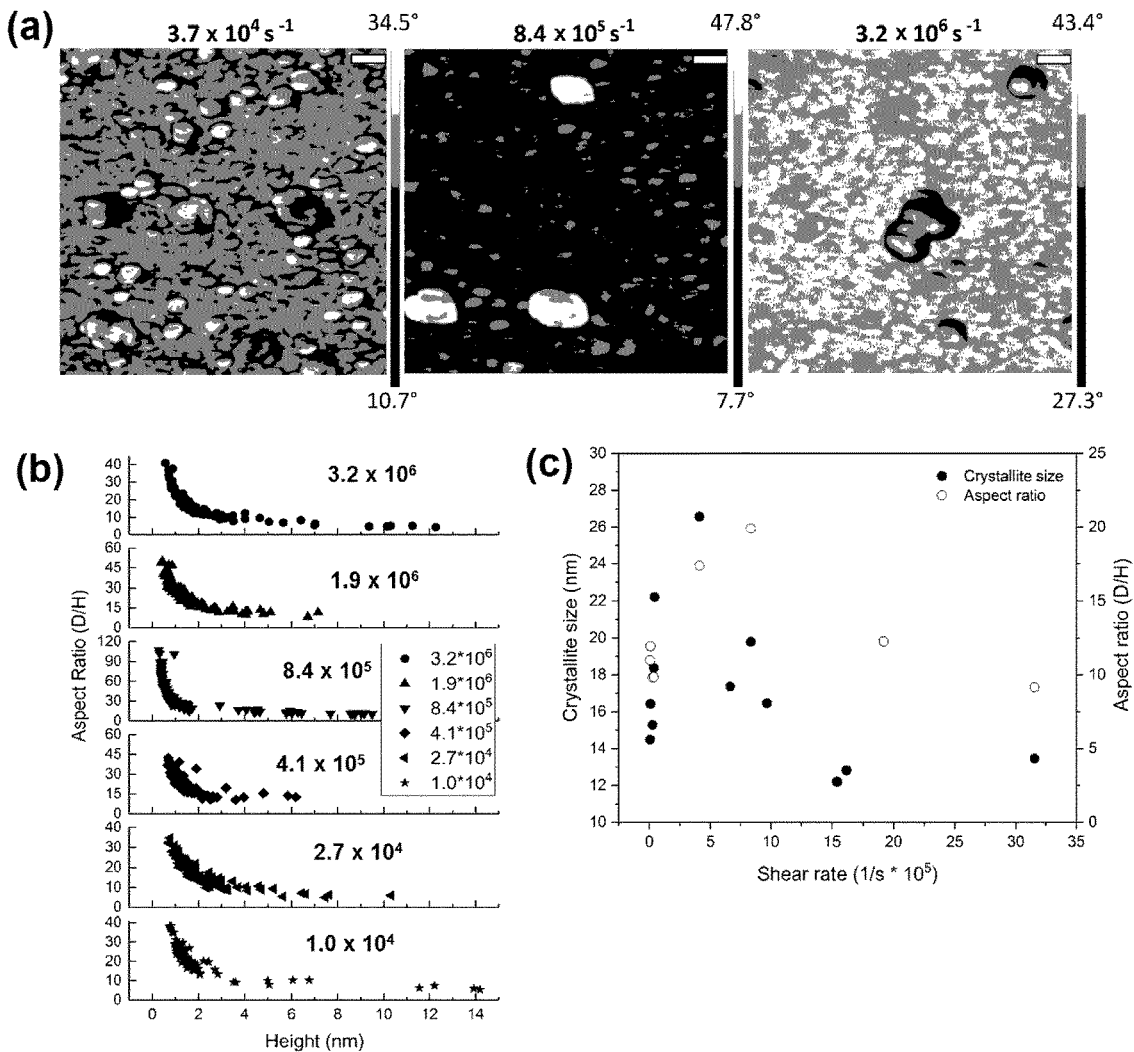

AFM measurements were conducted to determine the particle size distribution in dry samples, measuring both height (H) and diameter (D) for each particle. AFM height maps showed nanoplatelets 28.1±5.5 nm in diameter, ranging in diameter from 0.7 to 1.5 nm, corresponding to monolayer and bilayer LDH. These nanoplatelets would also form clusters, seen in FIG. 3a. The aspect ratios measured for each particle and cluster strongly correlated with their height. The slope of this correlation varied non-monotonically with $\dot{\gamma}$; at 8.4×10$^5$ s$^{-1}$ "flat" clusters of maximum anisotropy formed, while at lower or higher shear rates "round" clusters of lower anisotropy formed, which is illustrated in FIG. 3b.

The correlation between aspect ratio and height indicates that the particles assemble in an ordered manner, which directly verifies previous studies that have suggested that LDH particles may preferentially orient epitaxially, edge-to-edge (Tathod, A. P., et al., *Cryst. Growth Des.*, 2016, 16, 6709-6713), and face-to-face (Pang, X. J., et al., *RSC Adv.*, 2017, 7, 14989-14997). More interestingly, the non-monotonic dependence of aspect ratio and shear suggests that shear not only influences the kinetics of oriented attachment, but also has competing effects that enhance or decrease particle anisotropy.

Figure 4:
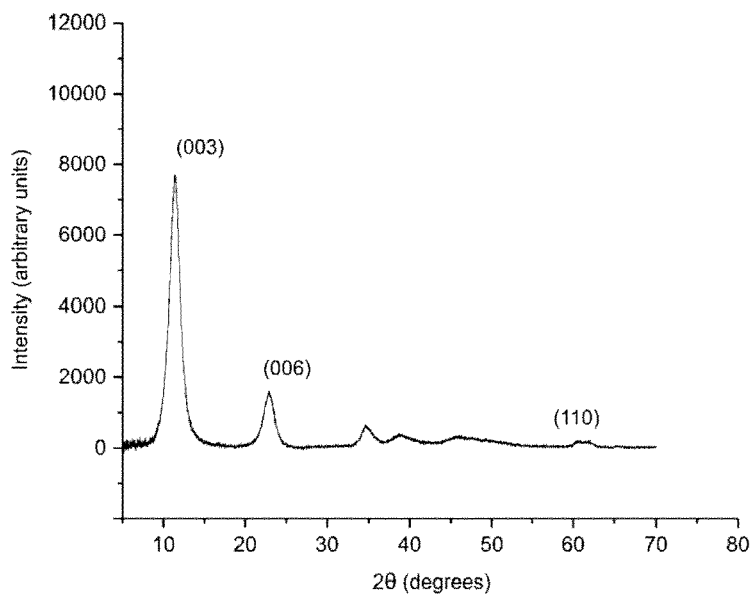

XRD and HRTEM were performed to identify the scale at which shear governs cluster anisotropy. XRD patterns showed the characteristic peaks of hydrotalcite structure at 2θ=11.5°, 22.9° and 61.8°, corresponding to the (003), (006), and (110) lattice planes (FIG. 4). The crystallite size in the [110] direction (the basal crystal plane) as determined using the Scherrer equation, varied non-monotonically with $\dot{\gamma}$, similarly to the trend in aspect ratio observed with AFM (FIG. 3c). From 7.26×10$^4$ to 4.11×10$^5$ s$^{-1}$ the crystallite size increased from 15 nm to 27 nm, approximately the observed diameter of the primary platelets, and decreased to 13 nm at 3.16×10$^6$ s$^{-1}$. This suggests that shear affects particle crystallinity, which then governs their oriented aggregation and anisotropy. Highly crystalline particles, synthesised at $4.11 \times 10^5$ s$^{-1}$ to $8.4 \times 10^5$ s$^{-1}$ align readily, whereas less crystalline particles do not.

Figure 5:
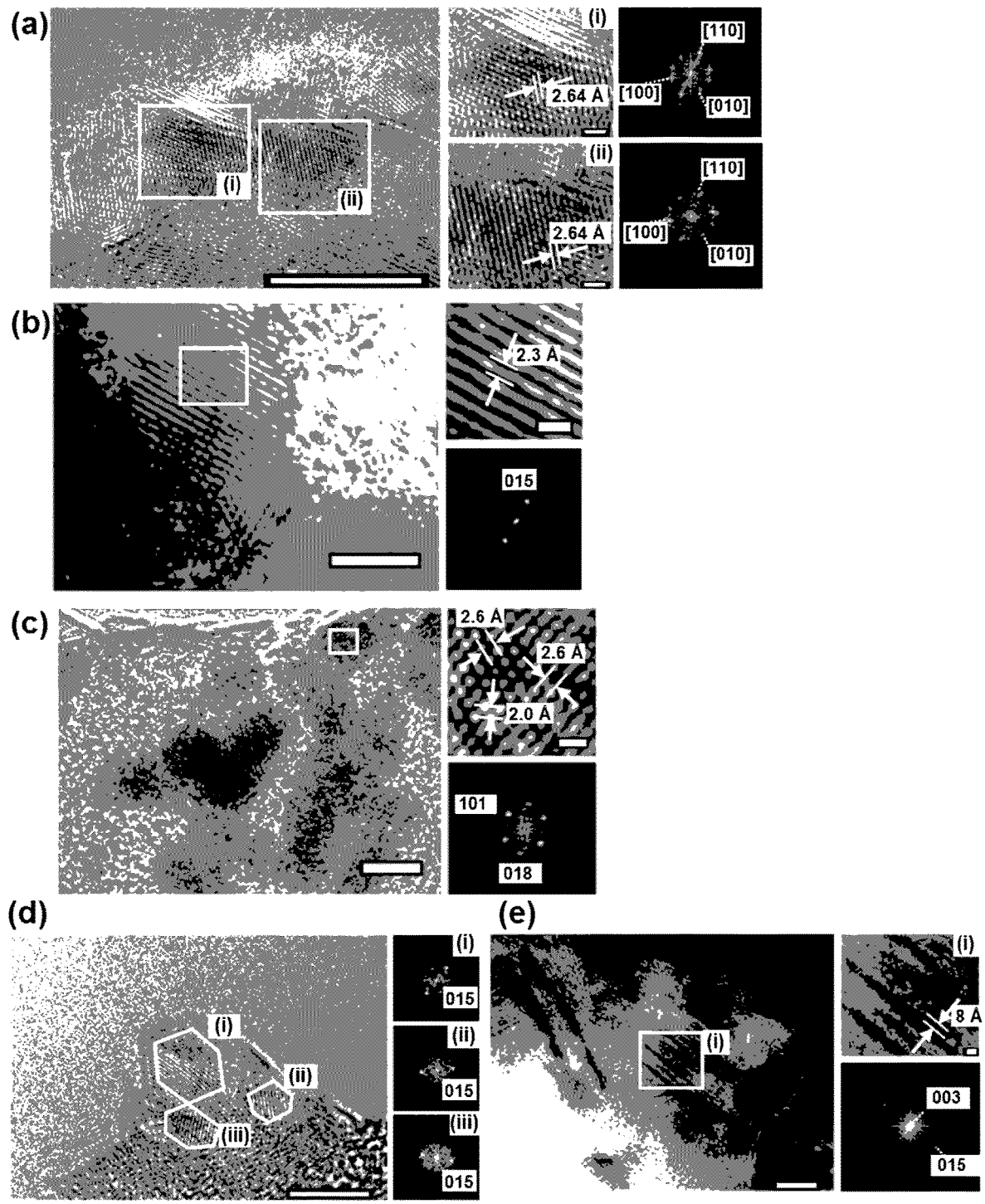

HRTEM images (in both initial and subsequent characterisations) showed that LDH synthesised at $4.11 \times 10^5$ s$^{-1}$ were indeed highly crystalline (FIG. 5a-c). The LDH synthesised at $3.16 \times 10^6$ s$^{-1}$ was polycrystalline, with domain sizes on the order of 5 nm (FIG. 5d). The mesocrystalline structure of densely packed aggregates was also resolved. Displayed in FIG. 5e are layers of LDH primary particles separated by 0.8 nm, indicative of the (003) distance. A fast-Fourier transform (FFT) shows visible (003) and (015) peaks, indicating that not only are the particles stacked, but are also epitaxially attached in the basal plane (FIG. 5e).

Example 3

Mechanism of the Aggregation of LDH Platelet, Characterised by Liquid Transmission Electron Microscopy LTEM was performed to visualise the mechanism of platelet aggregation and the mechanism by which hydrodynamic shear may affect crystallisation kinetics. Immediately after synthesis, suspensions were diluted, loaded into a 150 nm thick silicon nitride cell using a Protochips liquid holder, and imaged within an hour (see Methods—*Liquid Transmission Electron Microscopy*). Dispersed hexagonal disks ≤10 nm in diameter adhered to the silicon nitride membrane surface. These were predominantly oriented face down, most likely due to Coulombic attraction between the positively charged hydrotalcite and negatively charged silicon nitride, limiting Brownian motion. It was speculated that these LDH particles most likely aggregate to form the ~30 nm nanoplatelets measured in AFM, during the post-processing steps of centrifugation, rinsing, and drying.

Figure 6:
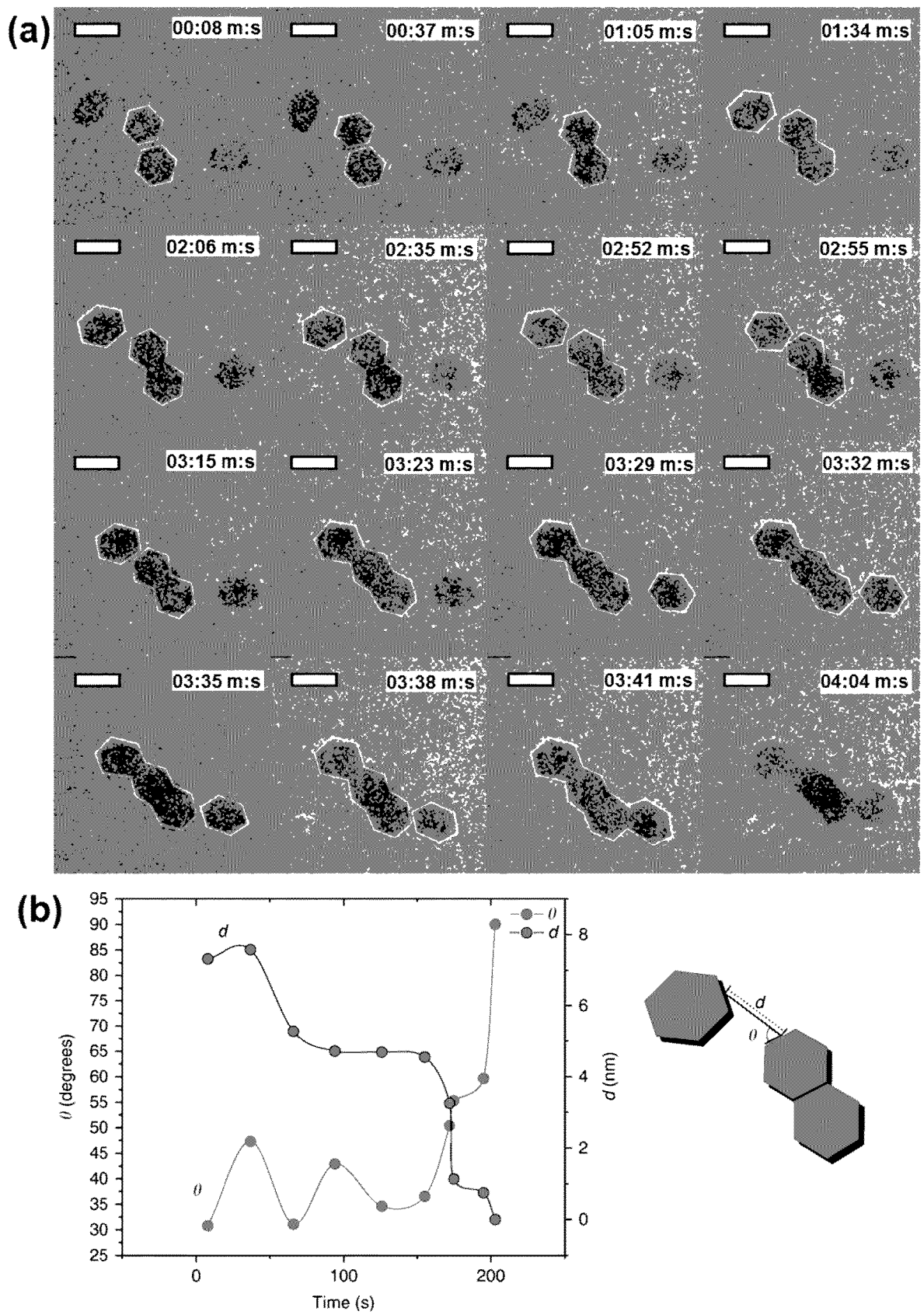
Figure 7:
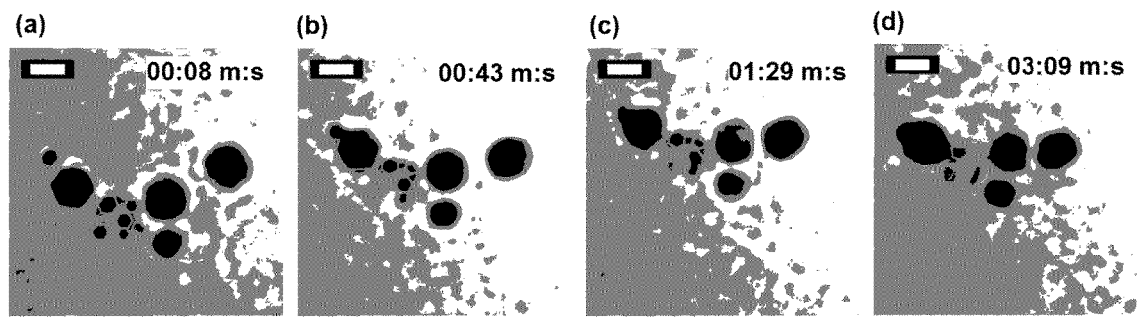

Under static conditions, particles at close distances aggregated by 'walking' to each other, rotating until crystal facets were aligned, and attaching edge-to-edge (FIG. 6a). As seen in FIG. 6b, the speed of approach was correlated to the alignment of facets, clearly indicating a mechanism of oriented attachment. In one interesting scenario, six particles with diameters of approximately 5 nm are close packed in a pentagonal configuration (FIG. 7). Unlike a free moving 5 nm particle (seen in the left hand of the frame) which aggregates readily with a larger particle, these six particles undergo much slower rates of aggregation, despite their proximity. While the high local concentration of particles can decrease Brownian diffusivity, oriented attachment is also likely hindered by the pentagonal configuration of these particles, which limits facet alignment with neighboring particles. This also indicates that misalignment, in addition to electrostatic repulsion, is a significant barrier to aggregation where van der Waals forces are the main driving force.

Figure 8:
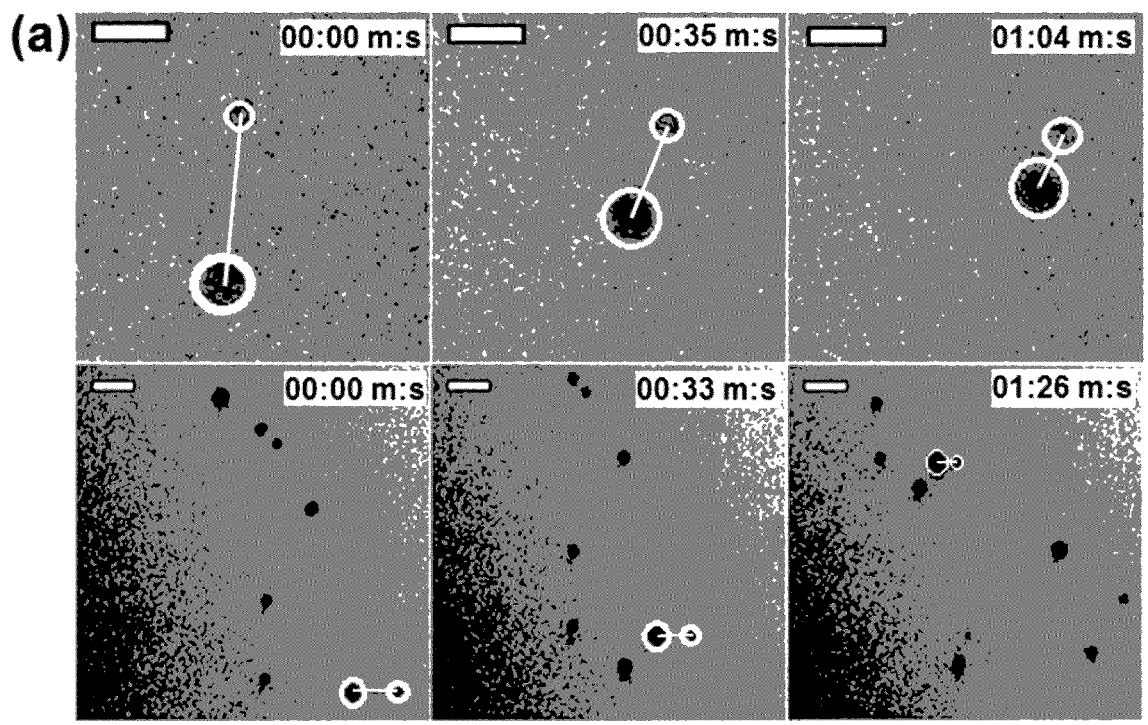

The introduction of flow accelerated particle aggregation. Local particle motion was difficult to induce with an external syringe pump; however, when a bubble was created via radiolysis under an intensified electron beam (Grogan, J. M., et al., *Nano Lett.*, 2014, 14, 359-364), the de-wetting of the silicon nitride membrane created a local flow strong enough to convect particles. The approach rates of two colliding particles, which was determined by tracking interparticle distances, were compared for static and bubble-induced flow conditions. The approach velocity in aggregation events between two ~8 nm particles in a static liquid environment and in a flowing liquid are seen in FIG. 8a. The average approach velocity was about four times faster in a flowing liquid as it was in a static liquid at interparticle distances under 25 nm.

This acceleration may be explained by two factors: flow-induced convection and rotation. Flow increases mass transport via advection and the dissipation of energy into heat, which enables particles to overcome the electrostatic barrier to aggregation. This can be modelled as a lowered effective kinetic barrier (Zaccone, A., et al., *Rev. E Stat. Nonlin. Soft Matter Phys.*, 2009, 79, 061401; Lattuada, M. and Morbidelli, M., *J. Colloid Interface Sci.*, 2011, 355, 42-53; Zaccone, A., et al., *J. Chem. Phys.*, 2010, 132, 134903; Zaccone, A., et al., *Rev. E Stat. Nonlin. Soft Matter Phys.*, 2009, 80, 051404). In static conditions, attraction to the TEM cell membrane surface limits rotation. When hydrodynamic forces overcome this adhesive force, particles rotate more easily, and as a result will orient more quickly. This effect seems to be important at very close distances, at the order of the particle size. The added barrier to aggregation from misalignment may perhaps be included in models as a modified collision frequency parameter.

These appear to be the first direct observations of LDH crystallisation via oriented attachment of nanoplatelets, and of hydrodynamically accelerated oriented attachment via bubble-induced flow in LTEM. This is speculated to be the dominant mechanism in concentrated, rapidly mixed conditions, and may be a significant crystallisation pathway during aging. This confirms the previous studies that have suggested an oriented attachment mechanism in addition to Ostwald ripening (Pang, X. J., et al., *RSC Adv.*, 2017, 7, 14989-14997; Abello, S., et al., *J. Mater. Chem.*, 2010, 20, 5878-5887), a slow dissolution and recrystallisation process (Galvao, T. L. P., et al., *J. Colloid Interface Sci.*, 2016, 468, 86-94; Sun, X. and Dey, S. K., *J. Colloid Interface Sci.*, 2015, 458, 160-168).

The anisotropy of LDH's surface is most likely responsible for its propensity to undergo oriented attachment. While the hydroxide groups at the basal surface of LDH sheets are triply coordinated, the edge hydroxide groups are bi- and mono-coordinated, which are labile and amphoteric (Jobbagy, M. and Regazzoni, A. E., *J. Colloid Interface Sci.*, 2013, 393, 314-318; Wang, Y. F. and Gao, H. Z., *J. Colloid Interface Sci.*, 2006, 301, 19-26). These groups are responsible for the chemisorption of heavy metal ions, such as arsenate and chromate. In suspensions with high pH values (10-11), such as the synthesis conditions used in this study, these edges decrease in charge via dissociation of hydroxyl groups and adsorbed water, decreasing Coulombic repulsion such that aggregation at the edges is kinetically favored.

Adsorbed anionic species may also play a significant role in oriented attachment by mediating the acid/base interactions of edge hydroxyl groups. For example, amphoteric polyprotic anions such as carbonate increase the aggregation and crystallisation of LDH, presumably by both screening the surface charge of LDH while retaining its amphoteric nature (Pavlovic, M., et al., *Soft Matter*, 2016, 12, 4024-4033; Sun, X., et al., *J. Colloid Interface Sci.*, 2015, 459, 264-272). Conversely, using ligands and/or solvents that inhibit acid/base interactions may inhibit oriented attachment and increase the basal/edge interactions. This could be the primary mechanism behind the generation of flower-like morphologies when LDH is synthesised using anions like organic acids and organic solvents like acetone (Yokoi, T., et al., *J. Asian Ceram. Soc.*, 2015, 3, 230-233; Chen, C. P., et al., *J. Mater. Chem. A*, 2014, 2, 15102-15110). Further exploring the effects of anionic species and solvent interactions on oriented attachment in LDH would be useful in the rational assembly of LDH nanostructures.

Figure 9:
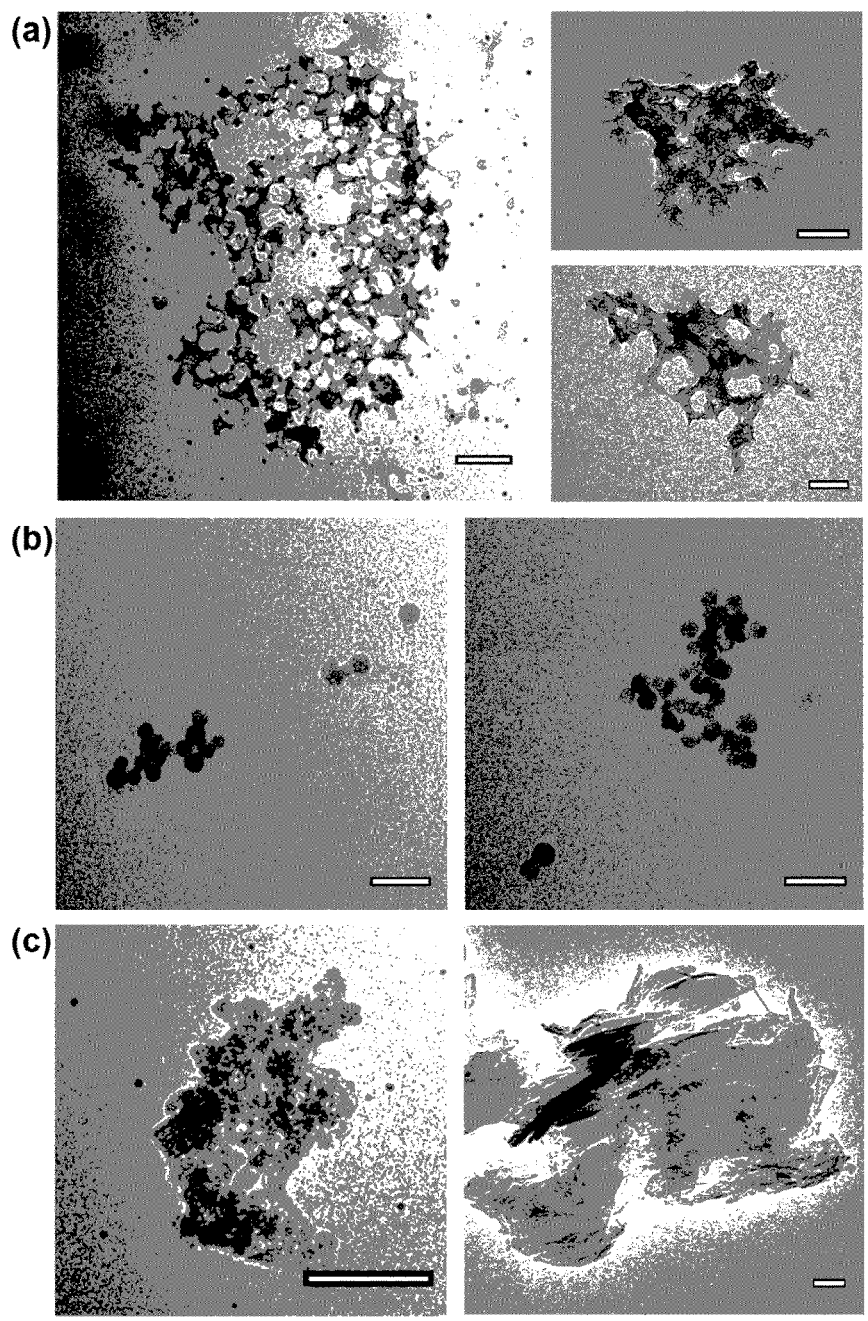
Figure 10:
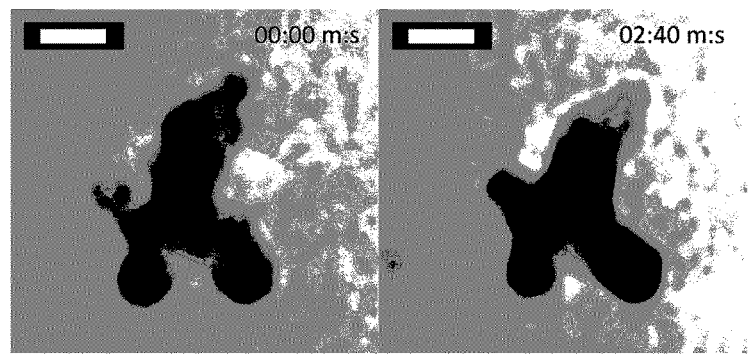

The observation of dynamic particle movements, like walking and rotation, also introduces the use of LDH particles to quantitatively study these non-DLVO factors. It may also be possible to explore the formation mechanisms of dense or fractal aggregates, which were also observed (FIGS. 9 and 10). In such studies, it would be important to carefully consider the effects of the electron beam on the local ionic environment, particle charge, and silicon nitride surface.

Aggregates Formation

Aggregates observed in LTEM and HRTEM were either fractal or dense crystalline structures. The fractal structures as shown in FIG. 9a consisted of LDH nanoparticles attached edge-to-edge and face-to-edge. Twisting, branching, and cross-linking created petal-like morphologies, which varied in density. Aggregates formed via bubble-induced flow possessed 2D fractal structures, attached at hexagonal facets, as shown in FIG. 9b. This probably suggests that the formation of 3D fractal aggregates could be accelerated by flow, as shear forces are known to influence the formation of structures ranging from dense crystalline structures with long-range order to highly fractal aggregates.

The aggregates with higher density, as shown in FIG. 9c, consisted of highly oriented particles and may be formed via the restructuring of these fractal aggregates. Such restructuring may be in the form of a diffusion-driven annealing process, which was observed in LTEM (FIG. 10), or through the physical reorganisation of nano-platelets, which has been previously suggested by Pang et al. (Pang, X. J., et al., *RSC Adv.*, 2017, 7, 14989-14997). Due to the high tendency of these particles to agglomerate, reorganisation may be a kinetically limited process that requires time and the input of energy, which may be the reason why many LDH co-precipitation protocols require a hydrothermal aging step to achieve high crystallinity (Cavani, F., et al., *Catal. Today*, 1991, 11, 173-301).

The ability to tailor the fractal and crystalline structures of LDH and 2D materials in general is important in catalytic applications, where functionality as a catalyst and catalyst support is highly dependent on surface area and morphology. Such structuring is difficult with nano-LDH. Abello et al. noted that the synthesis of nano-LDH results in highly dense structures with low surface area (Abello, S., et al., *J. Mat. Chem.*, 2010, 20, 5878-5887), and, in fact, most flow synthesis protocols create crystalline/disperse structures (Wang, Q., et al., *Nanoscale*, 2013, 5, 114-117; Pang, X. J., et al., *J. Solid State Chem.*, 2014, 210, 111-115; Ren, M. Y., et al., *J. Flow Chem.*, 2014, 4, 164-167). High surface area, flower-like LDH structures, are often synthesised in solvothermal processes (Li, P. and Zeng, H. C., *ACS Appl. Mater. Inter.*, 2016, 8, 29551-29564; Zhang, F. Z., et al., *Aiche J.*, 2014, 60, 4027-4036; Lv, W. Y., et al., *J. Mat. Chem. A*, 2015, 3, 23395-23402)

Therefore, it is clear that high shear rates may be used to generate unique fractal structures with anisotropic nanomaterials.

Example 4

Kinetic Analysis—Effect of Shear on Nucleation and Growth Kinetics of the LDH Synthesised Using the Annular Microreactor 100

Peclet Number Calculation

For a Brownian particle, Pe is given by Eq. 5, where $\eta_m$ is the medium's viscosity (Pa·s), $R_H$ is the hydrodynamic radius (m), $k_B$ is Boltzmann's constant (m² kg s⁻² K⁻¹), T is temperature (K) and $D_{B_0}$ is the Brownian self-diffusion coefficient (m² s⁻¹).

$$Pe = \frac{6\pi\eta_m R_H^3 \dot{\gamma}}{k_B T} = \frac{R_H^2 \dot{\gamma}}{D_{B_0}} \quad \text{(Eq. 5)}$$

The hydrodynamic radius of a disc $R_{H,disc}$ is given by Eqs. 6 and 7, where $H_{disc}$ is the disk thickness, $R_{disc}$ is the disc radius, and a is the aspect ratio (which is not to be confused with the definition of aspect ratio used in AFM particle analysis) (Mazer, N. A., et al., *Biochemistry*, 1980, 19, 601-615).

$$\alpha = \frac{H_{disc}}{2R_{disc}} \quad \text{(Eq. 6)}$$

$$R_{H,disc} = \frac{3R_{disc}}{2}\left[\sqrt{1+\alpha^2} + \frac{1}{\alpha}\ln(\alpha+\sqrt{1+\alpha^2}) - \alpha\right]^{-1} \quad \text{(Eq. 7)}$$

For discs 2 and 4 nm in radius with a thickness of 0.7 nm, Pe equals 0.07 and 0.46, respectively, at a shear rate of $3.16\times10^6 \text{s}^{-1}$. The rotational Peclet number is given by Eq. 8, where $D_r$ is the rotational diffusivity about the cylindrical axis (Mewis, J. and Wagner, N. J., Colloidal Suspension Rheology (Cambridge University Press), Cambridge, 2012).

$$Pe_r = \frac{\dot{\gamma}}{D_r} = \dot{\gamma}\left(\frac{3k_B T}{32\eta_m R_{disc}^3}\right)^{-1} \quad \text{(Eq. 8)}$$

For disks 2 and 4 nm in radius, $Pe_r$ equals 0.06 and 0.47, respectively, at a shear rate of $3.16\times10^6 \text{ s}^{-1}$.

From the initial calculation, for particles of 4 nm and 8 nm in diameter, Pe equals 0.10 and 0.82, respectively, while $Pe_r$ equals 0.06 and 0.47, respectively, at a shear rate of $3.16\times10^6 \text{ s}^{-1}$.

Characteristic Growth Time Calculation

The surface growth reaction is seen in Eq. 9, in which the addition of a cation A to particle $B_i$ results in a larger particle, $B_{i+1}$, where i represents the size. At high supersaturations, this is assumed to be irreversible.

$$A + B_i \rightarrow B_{i+1} \quad \text{(Eq. 9)}$$

The rate of growth $r_{g,i+1}$ is given by Eq. 10, where $K_i^g$ is the rate coefficient for a particle of size i (mol⁻¹ m³ s⁻¹), [A] is the concentration of cations (mol m⁻³), and $[B_i]$ is the concentration of B, particles (mol m⁻³).

$$r_{g,i+1} = K_i^g[A][B_i] \quad \text{(Eq. 10)}$$

The characteristic growth time scale of a particle of the critical nucleus size n ($R_{disc}$=2 nm, $H_{disc}$=0.7 nm) is then given as $\tau_{g,n}$, seen in Eq. 11, where $[A]_0$ and $[B_n]_0$ are the initial concentrations of cations and particles of the critical nucleus size, $B_n$. The initial concentration of cations is $[A]_0=0.75\times10^{-4}$ mol m$^{-3}$ and the initial concentration of nuclei $[B_n]_0=2.0\times10^{-7}$ mol m$^{-3}$, which is approximated from the average particle number concentration.

$$\tau_{g,n} = (K_n^g \sqrt[g]{[A]_o[B_n]_o})^{-1} \quad \text{(Eq. 11)}$$

At the micro-scale, the characteristic growth time is assumed to be diffusion-limited at high supersaturation. The rate coefficient is then determined by the rate of collision of the two species. This is given in Eq. 12, where $R_{H,A}$ and $R_{H,Bn}$ are the radii of monomer A and nucleus $B_n$ (m), $D_A$ and $D_{B,n}$ are their respective diffusivities (m$^2$ s$^{-1}$), and $N_A$ is Avogadro's constant (mol$^{-1}$).

$$K_n^g = 4\pi(R_{H,A}+R_{H,Bn})(D_A+D_{B_n})N_A \quad \text{(Eq. 12)}$$

It was assumed that $R_{H,A}+R_{H,Bn} \cong R_{H,Bn}=1.8\times10^{-9}$ m (initial assumption was $2.0\times10^{-9}$ m) and $D_A=1.020\times10^{-9}$ m$^2$ s$^{-1}$ (Lobo, V. M. M., et al., *Ber. Bunsen Phys. Chem.*, 1994, 98, 205-208). $D_{B_n}$ is calculated from the Einstein relation in Eq. 13 (initial calculation gave $D_{B_n}=1.23\times10^{-10}$ m$^2$ s$^{-1}$).

$$D_{B_n} = \frac{k_B T}{6\pi \eta_m R_{H,B_n}} = 1.364 \times 10^{-10} \; m^2 s^{-1} \quad \text{(Eq. 13)}$$

Inserting the calculated diffusion coefficient into Eq. 12 yields $K_n^g=1.55\times10^7$ m$^3$ s$^{-1}$ mol$^{-1}$ (initial calculation gave $K_n^g=1.73\times10^7$ m$^3$ s$^{-1}$). Inserting $K_n^g$ and the known concentrations into Eq. 11 gives $\tau_g=16.6\times10^{-3}$ s (initial calculation gave $\tau_g=14.9\times10^{-3}$ s).

Characteristic Aggregation Time Calculation

For two Brownian particles, the binary collision rate coefficient $K_{ij}^A$ is given by Eq. 14, where $W_{ij}$ the stability coefficient for two particles of the same size, is equal to 1 at carbonate concentrations above 1 mmol (Pavlovic, M., et al., *Soft Matter*, 2016, 12, 4024-4033), and $R_{H,i}$ and $R_{H,j}$ are the hydrodynamic diameters of the two particles, i and j, respectively.

$$K_{ij}^A = \frac{2k_B T}{3\eta_m W_{ij}}(R_{H,i}+R_{H,j})\left(\frac{1}{R_{H,i}}+\frac{1}{R_{H,j}}\right) \quad \text{(Eq. 14)}$$

The characteristic aggregation time for two particles of size i in the absence of hydrodynamic forces is expressed by Eq. 15. For a binary collision between Brownian discs with a hydrodynamic radius of 2 nm, $\tau_{nm}^A=0.68$ s.

$$\tau_{ii}^A = (K_{ii}^A[B_n]_0 N_A)^{-1} = \frac{3\eta_m W_{11}}{8k_B T[B_n]N_A} \quad \text{(Eq. 15)}$$

The scaling of the characteristic aggregation time for a binary encounter between two particles of size i with a fixed potential ($\tau_{ii}^{A,Pe}$) is given by Eq. 16 (Zaccone, A., et al., *Phys. Rev. E Stat. Nonlin. Soft Matter Phys.*, 2009, 80, 051404).

$$\tau_{ii}^{A,Pe} \sim \left(\frac{\eta_m \dot\gamma R_{H,i}^3}{k_B T}\right)^{-\frac{1}{2}} e^{\frac{-2\eta_m \dot\gamma R_H^3}{k_B T}} = \left(\frac{Pe}{6\pi}\right)^{-\frac{1}{2}} e^{-Pe/3\pi} \quad \text{(Eq. 16)}$$

For a binary collision between discs of size n, it is assumed that as Pe→0, the characteristic aggregation time is given by Eq. 15, such that $\tau_{nm}^{A,Pe}(4.1 \; 10^4 \; s^{-1}, Pe=9.5\cdot10^{-4})=0.68$ s (initial calculation was 2.2 s). Therefore, $\tau_{nm}^{A,Pe}(8.4\cdot10^5 \; s^{-1}, Pe=1.9\cdot10^{-2})=0.15$ s (initial calculation was $2.8\cdot10^{-5}$ s); and $\tau_{nm}^{A,PE}(3.2\cdot10^6 \; s^{-1}, Pe=7.4\cdot10^{-2})=77$ ms (initial calculation was $4.4\cdot10^{-18}$ s).

Results and Discussion

Figure 11:
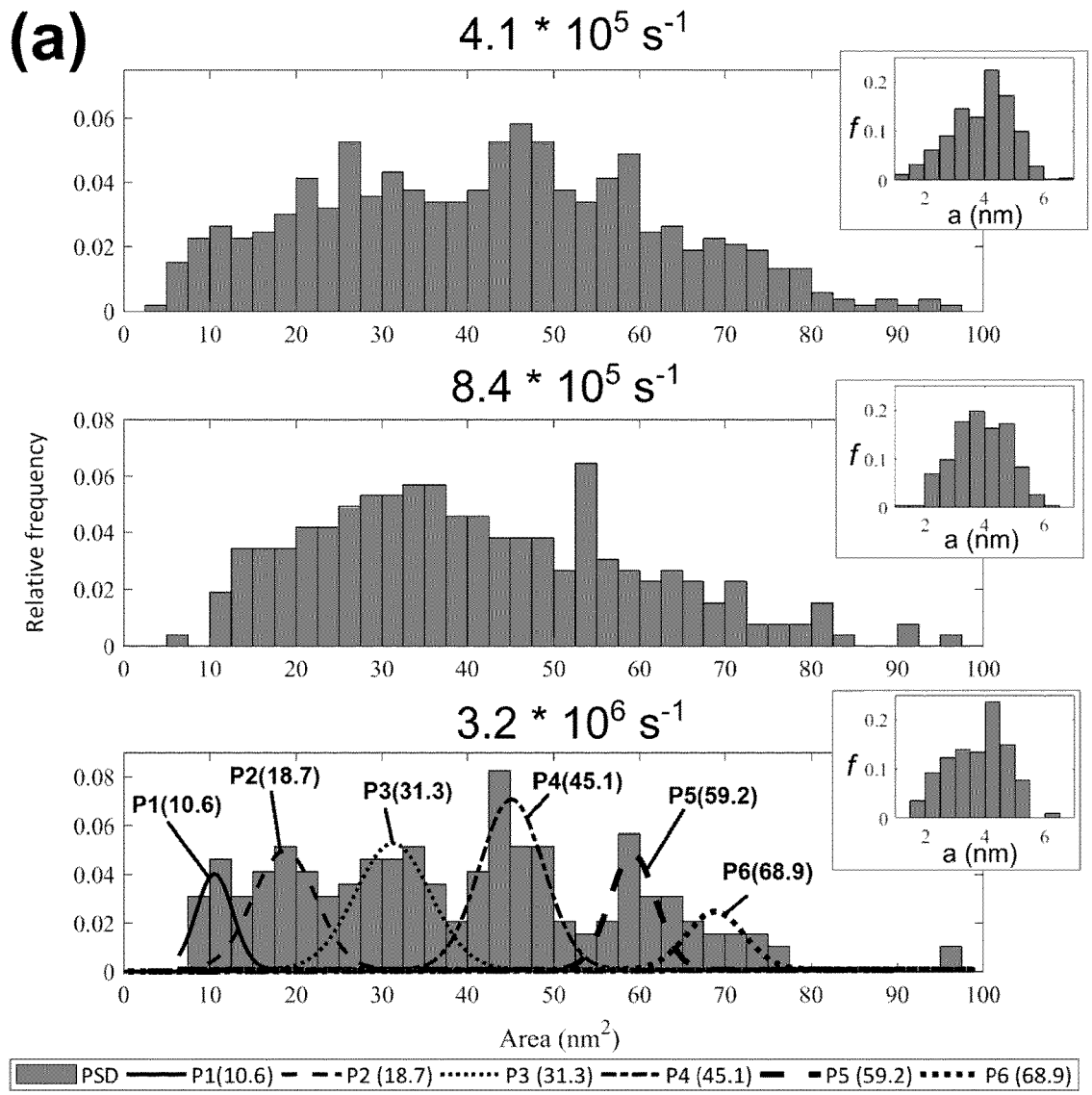
Figure 11:
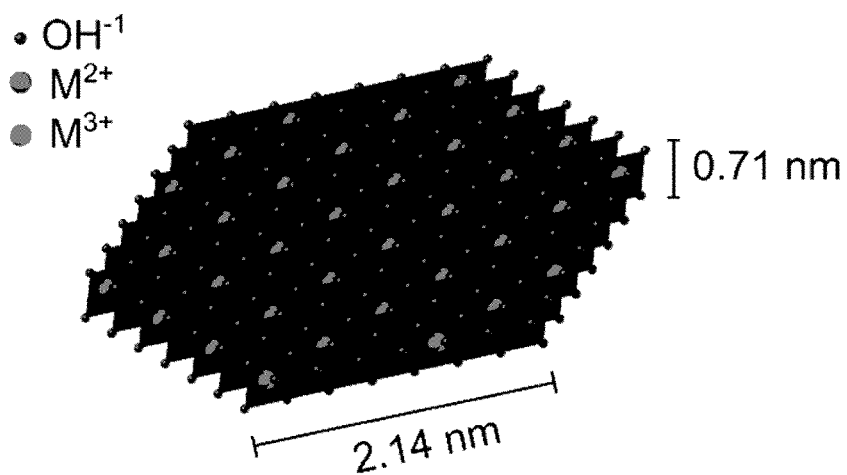

The particle size distributions of LDH synthesised at $4.1\times10^5$ s$^{-1}$ (A), $8.4\times10^5$ s$^{-1}$ (B), and $3.2\times10^6$ s$^{-1}$ (C) were measured to determine the effect of shear on nucleation and growth kinetics. The particle areas and calculated hexagonal side length a are compiled in FIG. 11a. From A to B, the median particle area decreases from 43.4 nm$^2$ to 39.0 nm$^2$, and the side length distribution narrows from 3.92±1.03 nm to 3.89±0.94 nm. From B to C the area distribution becomes multimodal, and the side length distribution widens to 3.75±0.97 nm. By deconvoluting the area distribution of C, five peaks were observed which are regularly separated by 11.7 nm$^2$, approximately the area of the smallest particle measured (10.6 nm$^2$). This particle, as seen in FIG. 11b, possesses a side length of 2.14 nm, and is composed of only 113 cations.

It was speculated that this is the critical nucleus size, above which particles grow via surface addition or aggregation. This explains why LDH nanoparticles as small as 4 and 7.8 nm have been observed in previous studies (Abello, S. and Perez-Ramirez, J., *Adv. Mater.*, 2006, 18, 2436-2439; Abello, S., et al., *J. Mater. Chem.*, 2010, 20, 5878-5887; Tokudome, Y., et al., *ACS Nano*, 2016, 10, 5550-5559). This critical size is influenced by a range of factors such as the initial supersaturation, temperature, and pH, which are explained by classical nucleation theory. The size may also represent a non-classical, or metastable, configuration at which the surface is sufficiently stabilised by complex local solvent-solute-surface interactions (De Yoreo, J. J., et al., *Science*, 2015, 349, aaa6760). This appears to be the case as the aggregates annealed slowly after attachment, even under the excitation of the electron beam (FIG. 10).

These changes in particle size distribution were interpreted by considering the effects of shear on mixing, kinetics and thermodynamics. For this analysis, the concept of characteristic aggregation timescales based on previously developed kinetic rate theories for the growth and aggregation of Brownian particles, which are described in the characteristic aggregation time calculation above. At $4.1\times10^5$ s$^{-1}$, the mixing time is approximately 4.4-2.1 ms, which is lower, but on the same order as the characteristic growth time 14.9 ms (from initial calculation) and 16.6 ms (from subsequent calculation). Therefore, nucleation and surface growth may occur concurrently, producing a more polydispersed population. The characteristic aggregation time for two nuclei, which are approximated as Brownian discs of 0.7 nm in thickness and 2 nm in radius is 0.68 s (initial calculation shows 2.2 s), which implies that aggregation is not a dominant growth mechanism.

At $8.4\times10^5$ s$^{-1}$ the mixing time decreases to 1.9-0.43 ms, which is faster than the time scale of surface growth, resulting in the effective segregation of nucleation and growth and a more homogeneous size distribution. From the initial calculation, the calculated characteristic aggregation time is 28 µs, implying that aggregation should be the dominant growth mechanism, yet from the particle size distribution, this does not seem to be true. It may be that in addition to the electrostatic barrier, these particles must overcome a kinetic barrier associated with alignment, increasing the effective characteristic aggregation time. However, from the subsequent calculation, the calculated characteristic aggregation time is 150 ms, which is an order of magnitude greater than the growth time scale.

At $3.2 \times 10^6$ s$^{-1}$, the mixing time is less than 1 ms, ensuring segregation of nucleation and growth steps, and the shear rate is significant enough to affect the motion of colloidal particles below 10 nm. The Peclet number (Pe) represents the ratio of hydrodynamic forces to Brownian forces, where at Pe<<1 hydrodynamic forces may be neglected. The rotational Peclet number (Pe$_r$) reflects the effect of hydrodynamic forces on particle rotation, where at Pe$_r$<<1 particle rotation is random; at higher Pe$_r$ particles may align in the direction of flow (see the calculation above). For disc-like particles 4 nm and 8 nm in diameter, Pe equals 0.07 and 0.46 (initial values were 0.10 and 0.82), respectively, and the rotational Peclet number (Pe$_r$) equals 0.06 and 0.47. This implies that hydrodynamic forces may significantly affect the motion and alignment of particles at this shear rate.

From the initial calculations, the characteristic aggregation time for a particle of 2 nm is $4.4 \times 10^{-18}$ s, which is much lower than the growth time scale. Aggregative growth via oriented attachment is then accelerated, and dominates over surface growth, resulting in a multimodal particle size distribution. However, from subsequent calculation, the calculated characteristic aggregation time for a nuclei is 77 ms, which is at the same order of the growth timescale. Thus, aggregative growth via oriented attachment is accelerated and occurs simultaneously with surface growth, resulting in a multimodal particle size distribution. This aggregation time may be even lower due to flow-induced alignment; this effect could be estimated by developing a generalized kinetic model for the oriented attachment of highly anisotropic nanoparticles in shear flow, which is outside the scope of this study.

Figure 12:
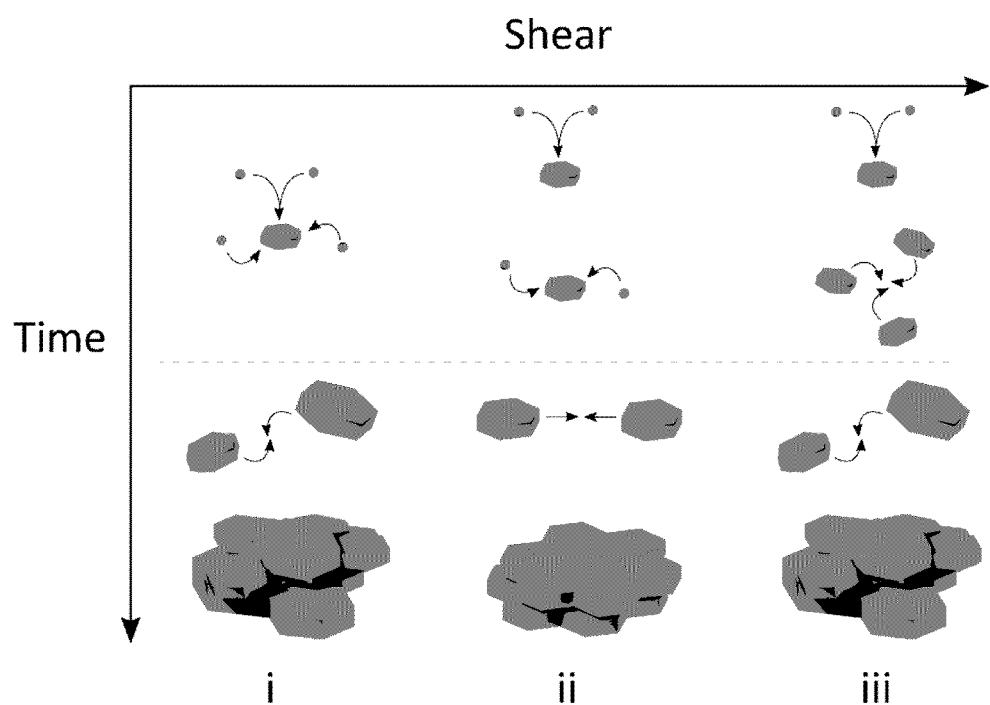

Post-synthesis processing steps of centrifugation and rinsing most likely caused these particles to aggregate into the stable 30 nm platelets seen in AFM. As the population of particles formed at $8.4 \times 10^5$ s$^{-1}$ was more homogeneous, it readily formed ordered assemblies, which crystallised to form the highly anisotropic particles. More polydispersed populations, formed in poorly mixed conditions at $4.1 \times 10^5$ s$^{-1}$ or in aggregation-dominated conditions at $3.2 \times 10^6$ s$^{-1}$, formed more disordered assemblies, creating polycrystalline particles. These polycrystalline particles then clustered in a more disordered fashion, with lower anisotropy. This behavior is attributed to the increase in surface free energy required to form ordered assemblies, slowing the kinetics of crystallisation (Auer, S. and Frenkel, D., *Nature*, 2001, 413, 711-713; Solomon, M. J., *Curr. Opin. Colloid Interface Sci.*, 2011, 16, 158-167). A schematic of this process is shown in FIG. 12.

This mechanism of crystallisation is an alternative to the conventional hypothesis that LDH crystallises via the slow dissolution of amorphous phase and subsequent re-precipitation into a crystalline phase (Galvao, T. L. P. et al., *J. Colloid Interface Sci.*, 2016, 468, 86-94; Sun, X., et al., *J. Colloid Interface Sci.*, 2015, 459, 264-272), which has been suggested by several previous studies of LDH synthesis in flow. Abello et al., using a high-speed disperser, observed dense structures in AFM with low surface area, suggesting that LDH crystallites can associate and align on a short time scale (Abello et al., *J. Mater. Chem.*, 2010, 20, 5878-5887). Pang et al., aged colloidal suspensions of LDH nanocrystals at different temperatures and times, and measured changes in viscosity to show that alignment can be a slow, thermally activated process (Pang, X. J. et al., *RSC Adv.*, 2017, 7, 14989-14997). Liquid TEM studies not only confirm this mechanism with direct visualization, but also show that this alignment is accelerated by hydrodynamic shear and low polydispersity.

Example 5

Synthesis of Copper Benzene Dicarboxylic Acid (CuBDC) Nanosheets Using the Annular Microreactor 100, and Characterisation of the As-Synthesised Product To further demonstrate the applicability of the current invention, the annular microreactor 100 was used to synthesise copper benzene dicarboxylic acid (CuBDC) nanosheets, a type of 2D metal organic framework (MOF).

Materials

Copper nitrate hexahydrate (99.5%), 1,4-benzene dicarboxylic acid (BDC) and trimethylamine (TEA) were obtained from Merck. HPLC grade acetonitrile, dimethylformamide (DMF), chloroform (CHCl$_3$) and methanol (MeOH) were obtained from Tedia and Singapore Chemical Reagent Co. Brilliant Blue R was obtained from Sigma Aldrich.

Experimental Procedures

CuBDC was synthesised in the annular microreactor 100 of the current invention. Three quartz tubes (110, 120 and 130) were installed in a "tube-in-tube" configuration to create two annular flow zones (114 and 134). Liquids were delivered to the reactor using a KDS Legato Dual Syringe Pump using disposable plastic 50 or 10 mL Terumo syringes. Compressed dried air was passed through a 200 μm filter (Swagelok) and delivered to the reactor using a Sierra SmartTrak C50L Mass Flow controller (20 L min$^{-1}$ max, 2% accuracy). For low gas flow rates (0.1 mL min$^{-1}$) a laboratory rotameter was used. The pressure of the Liquid 2 stream 140 was monitored inline to determine when flow had reached a steady state.

The two reagent solutions, "A" and "B" were prepared as follows: (A) copper nitrate was dissolved in DMF and acetonitrile (1:1, v/v); and (B): TEA and BDC were dissolved in DMF and acetonitrile (1:1, v/v). The molar ratio of Cu to BDC, and TEA to BDC were varied from 0.3 to 7 and from 0 to 8 respectively. The concentration of BDC was varied from 0.0075 to 0.12 M, although most experiments were conducted at 0.03 M. The solutions were sonicated for 5 min to completely dissolve the reagents. Solution A and Solution B were pumped simultaneously at equal flowrates ranging from 4 mL min$^{-1}$ to 10 mL min$^{-1}$ through inlets 121 and 131, respectively. Compressed dried air was simultaneously flowed at a high velocity at 0.4 to 3 L min$^{-1}$ through the inlet of the innermost tube (111). The resulting precipitate was collected from outlet 132 and centrifuged at 6000 rpm and rinsed with DMF three times. An aliquot was then taken and diluted in ethanol for further analysis. The resulting precipitate was then resuspended and rinsed further with methanol or chloroform three times. The rinsed precipitate was then resuspended in a desired solvent at mass fractions from 0.1 to 5% for further analysis as described in Example 6.

Results and Discussion

CuBDC nanosheets were synthesised using the high shear annular microreactor 100 of the current inventrion, which enables the precise synthesis of highly anisotropic two-dimensional structures. In this reactor, liquid solutions of the organic cross-linker and metal salt and were rapidly mixed in a high shear microfilm, which was generated by high velocity gas in quartz microtubes. In this study, a shear rate of approximately $8.4 \times 10^5$ s$^{-1}$ was used.

A co-solvent system of dimethylformamide (DMF) and acetonitrile (CH$_3$CN) was used to enhance the solubility of the BDC linker. By adding triethylamine (TEA), which increases the deprotonation of the BDC linker, the reaction was accelerated such that a high yield could be generated within the short residence time of the reactor at room temperature. The resulting precipitate was a blue-green mixture which formed a viscous gel when centrifuged. It was rinsed three times with DMF and three times with either methanol (MeOH) or chloroform (CH$_3$Cl).

The crystal structure, chemical composition, electronic structure, and morphology were determined via powder XRD, FTIR, SEM, TEM, and AFM. The surface area and nanopore size was characterised via nitrogen adsorption.

Figure 15:
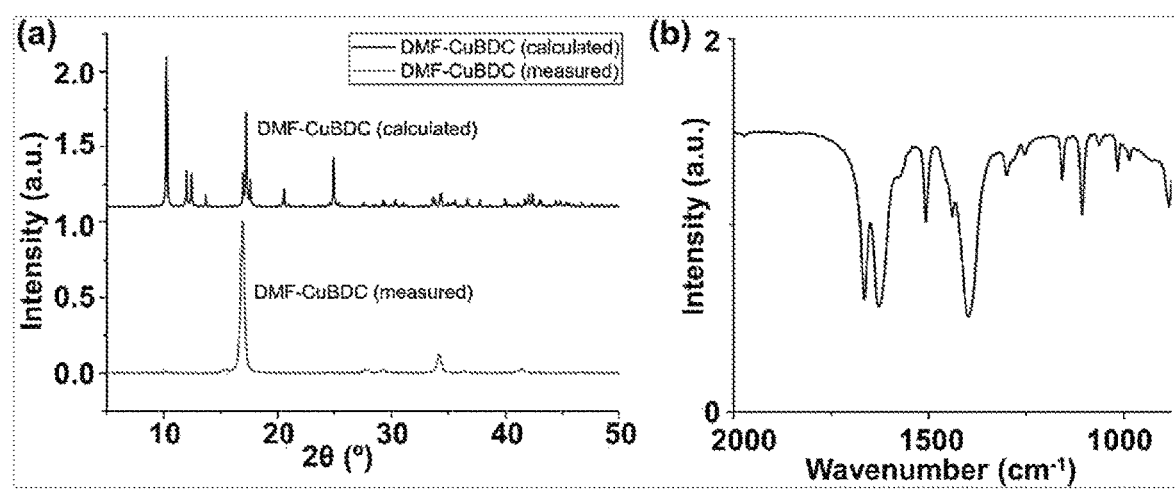
FIG. 15 Depicts: (a) calculated and measured XRD spectra of DMF-CuBDC showing the characteristic reflections at (110) 10.2° and (20-1) 16.9°; and (b) a FTIR transmission spectrum showing the characteristic peaks at 1387 cm$^{-1}$ (symmetric stretching of the BDC carboxylate group) and at 1576 cm$^{-1}$ (asymmetric stretching of the BDC carboxylate group).

The XRD and FTIR spectra (in FIG. 15a and b, respectively) of sample rinsed with DMF show the characteristic peaks of DMF-CuBDC (Carson, C. G., et al., *Eur. J. Inorg. Chem.*, 2014, 2140-2145). The FTIR spectrum can also be used to identify the chemical signatures of the constituents. Some characteristic peaks are at 1387 cm$^{-1}$ (symmetric stretching of the BDC carboxylate group), and 1576 cm$^{-1}$ (asymmetric stretching of the BDC carboxylate group). Copper may be identified via x-ray photospectroscopy (XPS) or inductively coupled plasma mass spectrometry (ICP-MS).The TEM and AFM height analysis shows that the synthesised material consists of square nanosheets approximately 37 nm in length and approximately 0.5 nm (one monolayer) in thickness. These nanosheets assemble to form a variety of structures depending on the dispersion solvent, which is discussed in Example 6.

Figure 16:
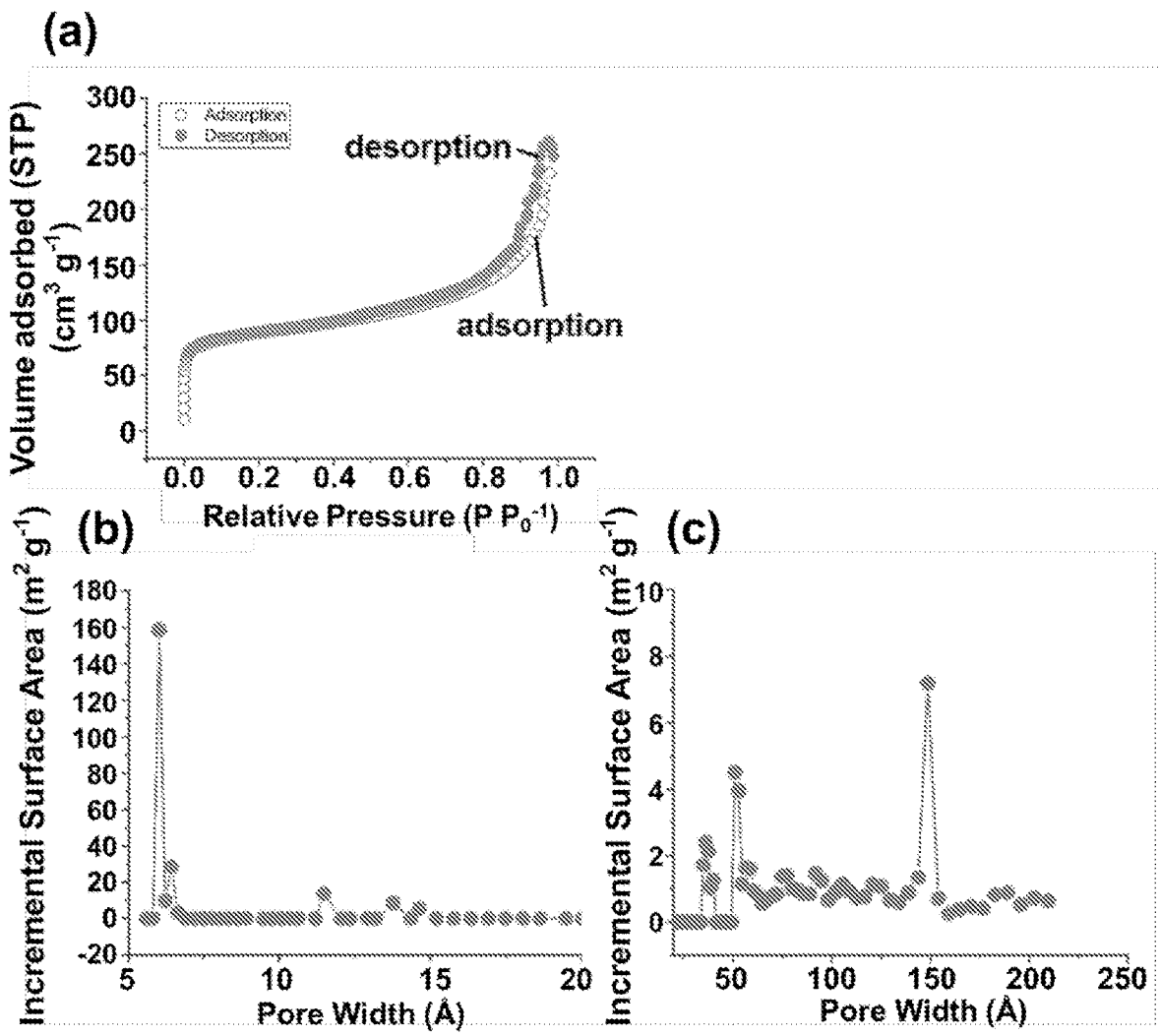
FIG. 16 Depicts: (a) $N_2$ isotherm adsorption and desorption curve; and (b, c) incremental surface areas vs. pore size calculated by 2D-NLFT theory.

The (Brunauer-Emmett-Teller) BET and Langmuir surface areas were 324 and 424 m$^2$ g$^{-1}$ respectively (FIG. 16a), similar to those reported previously (Cheng, Y. D., et al., *J. Membrane Sci.*, 2017, 539, 213-223). The micropore size distribution shows a maximum peak at 6 and 6.4 Å (FIG. 16b). From 35-200 Å, there is an additional increase in porosity, most likely arising from defects in the arrangement of nanosheets.

Figure 17:
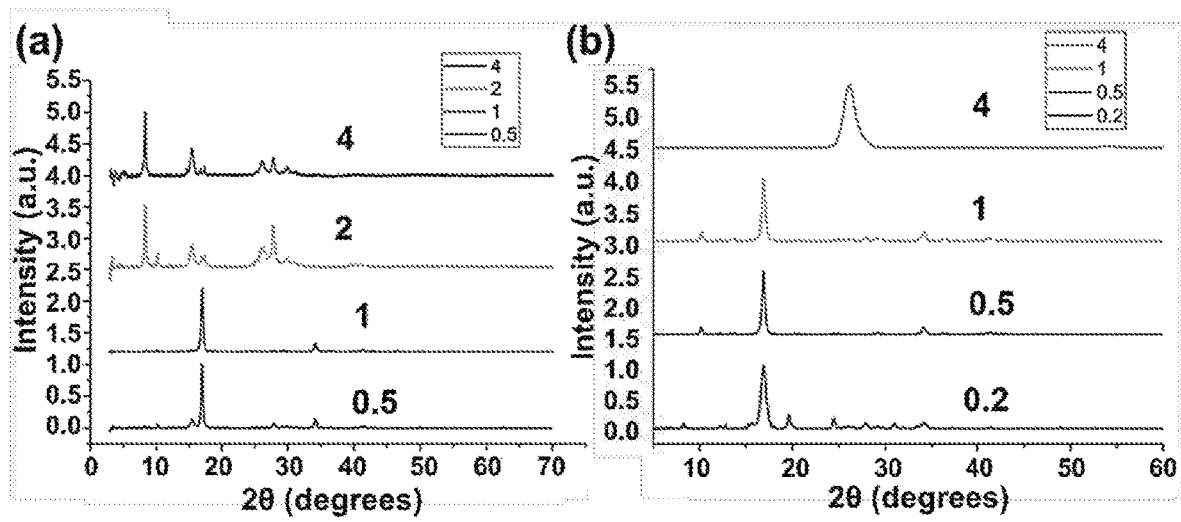
FIG. 17 Depicts the powder XRD patterns of CuBDC-DMF synthesised at: (a) increasing molar ratios of Cu/BDC, where the molar ratio of TEA/BDC=1; and (b) increasing molar ratio of TEA/BDC, where the molar ratio of Cu/BDC=1.

When varying the molar ratio of copper ions to BDC (Cu/BDC) and TEA to BDC (TEA/BDC), it was found that a molar ratio of 1/1 of Cu/BDC and TEA/BDC gave pristine nanosheets with few impurities. At TEA/BDC molar ratios exceeding 1, a copper hydroxide phase was more likely to form, and at TEA/BDC molar ratios below 1, pristine nanosheets were not formed (FIG. 17b). At Cu/BDC molar ratios above or below 1, XRD peaks due to impurities were observed (FIG. 17a).

This synthesis method was more efficient and scalable than previously reported hydrothermal methods (Rodenas, T., et al., *Nat. Mater.*, 2015, 14, 48-55; Carson, C. G., et al., *Eur. J. Inorg. Chem.*, 2009, 2338-2343). At the optimal reagent concentrations, a yield of 78.8% could be achieved at only 20° C. after separation. The mass-space-velocity (yield/time/reactor volume), a measure of the efficiency of the process, is $1.85 \times 10^4$ gL$^{-1}$ s$^{-1}$, eight orders of magnitude higher than previous methods (FIG. 19). These improvements are due to the continuous nature of the microreactor, the use of a high shear rate to generate delaminated MOF nanosheets, and the use of TEA as an accelerant. This method can be extended to a range of 2D-MOF or COF structures, assuming that the reaction time is sufficiently accelerated to be below the reactor residence time, and opens new avenues to the industrial large-scale manufacture of functional 2D-MOFs.

Example 6

Polymorphisms, Structural Arrangement and Crystallinity of the As-Synthesised CuBDC Nanosheets in Various Solvents It was observed that solvent exchange with MeOH or CHCl$_3$ resulted in a CuBDC with a crystal structure different from that reported previously for pure CuBDC (Carson, C. G., et al., *Eur. J. Inorg. Chem.*, 2014, 2140-2145). The previously reported structures is denoted as "α-CuBDC" in this example. The structure of the as-synthesised CuBDC (current invention) is denoted as "β-CuBDC" and it was observed to possess fewer reflections, and thus higher crystalline symmetry.

The synthesis of CuBDC in a high shear regime is crucial to achieving the thinness required for β polymorph stability; batch hydrothermal methods with low shear, which have been the primary method of synthesis so far, will produce thicker sheets, resulting in the α-polymorph.

Density functional theory (DFT) was applied to predict and calculate the electronic energy of the β-CuBDC structure. The starting structure consisted of copper dimers linked by four terephthalic acid units, stacked with the benzene rings in adjacent layers as shown in FIG. 18b, and was refined based on lattice spacing from measured powder XRD patterns. The obtained unit cell structure belongs to the triclinic space group with lattice parameters of a=10.8284 Å, b=10.8273 Å, c=5.3336 Å, α=β=90°, γ=90.304°. The crystal structures of β-CuBDC and α-CuBDC are as shown in FIGS. 18b, 20a and 20b.

A comparison between the simulated and measured powder XRD patterns is seen in FIG. 18a. When using a radiation wavelength of 1.5406 Å, some characteristic powder-XRD peaks β-CuBDC are 2θ=8.26° ((100) reflection), 16.57° ((200) reflection), 19.69° ((111) reflection) and 16.06 ((001) reflection). The cage size of the predicted structure, approximately 6.3 Å, agrees with BET pore size distribution. The difference between triclinic α-CuBDC and monoclinic β-CuBDC is the stacking angle of individual monolayers and rotation of inner benzene groups. Though these are seemingly subtle differences, they may change critical functional properties, such as stability, surface area, and pore volume. Comparison using Rietveld refinement in this case proved difficult due to the small particle size, high anisotropy, and orientation. For example, a strong (001) peak was not observed in experimental data, most likely due to the thinness of the nanosheets.

Compared to the calculated bulk energy of α-CuBDC (−0.42 kJ Å$^{-3}$), β-CuBDC's energy per unit volume is 0.04 kJ Å$^{-3}$ higher, implying that β-CuBDC may be a metastable polymorph. To further investigate, the surface energies were compared. Exposed β-CuBDC carboxylic acid-terminated (100) surfaces were 15% lower than equivalent α-CuBDC (001) surfaces; β-CuBDC (001) surfaces were 84% lower than equivalent α-CuBDC (110) surfaces. This difference means that size and morphology will play a key role in determining the stability of each polymorph.

To predict polymorph stability, a phase diagram was constructed based on the differences in surface and bulk energy (FIG. 18c). The equilibrium curve is determined by setting the total energy difference to zero. This is expressed in eq. 17, where $\Delta E^{\beta-\alpha}$ is the total energy difference between the two structures, $\Delta E_B^{\beta-\alpha}$ is the bulk energy difference, $\Delta E_{100-001}^{\beta-\alpha}$ is the energy difference between (001) and (1-10) surfaces and $\Delta E_{100-001}^{\beta-\alpha}$ is the difference between (100) and (001) surfaces. T is the particle thickness and L is the particle length, assuming each particle is shaped like a rectangular prism with a square base having equal side lengths (L).

$$\Delta E^{\beta-\alpha} = 0 = TL^2(\Delta E_B{}^{\beta-\alpha}) + 2L^2(\Delta E_{001\text{-}1\bar{1}0}{}^{\beta-\alpha}) 6TL(\Delta E_{100\text{-}001}{}^{\beta-\alpha}) \quad \text{(Eq. 17)}$$

The calculated phase diagram in FIG. 18c clearly illustrates that, for particles less than 2 nm thick (a few monolayers) or with high anisotropy (i.e. nanosheets or nanorods), β-CuBDC is the most stable. This prediction matches experimental observations of particles as thin as a monolayer with high aspect ratios.

Effects of Solvents on the Structural Arrangement and Crystallinity of CuBDC

Washing the CuBDC nanosheets with various solvents (DMF, MeOH or $CHCl_3$) also affects their structural arrangement and crystallinity, which were observed using SEM and TEM (FIG. 21a-f). When washed with DMF, primary nanosheets approximately 30-50 nm in length formed anisotropic clusters, which gave branch-like structures. When washed with $CHCl_3$, the nanosheets coalesced into thin colloidal films. When washed with MeOH, the nanosheets arranged to form larger square planar structures up to 200 nm in size. AFM analysis of individual particles showed that they retained an aspect ratio of approximately 9, with a minimum side length of approximately 37 nm and thickness of <2 nm (FIG. 22a-e).

The changes in structure and size due to post-synthesis washing suggest that the aggregation of primary nanosheets is highly dependent on solvent properties. Aggregation with uniform aspect ratios formed in MeOH show that MeOH may facilitate oriented attachment (or self-assembly), a non-classical crystallisation mechanism. Nanoparticles are particularly prone to oriented attachment to lower the free energy associated with their high surface energies (De Yoreo, J. J., et al., *Science*, 2015, 349, aaa6760).

Liquid transmission electron microscopy (LTEM), which consists of encapsulating liquid sample between silicon nitride membranes, enables nanoscale resolution of dynamic behavior of nanoparticle aggregation, though at the cost of resolution.

LTEM of dispersions in different solvents revealed that not only does 2D CuBDC aggregate in an oriented attachment process, but also suggest that the speed of aggregation is dictated by the solvent used. Initially, individual particles approximately 40 nm in size was observed to adhere to the silicon nitride surface of the liquid cell. Aggregation was then triggered by prolonged exposure to the electron beam. A dosage of approximately 80 $e^-nm^{-2}$ $s^{-1}$ was sufficient to trigger aggregation within minutes without reducing the MOF into Cu nanoparticles (which was observed at higher dosages). While the effect of high voltage electron beam on these solvents has not been previously studied, it may probably result in the ionisation of solvent species and increase the local temperature, resulting in a lower barrier to aggregation that would otherwise be present in an ambient dispersion.

In MeOH, the 2D-CuBDC nanosheets rapidly aggregated and oriented into square-like structures (FIG. 23a). Growth began with the aggregation of individual nanosheets into square-like structures roughly 70 nm in size. These structures then attached with each other, predominantly face-to-face, to form larger square structures. Interestingly, these structures still possess rough edges, presumably because aggregation is too fast for particles to align precisely. These aggregates stabilised at a size of approximately 200-300 nm (FIG. 24a)

In DMF, it was observed that the nanosheets would "walk" towards each other, rotate, align, and attached edge-to-edge to form chain-like and square clusters (FIG. 23b). Aggregation occurred at a much slower rate, such that individual particles could precisely align and attach edge-to-edge. These structures then assembled to branching, elongated structures (FIG. 24b), which shows that crystallisation in DMF may be diffusion limited, as opposed to the kinetically limited crystallisation in MeOH.

In $CHCl_3$, no aggregation events were observed and all particles remained static. Increasing the electron beam intensity only resulted in the evaporation of solvent or degradation of sample. Even particles located near to each other would not spontaneously undergo oriented attachment (FIG. 24c). The resolution in $CHCl_3$ is also significantly poorer compared to DMF and MeOH, likely due to the higher density of $CHCl_3$.

These observations support the idea that solvents change the structure by mediating the oriented attachment process. This is clear when comparing the aggregative growth rates from representative individual particles in MeOH, DMF and $CHCl_3$, as shown in FIG. 23c. High shear synthesis yields delaminated primary nanosheets around 40 nm in side length less than 2 nm thick. The aggregation of these particles is then triggered and accelerated by external forces, such as hydrodynamic shear (i.e. agitation), thermal excitation (i.e. heating), and concentration (i.e. dry-down or centrifugation).

Oriented attachment of CuBDC is likely driven by their highly anisotropic molecular structure and surface energies. The "faces" of the nanosheets, i.e. the (001) surface in β-CuBDC and (1-10) surface in α-CuBDC, are largely dominated by benzyl groups and copper-oxygen complexes, such that face-to-face attachment is driven by pi-pi bonding between benzene groups and electrostatic attraction between copper and oxygen atoms in adjacent layers. The "edges," i.e. the (100) surface in β-CuBDC and (001) surface in α-CuBDC, are dominated by dangling linkers with carboxylic acid groups and open, incompletely-coordinated copper sites, such that edge-to-edge attachment is driven by the complexation of dangling carboxylic acid groups to copper sites in neighboring particles.

The anisotropy of surface-solvent interactions also likely affects the attractive and repulsive forces that govern the dynamics of oriented attachment. Recent computational studies indeed show that solvent-surface interactions play a key role in the oriented attachment of nanoparticles, given the large surface area-to-volume ratio (Lv, W. Q., et al., *Nanoscale*, 2014, 6, 2531-2547). Classical DLVO theory fails to predict this behavior, as it neglects surface-solvent molecular interactions and particle anisotropy. Metal organic frameworks present an interesting case study for the effects of solvation forces, as they contain a variety of functional groups that can have dramatically different interactions.

To further understand these interactions, DFT calculations/simulations were performed to determine the energy differences between these interactions. Among $CHCl_3$, DMF and MeOH, it was observed that DMF showed the strongest interaction with the β-CuBDC(001) surface, where the formyl oxygen of DMF interacted with the exposed Cu atoms. The interaction of MeOH with the β-CuBDC(001) surface was found to be the strongest when the oxygen of MeOH interacted with the Cu atom. However, in comparison to the interaction with DMF, the interaction with MeOH was weaker by 14 kJ $mol^{-1}$. Solvent interactions with the benzene group and in the pore space were weaker by over 25 kJ mol$^{-1}$. Chloroform exhibited the weakest interaction with the β-CuBDC(001) surface, which was weaker than DMF by over 40 kJ mol$^{-1}$. Based on this preliminary study, a monolayer coverage of DMF and MeOH over the exposed Cu atoms on both surfaces of a single layer of β-CuBDC was considered, as shown in FIG. 25a and b. Such a coverage is representative of solvation of an isolated β-CuBDC layer. The monolayer coverage of DMF around the β-CuBDC layer was found to be 17.8 kJ mol$^{-1}$ more stable than the coverage of MeOH.

MeOH interacts most strongly at the edges by engaging in both donor and acceptor-type hydrogen bonding interactions with the free carboxylic acid groups as shown in FIG. 25c. DMF only engages in acceptor-type hydrogen bonding interaction, as shown in FIG. 25d. Compared to DMF-edge interactions, the interactions of MeOH are stronger by around 20 kJ mol$^{-1}$. Chloroform has the lowest interactions with edge carboxylic acid groups, weaker than the interactions of MeOH by over 50 kJ mol$^{-1}$ (FIG. 25e).

The relatively strong interaction of DMF with the β-CuBDC (001) face suggests that DMF may form a strongly-bound solvent layer that may hinder face-to-face attachment; weaker interaction with the β-CuBDC (001) edge suggests that DMF forms a weakly-bound solvent layer at the edges, which would encourage edge-to-edge attachment. These two factors would facilitate the observed domination of edge-to-edge oriented-attachment and the formation of branching structures in DMF. Conversely, because MeOH binds strongly to carboxylic groups at the edges and more weakly to the CuBDC (001) face, a MeOH solvent layer would facilitate face-to-face attachment, explaining why large, ordered sheets are formed in MeOH dispersions. Given the large relative area of (001) faces this could also explain the faster rate of aggregation in MeOH.

Interestingly, although chloroform possessed the weakest interactions with CuBDC, aggregation was not observed in liquid TEM studies. There are several possible explanations for this discrepancy. As a non-polar solvent with a low dielectric constant, chloroform would not screen electrostatic repulsion between particles as well as a polar solvent. Compared to MeOH and DMF, the Debye length in chloroform would be approximately 70% lower. In liquid TEM, CuBDC particles may also adhere more strongly to the charged silicon nitride substrate due to low solvation in chloroform, restricting its ability to diffuse and attach to other particles during imaging conditions. However, it was observed experimentally that chloroform suspensions were more colloidally stable than MeOH suspensions, which can settle in a matter of hours.

The effect of the electron beam across solvents may also influence aggregation; however, this is difficult to explain because there are no studies to date of the effects of electron beam on the solvents used. This effect may be quite complex, as studies on irradiated water have shown.(Grogan, J. M., et al., *Nano Letters*, 2014, 14, 359-364; Schneider, N. M., et al., *J Phys. Chem. C*, 2014, 118, 22373-22382). As a similar radiation dosage was used for each trial, and the ionisation energies did not differ significantly, it was assumed that beam-induced effects were normalised across all experiments.

Example 7

Absorptive Properties of the As-Synthesised CuBDC

2D MOFs are promising adsorbents due to their large specific surface areas, open metal sites and dispersibility in organic solvents. To examine the effect of solvent on the adsorptive properties of the as-synthesised CuBDC, the adsorption of Brilliant Blue R (BB), an organic dye, in CH$_3$CN, DMF and MeOH was performed.

Experimental Procedures

Brilliant Blue R (BB) was obtained from Sigma Aldrich. BB solutions were prepared from fresh stock solutions of 0.1 mg BB/mL in MeOH, CH$_3$CN and DMF. 1 mL of CuBDC dispersed in the same solvent at a concentration of 1.3 mg/mL was added to the BB solutions and mixed for 12 hours in the dark at 21° C. Samples were then centrifuged for 5 minutes at 9000 RPM, and the supernatant was collected. The light absorbances of BB in the supernatant in DMF, MeOH and CH$_3$CN were collected at 600, 587 and 597 nm respectively in quartz cuvettes in a Cary 60 UV-Vis spectrophotometer (Agilent), and used to quantify concentrations using the Beer-Lambert law. Experiments were performed in triplicate for each condition.

Results and Discussion

As shown in FIG. 26a, CuBDC is an effective adsorbent for BB in DMF, with a maximum adsorption capacity of 19.3±0.9 mg g$^{-1}$. Comparatively, the CuBDC dispersions in MeOH and CH$_3$CN were observed to be less effective, with maximum adsorption capacities at 4.5±0.9 mg g$^{-1}$ and 8.7±2.2 mg g$^{-1}$, respectively.

This difference was probably due to the competition between dye, solvent molecules and CuBDC itself to adsorb on a CuBDC surface. In the latter case, the aggregation of CuBDC particles may be thought of as a self-adsorption process, which removes available active surface. When dispersed in MeOH and CH$_3$CN, CuBDC aggregated, or "self-adsorbed," rapidly (as compared to DMF), which was captured in the liquid TEM studies. DFT simulations showed that this effect was due to the relative strength of solvent adsorption at the surface and inside the pores of CuBDC. This effect may be seen visibly in the settling of CuBDC dispersions in MeOH and CH$_3$CN, as shown in FIG. 26b. The aggregation or self-adsorption of CuBDC particles therefore removed available surface area for dye adsorption, leading to a lower overall capacity.

The invention claimed is:

1. A constant shear continuous reactor device, comprising:
   an annular gas delivery tube comprising a gas inlet and a gas outlet;
   a first annular liquid delivery tube comprising a first liquid inlet and a first liquid outlet arranged concentrically around the annular gas delivery tube along a common axis, where the first liquid outlet is located at a downstream position relative to the gas outlet;
   an annular reactor wall tube comprising a final liquid inlet, a mixing zone section and a reactor outlet, where the annular reactor wall tube is arranged concentrically around the first annular liquid delivery tube along the common axis, and
   an apparatus that controls the flow rates of a gas through the gas inlet, a first liquid through the first liquid inlet and a final liquid through the final liquid inlet, such that an annular flow of a liquid film mixture comprising the first and final liquids is formed in the mixing zone section, wherein:
   the mixing zone section is located at a downstream position relative to the gas outlet and the first liquid outlet;
   the reactor outlet is located at a downstream position relative to the mixing zone section;

the mixing zone section and reactor outlet of the annular reactor wall tube has an inner diameter of from 100 nm to 53 mm; and when in use, a liquid film forming section is formed on an inner surface of the first annular liquid delivery tube.

2. The reactor device according to claim 1, wherein the liquid film mixture in the mixing zone section has a thickness that is from 0.1% to 10%, of the inner diameter of the mixing zone section and reactor outlet of the annular reactor wall tube.

3. The reactor device according to claim 1, wherein the inner diameter of the mixing zone section and reactor outlet of the annular reactor wall tube is from 1 µm to 2.5 mm.

4. The reactor device according to claim 1, wherein an inner surface of the mixing zone section is coated with a reactive agent and/or a catalyst.

5. The reactor device according to claim 1, wherein an inner surface of the film forming section is coated with a reactive agent and/or a catalyst.

6. The reactor device according to claim 1, wherein the device is suitable to provide a high-shear core gas flow and a liquid sheath flow, comprising a first and a final liquid, on an inner surface of the mixing zone section.

7. The reactor device according to claim 1, wherein the device is suitable to provide a high-shear core gas flow and a liquid sheath flow comprising a first liquid on an inner surface of the liquid film forming section.

8. A method of using a constant shear continuous reactor device according to claim 1, which method comprises:
(a) providing a gas, a first liquid and a final liquid, each liquid comprising a reactant and/or a reagent; and
(b) supplying the gas, the first liquid and final liquid to the reactor device by way of the gas inlet, the first liquid inlet and final liquid inlet, respectively; and
(c) mixing at least the first and final liquids together to form a reaction mixture that reacts to provide a reaction product mixture and collecting the reaction product mixture upon exit from the reactor outlet of the reactor device, wherein
the gas is supplied at a sufficient velocity to provide a high-shear force on the first and final liquids and to generate a gas core region in the reactor device, such that the first and final liquids combine on a surface of the mixing zone section of the reactor device to form a liquid film mixture with annular flow, which liquid film mixture has a thickness that is from 0.1% to 10% of an inner diameter of the mixing zone section and reactor outlet of the annular reactor wall tube.

9. The method according to claim 8, wherein the gas is supplied at a flow rate of from 0.1 to 100 L/min.

10. The method according to claim 8, wherein the first and final liquids are supplied at a flow rate of from 0.1 to 1 L/min.

11. The method according to claim 8, wherein the reaction product is a 2-D material.

12. The method according to claim 11, wherein the gas is an inert gas or air, the first liquid is an aqueous solution of magnesium nitrate hexahydrate and aluminium nitrate nonahydrate and the final liquid is an aqueous solution of NaOH and $Na_2CO_3$, where the reaction product mixture comprises hydrotalcite nanoplatelets.

13. The method according to claim 11, wherein the gas is an inert gas or air, the first liquid is a solution of copper nitrate in a solvent comprising a 1:1 mixture by volume of dimethylformamide and acetonitrile and the final liquid is a solution of triethylamine and 1,4-benzene dicarboxylic acid in a solvent comprising a 1:1 mixture by volume of dimethylformamide and acetonitrile, where the reaction product is a 2-D metal-organic framework of copper and 1,4-benzene dicarboxylic acid.

14. The method according to claim 8, wherein the first and final liquids are delivered to the reactor device with the same flow rate.

15. The method according to claim 8 wherein the gas comprises a reactant or reagent in gaseous form.

16. A reactor system comprising two or more constant shear continuous reactor devices as described in claim 1 arranged to run in parallel.

17. A method of forming a 2-D material using a constant shear continuous reactor device according to claim 1, said method comprising the steps of:
providing a gas and a liquid, the liquid comprising a reactant and/or a reagent; and
(ii) supplying the gas and liquid to the reactor device by way of the gas inlet and liquid inlet, respectively;
(iii) mixing at least the gas and liquid together to provide a reaction product mixture that comprises a 2-D material and collecting the reaction product mixture upon exit from the reactor outlet of the reactor device, wherein:
(a) when the gas is an inert gas or air, then an inner surface of the mixing zone section is coated and/or impregnated with one or more of a catalyst, a reactant and a reagent and the gas is supplied at a sufficient velocity to provide a high-shear force on the liquid, such that a liquid film with annular flow is formed on a surface of the mixing zone section of the reactor device, thereby allowing interaction between the reactants and/or reagents in the liquid with the one or more of a catalyst, a reactant and a reagent coated and/or impregnated on the inner surface of the mixing zone section to form a product, which liquid film has a thickness that is from 0.1% to 10% of an inner diameter of the mixing zone section and reactor outlet of the annular reactor wall tube;
(b) when the gas comprises a reactant or reagent, then the gas is supplied at a sufficient velocity to provide a high-shear force on the liquid, such that a liquid-gas film mixture with annular flow is formed on a surface of the mixing zone section of the reactor device to form a product, which liquid-gas film mixture has a thickness that is from 0.1% to 10% of an inner diameter of the mixing zone section and reactor outlet of the annular reactor wall tube; or
(c) when the gas comprises a reactant or reagent and the mixing zone section is coated and/or impregnated with one or more of a catalyst, a reactant and a reagent, then the gas is supplied at a sufficient velocity to provide a high- shear force on the liquid, such that a liquid-gas film mixture with annular flow is formed on a surface of the mixing zone section of the reactor device, thereby allowing interaction between the reactants and/or reagents in the liquid-gas film mixture with the one or more of a catalyst, a reactant and a reagent coated and/or impregnated on the surface of the mixing zone section to form a product, which liquid-gas film mixture has a thickness that is from 0.1% to 10% of an inner diameter of the mixing zone section and reactor outlet of the annular reactor wall tube; or
(d) when the gas is an inert gas or air, then the gas is supplied at a sufficient velocity to provide a high-shear force on the liquid, such that a liquid-gas film mixture with annular flow is formed on a surface of the mixing zone section of the reactor device to form a product, which liquid-gas film mixture has a thickness that is from 0.1% to 10% of an inner diameter of the mixing zone section and reactor outlet of the annular reactor wall tube.

18. The method according to claim 17, wherein, in the circumstance of (a), the liquid film has a thickness that is from 0.5% to 5% of the inner diameter of the mixing zone section and reactor outlet of the annular reactor wall tube.

19. The reactor device according to claim 1, wherein the means or apparatus that controls the flow rates of the gas, the first liquid and the final liquid controls the flow rates of the gas and first liquid to provide a liquid film on the liquid film forming section that comprises the first liquid.

20. The reactor device according to claim 19, wherein the liquid film in the liquid film forming section has a thickness that is from 0.1% to 10% of an inner diameter of the liquid film forming section of the first annular liquid delivery tube.

\* \* \* \* \*